US012650577B2

(12) United States Patent
Zhang et al.

(10) Patent No.: US 12,650,577 B2
(45) Date of Patent: Jun. 9, 2026

(54) OPTICAL LENS, CAMERA MODULE, AND ELECTRONIC DEVICE

(71) Applicant: Huawei Technologies Co., Ltd., Shenzhen (CN)

(72) Inventors: Kaiyuan Zhang, Shenzhen (CN); Yun Chiang Hsu, Dongguan (CN); Shaopan Zhou, Tokyo (JP); Rongkai Feng, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 370 days.

(21) Appl. No.: 18/359,505

(22) Filed: Jul. 26, 2023

(65) Prior Publication Data

US 2023/0367101 A1 Nov. 16, 2023

Related U.S. Application Data

(63) Continuation of application No. PCT/CN2021/143954, filed on Dec. 31, 2021.

(30) Foreign Application Priority Data

Jan. 27, 2021 (CN) .......................... 202110113726.6

(51) Int. Cl.
G02B 9/64 (2006.01)
G02B 13/00 (2006.01)

(52) U.S. Cl.
CPC ........... *G02B 9/64* (2013.01); *G02B 13/0045* (2013.01)

(58) Field of Classification Search
CPC ...... G02B 5/005; G02B 9/64; G02B 13/0045; G03B 9/02
See application file for complete search history.

(56) References Cited

U.S. PATENT DOCUMENTS

| | | | |
|---|---|---|---|
| 2015/0268448 | A1 | 9/2015 | Kubota et al. |
| 2018/0364457 | A1 | 12/2018 | Yao et al. |

(Continued)

FOREIGN PATENT DOCUMENTS

| | | |
|---|---|---|
| CN | 107678134 A | 2/2018 |
| CN | 107797236 A | 3/2018 |
| CN | 108535843 A | 9/2018 |

(Continued)

OTHER PUBLICATIONS

Warren J. Smith, "Modern Lens Design" In: "Modern Lens Design", Jan. 1, 1992, McGrawHill, Inc., XP055152035, pp. 25-27.

(Continued)

*Primary Examiner* — Paisley L Wilson

(74) *Attorney, Agent, or Firm* — Slater Matsil, LLP

(57) ABSTRACT

An optical lens, a camera module, and an electronic device are disclosed. The optical lens includes a variable aperture, a first lens, a second lens, a third lens, a fourth lens, a fifth lens, a sixth lens, and a seventh lens that are arranged from an object side to an image side. The first lens has a positive focal power, an object-side surface of the first lens is convex near an optical axis, and an image-side surface of the first lens is concave near the optical axis. The second lens has a negative focal power, an object-side surface of the second lens is convex near the optical axis, and an image-side surface of the second lens is concave near the optical axis.

18 Claims, 32 Drawing Sheets

(56)     References Cited

U.S. PATENT DOCUMENTS

| | | | |
|---|---|---|---|
| 2019/0137736 A1 | 5/2019 | Huh et al. | |
| 2019/0227265 A1 | 7/2019 | Shi | |

FOREIGN PATENT DOCUMENTS

| | | | | |
|---|---|---|---|---|
| CN | 109143535 A | | 1/2019 | |
| CN | 109839717 A | | 6/2019 | |
| CN | 110850550 A | | 2/2020 | |
| CN | 111458850 A | | 7/2020 | |
| CN | 107272143 B | * | 8/2020 | ......... G02B 27/0025 |
| CN | 111929809 A | | 11/2020 | |
| KR | 102118491 B1 | | 6/2020 | |

OTHER PUBLICATIONS

Herbert Gross, "Handbook of optical systems," Aberration theory and correction of optical systems, Chapter 31: Correction of Aberrations, Jan. 1, 2007, Handbook of Optical Systems, Aberration Theory and Correction of Optical Systems, Wileyvch, Weinheim, DE, XP002719371, pp. 215-221, 225.

Herbert Gross, "Handbook of Optical Systems, vol. 3: Aberration Theory and Correction of optical Systems," In: "Handbook of Optical Systems, vol. 3", Jan. 1, 2007, Wiley-VCH, Weinheim, XP055169688, pp. 377-379.

* cited by examiner 0.00

0.00

Field of view    0.00

0.00

-5.0    -2.5    0    2.5    5.0

Distortion (%)

39.82

29.87

Field of view    19.91

9.96

-5.0    -2.5    0    2.5    5.0

Distortion (%)

Normalized pupil
coordinates

Axial chromatic aberration (mm)

Normalized pupil
coordinates

Axial chromatic aberration (mm)

OPTICAL LENS, CAMERA MODULE, AND ELECTRONIC DEVICE

CROSS-REFERENCE TO RELATED APPLICATIONS

This application is a continuation of International Application No. PCT/CN2021/143954, filed on Dec. 31, 2021, which claims priority to Chinese Patent Application No. 202110113726.6, filed on Jan. 27, 2021. The disclosures of the aforementioned applications are hereby incorporated by reference in their entireties.

TECHNICAL FIELD

This application relates to the field of electronic device technologies, and in particular, to an optical lens, a camera module, and an electronic device.

BACKGROUND

To improve product competitiveness of a mobile phone, integrating a high-performance optical lens with the mobile phone has currently become an important development trend of the mobile phone, and a zoom range, resolution, imaging quality, and the like of the lens of the mobile phone all need to be further improved. In addition, a depth of field of the optical lens is also an important factor that affects photographing effect of the optical lens. For example, in some photographing scenes, to make both a distant object and a close-up object sharp in a photographed image, a small-aperture optical lens needs to be used for photographing. In other photographing scenes, to highlight a subject in a photographed image and blur a background, a large-aperture optical lens needs to be used for photographing. However, most lenses of mobile phones in the market use a fixed-aperture design, and cannot meet a multi-scene photographing requirement.

SUMMARY

This application provides an optical lens, a camera module, and an electronic device, so that the optical lens can provide different depth-of-field ranges for different photographing scenes, to meet a multi-scene photographing requirement.

According to a first aspect, this application provides an optical lens. The optical lens may include a variable aperture and seven lenses. The seven lenses are respectively a first lens, a second lens, a third lens, a fourth lens, a fifth lens, a sixth lens, and a seventh lens from an object side to an image side. The variable aperture is disposed on an object side of the first lens, and a diameter of clear aperture of the variable aperture is adjustable, so that an F-number of the optical lens can be adjusted. The first lens has a positive focal power, an object-side surface of the first lens is convex near an optical axis, an image-side surface of the first lens is concave near the optical axis, and a focal length f1 of the first lens and a focal length EFL of the optical lens satisfy: $0 \le f1/EFL \le 1.1$. The second lens has a negative focal power, an object-side surface of the second lens is convex near the optical axis, and an image-side surface of the second lens is concave near the optical axis. An object-side surface of the third lens is concave near the optical axis, and a focal length f3 of the third lens and a focal length f4 of the fourth lens satisfy: $-4 \le f3/f4 \le -1.3$. An object-side surface of the seventh lens is a reverse curved surface. This helps improve image quality of an edge field of view of the optical lens.

In the foregoing solution, the optical lens provided in this application uses a variable-aperture structure, and a matching design of a related parameter of the lens is used, so that the optical lens can provide different depth-of-field ranges for different scenes, thereby meeting a multi-scene photographing requirement.

In some possible implementations, a curvature radius R3 of a region, near the optical axis, of the object-side surface of the second lens and a curvature radius R4 of a region, near the optical axis, of the image-side surface of the second lens satisfy: $1.8 \le (R3+R4)/(R3-R4) \le 6.3$. This setting helps balance focal power cooperation of the optical lens and shorten a total length TTL of the optical lens.

In some possible implementations, a total length TTL of the optical lens, the F-number Fno. of the optical lens, and a half-image height ImgH that can be formed on an imaging surface of the optical lens satisfy: $TTL \times Fno./ImgH \ge 1.9$.

In some possible implementations, a center thickness CT5 of the fifth lens, a center thickness CT7 of the seventh lens, and a half field of view HFOV of the optical lens satisfy: $0 \le CT7/((CT5 \times \tan(HFOV)) \le 1.1$.

In some possible implementations, the F-number Fno. of the optical lens satisfies: $1.2 \le Fno. \le 8.0$. The F-number Fno. of the optical lens may be adjusted by changing the diameter of clear aperture of the variable aperture. Different diameters of clear aperture correspond to different F-numbers Fno., that is, correspond to different depths of field, so that the optical lens can adapt to different photographing scenes.

In some possible implementations, a curvature radius R12 of a region, near the optical axis, of an image-side surface of the sixth lens and the focal length EFL of the optical lens satisfy: $0 \le EFL/R12 \le 0.46$, to help the sixth lens better cooperate with another lens.

In some possible implementations, a curvature radius R13 of the object-side surface of the seventh lens and the focal length EFL of the optical lens satisfy: $0 \le |EFL/R13| \le 0.9$. Such a design helps the seventh lens correct an edge field of view aberration and shortens the total length TTL of the optical lens.

In some possible implementations, the total length TTL of the optical lens and an entrance pupil diameter EPD of the optical lens satisfy: $1.5 \le TTL/EPD \le 10$. This can better control an amount of light entering the optical lens, and maintain the total length TTL of the optical lens.

In some possible implementations, along an optical axis direction of the optical lens, a spacing d1 between the first lens and the second lens satisfies: $d1/dm \le 1$, where dm is a spacing between an $m^{th}$ lens and an $(m+1)^{th}$ lens, m is a natural number, and $2 \le m \le 6$. This spacing cooperation can improve overall mechanical strength of the optical lens.

In some possible implementations, a center thickness CT1 of the first lens satisfies: $CT1/CTn \ge 1$, where CTn indicates a center thickness of an nth lens, n is a natural number, and $2 \le n \le 7$. This thickness combination is combined with the focal power cooperation of the optical lens, so that optical lens can achieve better imaging quality.

In some possible implementations, the optical lens may have the following several specific structural forms:

The F-number Fno. of the optical lens satisfies: $1.2 \le Fno. \le 4.0$; the focal length of the first lens and the focal length EFL of the optical lens satisfy: $f1/EFL=1$; the focal length f3 of the third lens and the focal length f4 of the fourth lens satisfy: $f3/f4=-1.4$; the curvature radius R3 of the region, near the optical axis, of the object-side surface of the second lens and the curvature radius R4 of the region, near the optical axis, of the image-side surface of the second lens satisfy: $(R3+R4)/(R3-R4)=5$; the total length TTL of the optical lens, the half-image height ImgH that can be formed on the imaging surface of the optical lens, and the F-number Fno. of the optical lens satisfy: $1.9 \leq TIL \times F/ImgH \leq 5.5$; the center thickness CT5 of the fifth lens, the center thickness CT7 of the seventh lens, and the half field of view HFOV of the optical lens satisfy: $CT7/[CT5 \times tan(HFOV)]=0.8$; the curvature radius R12 of the region, near the optical axis, of the image-side surface of the sixth lens and the focal length EFL of the optical lens satisfy: $|EFL/R12|=0.4$; the curvature radius R13 of the object-side surface of the seventh lens and the focal length EFL of the optical lens satisfy: $|EFL/R13|=0.3$; the total length TTL of the optical lens and the entrance pupil diameter EPD of the optical lens satisfy: $1.84 \leq TTL/EPD \leq 4.8$; along the optical axis direction of the optical lens, the spacing d1 between the first lens and the second lens satisfies: $0.1 \leq d1/dm \leq 0.5$; and the center thickness CT1 of the first lens satisfies: $1.4 \leq CT1/CTn \leq 3.5$.

Alternatively, the F-number Fno. of the optical lens satisfies: $1.2 \leq Fno. \leq 4.0$; the focal length of the first lens and the focal length EFL of the optical lens satisfy: $f1/EFL=0.98$; the focal length f3 of the third lens and the focal length f4 of the fourth lens satisfy: $f3/f4=-1.64$; the curvature radius R3 of the region, near the optical axis, of the object-side surface of the second lens and the curvature radius R4 of the region, near the optical axis, of the image-side surface of the second lens satisfy: $(R3+R4)/(R3-R4)=3.68$; the total length TTL of the optical lens, the half-image height ImgH that can be formed on the imaging surface of the optical lens, and the F-number Fno. of the optical lens satisfy: $2.0 \leq TTL \times Fno./ImgH \leq 5.6$; the center thickness CT5 of the fifth lens, the center thickness CT7 of the seventh lens, and the half field of view HFOV of the optical lens satisfy: $CT7/[CT5 \times tan(HFOV)]=0.42$; the curvature radius R12 of the region, near the optical axis, of the image-side surface of the sixth lens and the focal length EFL of the optical lens satisfy: $|EFL/R12|=0.32$; the curvature radius R13 of the object-side surface of the seventh lens and the focal length EFL of the optical lens satisfy: $|EFL/R13|=0.37$; the total length TTL of the optical lens and the entrance pupil diameter EPD of the optical lens satisfy: $1.84 \leq TTL/EPD \leq 9.80$; along the optical axis direction of the optical lens, the spacing d1 between the first lens and the second lens satisfies: $0.04 \leq d1/dm \leq 0.21$; and the center thickness CT1 of the first lens satisfies: $1.78 \leq CT1/CTn \leq 5.00$.

Alternatively, the F-number Fno. of the optical lens satisfies: $1.2 \leq Fno. \leq 4.0$; the focal length of the first lens and the focal length EFL of the optical lens satisfy: $f1/EFL=1.1$; the focal length f3 of the third lens and the focal length f4 of the fourth lens satisfy: $f3/f4=-4$; the curvature radius R3 of the region, near the optical axis, of the object-side surface of the second lens and the curvature radius R4 of the region, near the optical axis, of the image-side surface of the second lens satisfy: $(R3+R4)/(R3-R4)=5.73$; the total length TTL of the optical lens, the half-image height ImgH that can be formed on the imaging surface of the optical lens, and the F-number Fno. of the optical lens satisfy: $2.33 \leq TTL \times F/ImgH \leq 6.24$; the center thickness CT5 of the fifth lens, the center thickness CT7 of the seventh lens, and the half field of view HFOV of the optical lens satisfy: $CT7/[CT5 \times tan(HFOV)]=1$; the curvature radius R12 of the region, near the optical axis, of the image-side surface of the sixth lens and the focal length EFL of the optical lens satisfy: $|EFL/R12|=0.39$; the curvature radius R13 of the object-side surface of the seventh lens and the focal length EFL of the optical lens satisfy: $|EFL/R13|=2.19$; the total length TTL of the optical lens and the entrance pupil diameter EPD of the optical lens satisfy: $1.96 \leq TTL/EPD \leq 5.33$; along the optical axis direction of the optical lens, the spacing d1 between the first lens and the second lens satisfies: $0.07 \leq d1/dm \leq 0.22$; and the center thickness CT1 of the first lens satisfies: $1.25 \leq CT1/CTn \leq 5.00$.

Alternatively, the F-number Fno. of the optical lens satisfies: $1.2 \leq Fno. \leq 4.0$; the focal length of the first lens and the focal length EFL of the optical lens satisfy: $f1/EFL=1.09$; the focal length f3 of the third lens and the focal length f4 of the fourth lens satisfy: $f3/f4=-3.61$; the curvature radius R3 of the region, near the optical axis, of the object-side surface of the second lens and the curvature radius R4 of the region, near the optical axis, of the image-side surface of the second lens satisfy: $(R3+R4)/(R3-R4)=5.58$; the total length TTL of the optical lens, the half-image height ImgH that can be formed on the imaging surface of the optical lens, and the F-number Fno. of the optical lens satisfy: $2.33 \leq TTL \times Fno./ImgH \leq 6.25$; the center thickness CT5 of the fifth lens, the center thickness CT7 of the seventh lens, and the half field of view HFOV of the optical lens satisfy: $CT7/[CT5 \times tan(HFOV)]=1.04$; the curvature radius R12 of the region, near the optical axis, of the image-side surface of the sixth lens and the focal length EFL of the optical lens satisfy: $|EFL/R12|=0.46$; the curvature radius R13 of the object-side surface of the seventh lens and the focal length EFL of the optical lens satisfy: $|EFL/R13|=2.19$; the total length TTL of the optical lens and the entrance pupil diameter EPD of the optical lens satisfy: $1.96 \leq TTL/EPD \leq 5.22$; along the optical axis direction of the optical lens, the spacing d1 between the first lens and the second lens satisfies: $0.07 \leq d1/dm \leq 0.21$; and the center thickness CT1 of the first lens satisfies: $1.39 \leq CT1/CTn \leq 3.41$.

Alternatively, the F-number Fno. of the optical lens satisfies: $1.2 \leq Fno. \leq 4.0$; the focal length of the first lens and the focal length EFL of the optical lens satisfy: $f1/EFL=1.05$; the focal length f3 of the third lens and the focal length f4 of the fourth lens satisfy: $f3/f4=-1.55$; the curvature radius R3 of the region, near the optical axis, of the object-side surface of the second lens and the curvature radius R4 of the region, near the optical axis, of the image-side surface of the second lens satisfy: $(R3+R4)/(R3-R4)=5.54$; the total length TTL of the optical lens, the half-image height ImgH that can be formed on the imaging surface of the optical lens, and the F-number Fno. of the optical lens satisfy: $2.07 \leq TIL \times Fno./ImgH \leq 5.62$; the center thickness CT5 of the fifth lens, the center thickness CT7 of the seventh lens, and the half field of view HFOV of the optical lens satisfy: $CT7/[CT5 \times tan(HFOV)]=0.75$; the curvature radius R12 of the region, near the optical axis, of the image-side surface of the sixth lens and the focal length EFL of the optical lens satisfy: $|EFL/R12|=0.02$; the curvature radius R13 of the object-side surface of the seventh lens and the focal length EFL of the optical lens satisfy: $|EFL/R13|=0.26$; the total length TTL of the optical lens and the entrance pupil diameter EPD of the optical lens satisfy: $1.82 \leq TTL/EPD \leq 5.08$; along the optical axis direction of the optical lens, the spacing d1 between the first lens and the second lens satisfies: $0.11 \leq d1/dm \leq 0.66$; and the center thickness CT1 of the first lens satisfies: $1.41 \leq CT1/CTn \leq 3.48$.

Alternatively, the F-number Fno. of the optical lens satisfies: $1.2 \leq Fno. \leq 8.0$; the focal length of the first lens and the focal length EFL of the optical lens satisfy: $f1/EFL=1.03$; the focal length f3 of the third lens and the focal length f4 of the fourth lens satisfy: f3/f4=−2.35; the curvature radius R3 of the region, near the optical axis, of the object-side surface of the second lens and the curvature radius R4 of the region, near the optical axis, of the image-side surface of the second lens satisfy: (R3+R4)/(R3− R4)=4.93; the total length TTL of the optical lens, the half-image height ImgH that can be formed on the imaging surface of the optical lens, and the F-number Fno. of the optical lens satisfy: 1.87≤TTL×Fno./ImgH≤5.74; the center thickness CT5 of the fifth lens, the center thickness CT7 of the seventh lens, and the half field of view HFOV of the optical lens satisfy: CT7/[CT5×tan(HFOV)]=0.46; the curvature radius R12 of the region, near the optical axis, of the image-side surface of the sixth lens and the focal length EFL of the optical lens satisfy: |EFL/R12|=0.11; the curvature radius R13 of the object-side surface of the seventh lens and the focal length EFL of the optical lens satisfy: |EFL/R13|=2.10; the total length TTL of the optical lens and the entrance pupil diameter EPD of the optical lens satisfy: 1.74≤TTL/EPD≤5.25; along the optical axis direction of the optical lens, the spacing d1 between the first lens and the second lens satisfies: 0.05≤d1/dm≤0.16; and the center thickness CT1 of the first lens satisfies: 1.6≤CT1/CTn≤4.89.

According to a second aspect, this application further provides a camera module. The camera module may include an image sensor and the optical lens in any one of the foregoing possible implementations. The image sensor is disposed on an imaging surface of the optical lens, and may be configured to convert an optical signal transferred by the optical lens into an image signal. The camera module can meet photographing requirements in different scenes.

According to a third aspect, this application further provides an electronic device. The electronic device includes a housing and the camera module in the foregoing solutions, and the camera module is fastened to the housing. A light inlet hole is disposed on the housing, and light outside the electronic device can pass through the light inlet hole and enter the electronic device, so that the light is captured by the camera module for imaging. The camera module of the electronic device can meet photographing requirements of different scenes, and has high imaging quality.

REFERENCE NUMERALS

1. electronic device; 100. housing; 200. display screen; 300. circuit board; 400. camera module; 110. middle frame;

120. rear cover; 210. display panel; 220. first cover plate; 310. avoidance space; 1201. light inlet hole;

1202. camera decorating part; 1203. second cover plate; 410. optical lens; 420. module circuit board;

430. image sensor; 440. light filter; 421. sunken groove; 450. support part.

DETAILED DESCRIPTION OF ILLUSTRATIVE EMBODIMENTS

For ease of understanding of an optical lens provided in embodiments of this application, related English abbreviations and noun concepts used in this application are first briefly described:

F-number (F #): an F-number/aperture is a relative value (a reciprocal of a relative aperture) obtained by dividing a focal length of a lens by an entrance pupil diameter of the lens. A smaller aperture F-number indicates a larger amount of light entering the lens within a same unit time. A larger aperture F-number indicates a smaller depth of field and blurring of content in a photographed background. This is similar to effect achieved by a telephoto lens.

An effective focal length (EFL) is an effective focal length of a lens.

A total track length (TTL) is a total length of a lens, and is specifically a distance between an imaging surface and a surface that is of the lens and that is closest to a to-be-photographed body.

A field of view (FOV) is a field of view.

A half FOV (HFOV) is a half field of view.

An entrance pupil diameter (EPD) is an entrance pupil diameter.

A focal power is equal to a difference between an image-side beam convergence degree and an object-side beam convergence degree. A lens with a positive focal power has a positive focal length and may converge light, and a lens with a negative focal power has a negative focal length and may diverge light.

An object side may be understood as a side close to a to-be-photographed object, and an image side may be understood as a side close to an imaging surface.

An object-side surface of a lens is a surface of one side that is of the lens and that is close to a to-be-photographed object, and an image-side surface of the lens is a surface of one side that is of the lens and that is close to an imaging surface.

A region close to an optical axis may be understood as a region that is on a surface of a lens and that is close to the optical axis.

Figure 1:
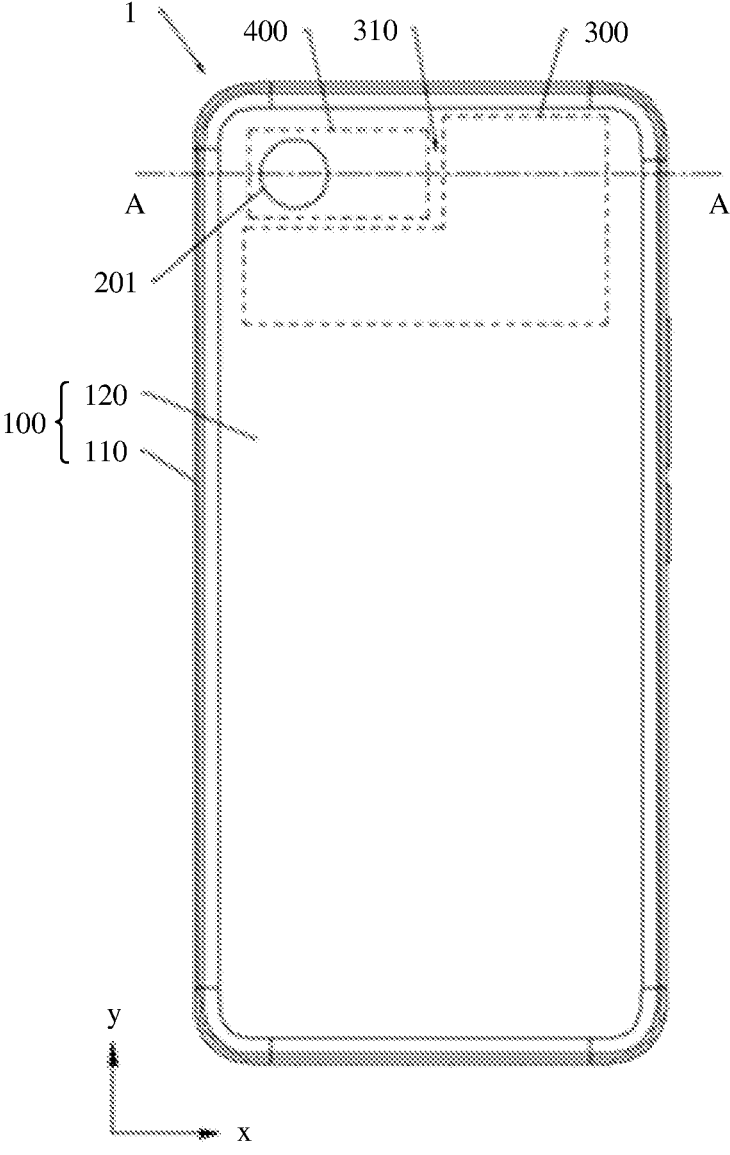
FIG. 1 is a schematic diagram of a structure of an electronic device according to an embodiment of this application.

FIG. 1 is a schematic diagram of a structure of an electronic device according to an embodiment of this application. An electronic device 1 may be a mobile phone, a tablet personal computer, a laptop computer, a personal digital assistant (PDA for short), a camera, a personal computer, a notebook computer, a vehicle-mounted device, a wearable device, augmented reality (AR) glasses, an AR helmet, virtual reality (VR) glasses, a VR helmet, or another form of device with photographing and video recording functions. In the embodiment shown in FIG. 1, descriptions are provided by using an example in which the electronic device is a mobile phone.

Figure 2:
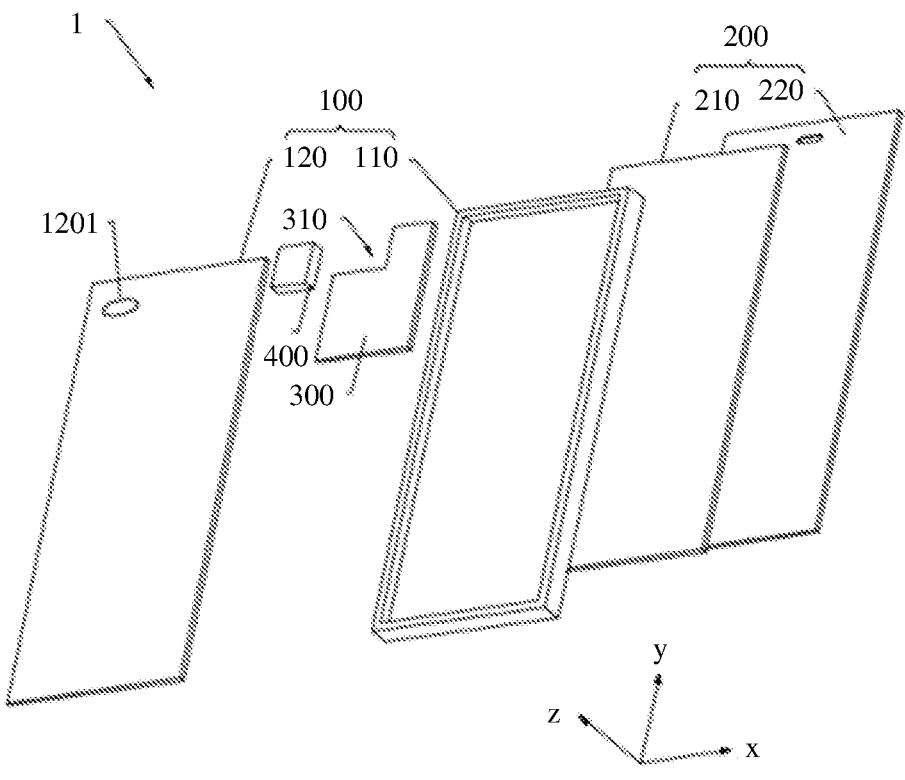
FIG. 2 is a partial schematic exploded view of the electronic device in FIG. 1.

FIG. 2 is a partial schematic exploded view of the electronic device in FIG. 1. Refer to FIG. 1 and FIG. 2. The electronic device 1 may include a housing 100, a display screen 200, a circuit board 300, and a camera module 400. It should be noted that FIG. 1, FIG. 2, and the following related accompanying drawings schematically show only some components included in the electronic device 1 as an example. Actual shapes, actual sizes, actual positions, and actual structures of these components are not limited in FIG. 1, FIG. 2, and the following accompanying drawings.

For ease of description, a width direction of the electronic device 1 is defined as an x axis, a length direction of the electronic device is defined as a y axis, and a thickness direction of the electronic device 1 is defined as a z axis. The x axis, the y axis, and the z axis are perpendicular to each other. It may be understood that a coordinate system of the electronic device 1 may be flexibly set based on a specific actual requirement.

The housing 100 may include a middle frame 110 and a rear cover 120, and the rear cover 120 is fastened to one side of the middle frame 110. In an implementation, the rear cover 120 may be fixedly connected to the middle frame 110 by using adhesive. In another implementation, the rear cover 120 and the middle frame 110 may alternatively form an integrated structure, that is, the rear cover and the middle frame are an integral structure.

In another embodiment, the housing 100 may also include a middle plate (not shown in the figure). The middle plate is connected to an inner side of the middle frame 110, and is disposed opposite to and spaced away from the rear cover 120.

Refer to FIG. 2 again. The display screen 200 is fastened to the other side that is of the middle frame 110 and that is opposite to the rear cover 120. In this case, the display screen 200 is disposed opposite to the rear cover 120. The display screen 200, the middle frame 110, and the rear cover 120 jointly enclose the interior of the electronic device 1. Components of the electronic device 1, for example, the circuit board 300, the camera module 400, a battery, a receiver, and a microphone, may be placed inside the electronic device 1.

In this embodiment, the display screen 200 may be configured to display an image, text, and the like. The display screen 200 may be a flat screen, or may be a curved screen. The display screen 200 includes a display panel 210 and a first cover plate 220. The first cover plate 220 is stacked on one side that is of the display panel 210 and that is away from the middle frame 110. The first cover plate 220 may be disposed close to the display panel 210, and may be mainly configured to protect the display panel 210 and prevent dust. The first cover plate 220 is made of a transparent material, for example, may be made of glass or plastic. The display panel 210 may be a liquid crystal display (LCD) panel, an organic light-emitting diode (OLED) display panel, an active-matrix organic light-emitting diode or active-matrix organic light-emitting diode (AMOLED) display panel, a quantum dot light-emitting diode (QLED) display panel, a micro light-emitting diode (Micro LED) display panel, or the like.

Figure 3:
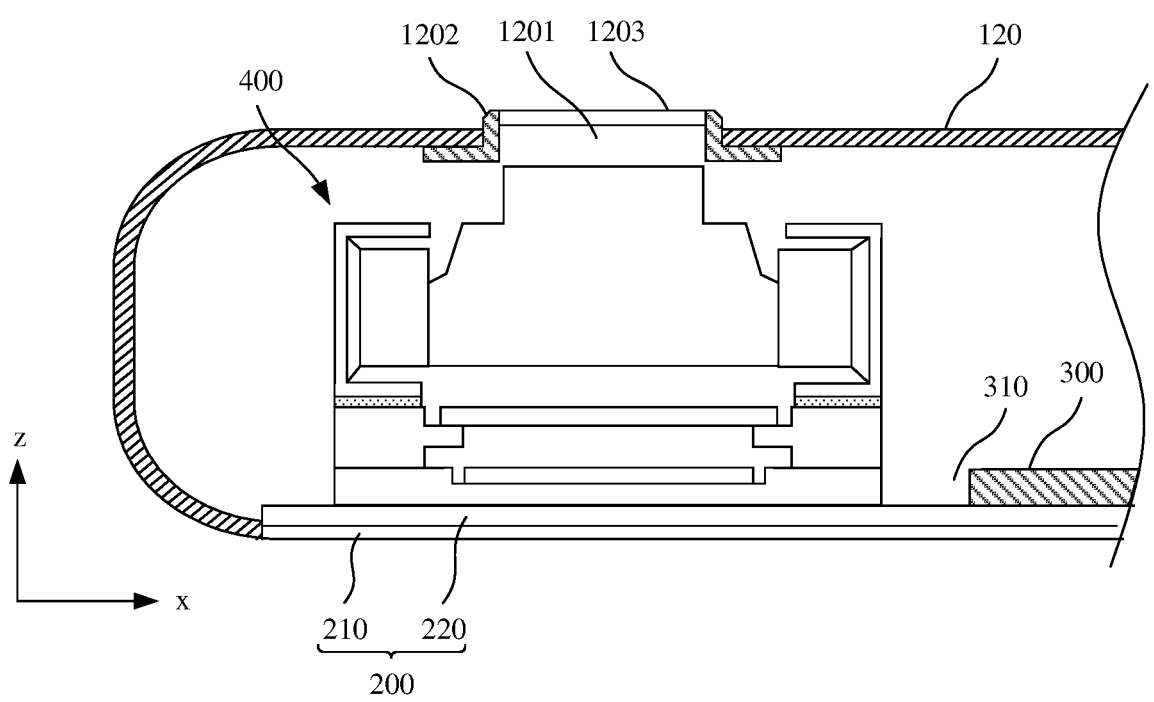
FIG. 3 is a partial sectional view of the electronic device in FIG. 1 at A-A.

FIG. 3 is a partial sectional view of the electronic device in FIG. 1 at A-A. Refer to FIG. 2 and FIG. 3 together, the circuit board 300 is fastened inside the electronic device 1. Specifically, the circuit board 300 may be fastened to one side that is of the display screen 200 and that faces the rear cover 120. In another embodiment, when the middle frame 110 includes the middle plate, the circuit board 300 may be fastened to a surface of one side that is of the middle plate and that faces the rear cover 120. It may be understood that the circuit board 300 may be a rigid circuit board, may be a flexible circuit board, or may be a rigid-flex circuit board. The circuit board 300 may be configured to carry electronic components such as a chip, a capacitor, and an inductor, and may implement electrical connection between the electronic components. The chip may be a central processing unit (CPU), a graphics processing unit (GPU), a digital signal processing (DSPt) chip, a universal flash storage (UFS), or the like.

Still refer to FIG. 2 and FIG. 3. The camera module 400 is fastened in the housing 100, and is configured to enable the electronic device 1 to implement a function such as photographing or video recording. Specifically, the camera module 400 may be fastened to one side that is of the display screen 200 and that faces the rear cover 120. In another embodiment, when the middle frame 110 includes the middle plate, the camera module 400 may alternatively be fastened to a surface of one side that is of the middle plate and that faces the rear cover 120.

In addition, avoidance space 310 may be disposed on the circuit board 300. A shape of the avoidance space 310 may be a shape matching a shape of the camera module 400, for example, a rectangular shape shown in FIG. 2. Certainly, in another implementation, the avoidance space 310 may alternatively be a circular shape, an elliptical shape, another irregular shape, or the like. This is not specifically limited in this application. The camera module 400 is located in the avoidance space 310. In this way, in a z-axis direction, the camera module 400 and the circuit board 300 have an overlapping region, thereby avoiding an increase in thickness of the electronic device 1 caused by stacking of the camera module 400 on the circuit board. In another embodiment, no avoidance space 310 may be disposed on the circuit board 300. In this case, the camera module 400 may be directly stacked on the circuit board 300, or may be spaced from the circuit board 300 by using another support structure.

In this embodiment, the camera module 400 is electrically connected to the circuit board 300. Specifically, the camera module 400 is electrically connected to a CPU by using the circuit board 300. When receiving an instruction of a user, the CPU can send a signal to the camera module 400 by using the circuit board 300, to control the camera module 400 to take an image or record a video. In another embodiment, when no circuit board 300 is disposed on the electronic device 1, the camera module 400 may alternatively directly receive an instruction of a user, and takes an image or records a video based on the instruction of the user.

Refer to FIG. 3 again. A light inlet hole 1201 is disposed on the rear cover 120, and the light inlet hole 1201 may connect the inside of the electronic device 1 to the outside of the electronic device 1. The electronic device 1 further includes a camera decorating part 1202 and a second cover plate 1203. A part of the camera decorating part 1202 may be fastened to an inner surface of the rear cover 120, and a part of the camera decorating part 1202 is in contact with a hole wall of the light inlet hole 1201. The second cover plate 1203 is fixedly connected to an inner wall of the camera decorating part 1202. The camera decorating part 1202 and the second cover plate 1203 separate the inside of the electronic device 1 from the outside of the electronic device 1, to prevent external water or dust from entering the inside of the electronic device 1 through the light inlet hole 1201. The second cover plate 1203 is made of a transparent material, for example, may be made of glass or plastic. Ambient light outside the electronic device 1 can pass through the second cover plate 1203 and enter the electronic device 1. The camera module 400 captures the ambient light that enters the electronic device 1.

It may be understood that a shape of the light inlet hole 1201 is not limited to the circular shape shown in FIG. 1 and FIG. 2. For example, the shape of the light inlet hole 1201 may also be an elliptical shape, another irregular shape, or the like.

In another embodiment, the camera module 400 may also capture ambient light that passes through the rear cover 120. Specifically, the rear cover 120 is made of a transparent material, for example, glass or plastic. A part of a surface that is of the rear cover 120 and that faces the inside of the electronic device 1 is coated with ink, and a part of the surface is not coated with the ink. In this case, a transparent region may be formed in a region that is not coated the ink. When the ambient light enters the electronic device 1 through the transparent region, the camera module 400 may capture the ambient light. In other words, the electronic device 1 in this embodiment may not need to be provided with the light inlet hole, and does not need to be provided with the camera decorating part 1202 and the second cover plate 1203. Therefore, the electronic device 1 has better integrity and low costs.

It should be noted that in some other embodiments, the camera module 400 may be further fastened to one side that is of the rear cover 120 and that faces the display screen 200. In this case, a hole may be disposed on the display panel 210, and light outside the electronic device 1 can sequentially pass through the first cover plate 220 and the hole and enter the electronic device 1, to be captured by the camera module 400 and form an image or a video. In other words, the camera module 400 in this embodiment may be used as a front-facing camera module, or may be used as a rear-facing camera module. Specifically, the camera module 400 may be set based on a function requirement of the electronic device 1. Details are not described herein again.

Figure 4:
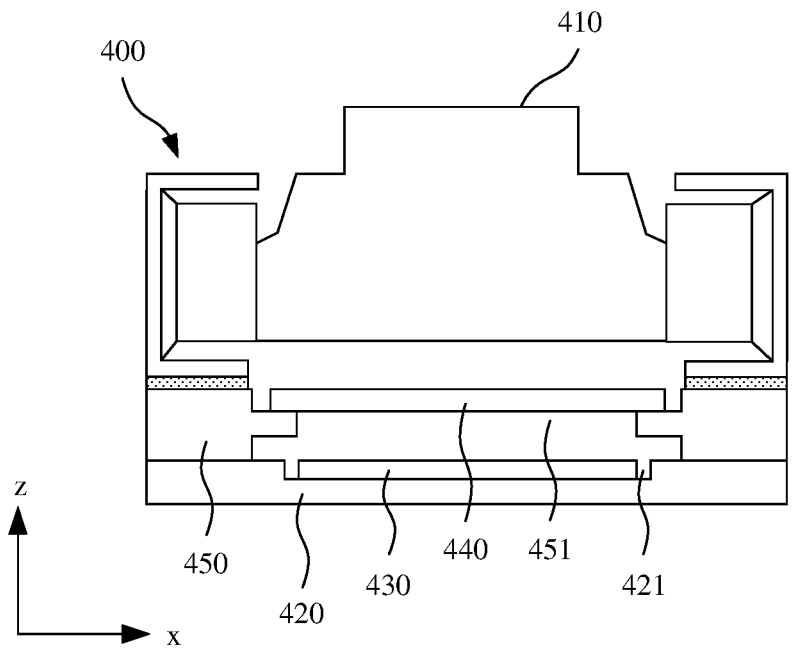
FIG. 4 is a schematic diagram of a structure of a camera module according to an embodiment of this application.

FIG. 4 is a schematic diagram of a structure of a camera module according to an embodiment of this application. The camera module 400 may include an optical lens 410, a module circuit board 420, an image sensor 430, and a light filter 440. It should be noted that an optical axis direction of the optical lens 410 is the same as an optical axis direction of the camera module 400.

The optical lens 410 may be installed between a photographed object (an object surface) and the image sensor 430 (an image surface). The optical lens 410 is configured to form an image (that is, an optical signal) of the photographed object. The image sensor 430 is configured to: convert the image (that is, the optical signal) of the photographed object into an image signal and output the image signal, to implement a photographing or video recording function of the camera module.

The module circuit board 420 is fastened to a light exit side of the optical lens 410, that is, the module circuit board 420 is located on an image side of the optical lens 410. The module circuit board 420 may be electrically connected to a circuit board, so that a signal can be transmitted between the circuit board and the module circuit board 420. It may be understood that the module circuit board 420 may be a rigid circuit board, may be a flexible circuit board, or may be a rigid-flex circuit board. This is not limited in this application.

Still refer to FIG. 4. The image sensor 430 is fastened to one side that is of the module circuit board 420 and that faces the optical lens 410. The image sensor 430 is electrically connected to the module circuit board 420. In this way, after the image sensor 430 captures ambient light, the image sensor 430 generates a signal based on the ambient light, and transmits the signal to the circuit board by using the module circuit board 420. In a specific implementation, the image sensor 430 may be an image sensor such as a metal-oxide-semiconductor element (CMOS) or a charge coupled device (CCD).

In another implementation, an electronic component or a chip (for example, a drive chip) may be further installed on the module circuit board 420. The electronic component or the chip is disposed around the image sensor 430. The electronic component or the chip is used to: assist the image sensor 430 in capturing ambient light, and assist the image sensor 430 in performing signal processing on the captured ambient light.

In another implementation, the module circuit board 420 may be partially provided with a sunken groove 421, and the image sensor 430 may be installed in the sunken groove 421. In this way, the image sensor 430 and the module circuit board 420 have an overlapping region in a z-axis direction. In this case, the camera module 400 may be set to be thin in the z-axis direction.

Still refer to FIG. 4. The light filter 440 is located on one side that is of the image sensor 430 and that faces the optical lens 410. The light filter 440 may be configured to: filter out stray light of the ambient light that passes through the optical lens 410, and propagate ambient light obtained through filtering to the image sensor 430, to ensure that an image taken by the electronic device has better sharpness. The light filter 440 may be, but is not limited to a blue glass light filter. For example, the light filter 440 may alternatively be a reflective infrared light filter or a dual-pass light filter (the dual-pass light filter may allow visible light and infrared light in the ambient light to simultaneously pass through, allow visible light and light of another specified wavelength (for example, ultraviolet light) in the ambient light to simultaneously pass through, or allow infrared light and light of another specified wavelength (for example, ultraviolet light) to simultaneously pass through).

To fasten a position of the light filter 440, the camera module 400 may further include a support part 450 disposed between the optical lens 410 and the module circuit board 420. Two sides of the support part 450 are respectively fixedly connected to the optical lens 410 and the module circuit board 420. A specific fixing manner may be bonding. The light filter 440 may be disposed on one side of the support part 450. A through hole 451 is disposed in a region that corresponds to the image sensor 430 and that is on the support part 450, so that the ambient light can be smoothly emitted into the image sensor 430.

In the camera module, the optical lens is a most important component that affects imaging quality of the camera module. A zoom range, resolution, and a depth of field of the optical lens all affect imaging effect of the optical lens. The depth of field is a distance measured between nearest and farthest objects that are in a sharp image captured by the optical lens, or may be understood as a distance range within which a sharp image can be presented before and after a focus of the optical lens after focusing is completed. The depth of field of the optical lens is related to an aperture. A larger aperture indicates a smaller depth of field, and a smaller aperture indicates a larger depth of field. Therefore, in some photographing scenes, to make both a distant object and a close-up object sharp in a photographed image, a small-aperture optical lens needs to be used for photographing. In other photographing scenes, to highlight a subject in a photographed image, a large-aperture optical lens needs to be used for photographing. However, currently, most optical lenses used in electronic devices such as a mobile phone use a fixed-aperture design, and cannot meet a multi-scene photographing requirement. Therefore, performance of the electronic device in photographing is limited, and further improvement of overall performance of the electronic device is affected.

To resolve the foregoing problems, an embodiment of this application further provides an optical lens. The optical lens uses a variable-aperture structure, and a matching design of a related parameter of the lens is used, so that the optical lens can provide different depth-of-field ranges for different scenes, thereby meeting a multi-scene photographing requirement.

Figure 5:
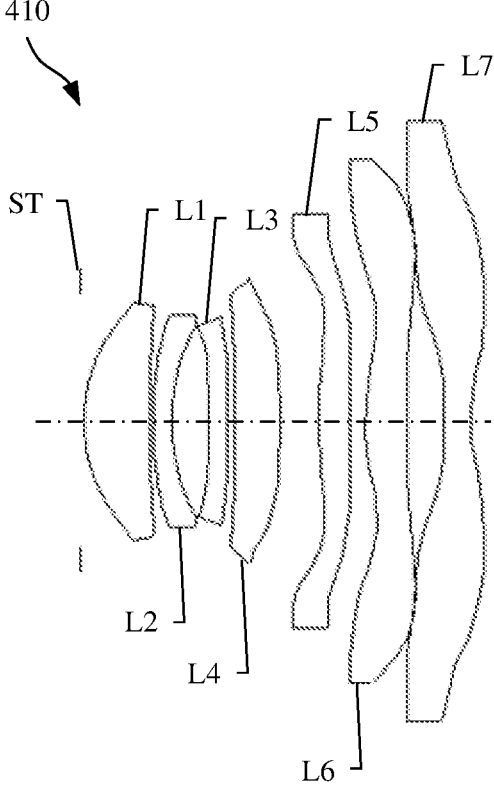
FIG. 5 is a schematic diagram of a structure of an optical lens according to an embodiment of this application.

FIG. 5 is a schematic diagram of a structure of an optical lens according to an embodiment of this application. The optical lens 410 may include a plurality of lenses having a focal power and a variable aperture ST. The variable aperture ST may be disposed on an object side of the plurality of lenses, and a diameter of clear aperture of the variable aperture ST is adjustable. It may be understood that an amount of light entering the optical lens 410 may be adjusted by adjusting the diameter of clear aperture of the variable aperture ST, and an F-number Fno. of the optical lens 410 is adjusted, to adjust a depth of field of the optical lens 410. During specific implementation, the variable aperture ST may use a "cat's eye" aperture, an "iris" aperture, an instantaneous aperture, a shutter aperture, or the like. This is not limited in this application.

For example, there may be seven lenses, and the seven lenses are respectively a first lens L1, a second lens L2, a third lens L3, a fourth lens L4, a fifth lens L5, a sixth lens L6, and a seventh lens L7 from an object side to an image side. During specific implementation, these lenses may be aspheric lenses. This can eliminate an aberration, and help improve imaging quality of the optical lens 410. In this case, each lens may be made of a resin material, to reduce a manufacturing process difficulty and manufacturing costs of the optical lens 410. Certainly, in some other embodiments, each lens may alternatively be made of a glass material; or some lenses are made of a glass material, and some lenses are made of a resin material. Specifically, selection may be performed based on an actual application. This is not limited in this application.

In the lenses of the optical lens 410, the first lens L1 may have a positive focal power, an object-side surface of the first lens L1 is convex near an optical axis, an image-side surface of the first lens L1 is concave near the optical axis, and a focal length f1 of the first lens L1 and a focal length EFL of the optical lens 410 satisfy: 0≤f1/EFL≤1.1.

The second lens L2 may have a negative focal power, an object-side surface of the second lens L2 is convex near the optical axis, and an image-side surface of the second lens L2 is concave near the optical axis. In addition, a curvature radius R3 of a region, near the optical axis, of the object-side surface of the second lens L2 and a curvature radius R4 of a region, near the optical axis, of the image-side surface of the second lens L2 satisfy: 1.8≤(R3+R4)/(R3−R4)≤6.3. This setting helps balance focal power cooperation of the optical lens 410 and shorten a total length TTL of the optical lens 410.

An object-side surface of the third lens L3 is concave near the optical axis, and a focal length f3 of the third lens L3 and a focal length f4 of the fourth lens L4 satisfy: −4≤f3/f4≤−1.3.

A center thickness CT5 of the fifth lens L5, a center thickness CT7 of the seventh lens L7, and a half field of view HFOV of the optical lens 410 satisfy: 0≤CT7/[CT5×tan (HFOV)]≤1.1.

A curvature radius R12 of a region, near the optical axis, of an image-side surface of the sixth lens L6 and the focal length EFL of the optical lens 410 satisfy: 0≤|EFL/ R12|≤0.46, to help the sixth lens L6 better cooperate with another lens.

An object-side surface of the seventh lens L7 is a reverse curved surface. This helps improve image quality of an edge field of view of the camera module. In addition, a curvature radius R13 of an object-side surface of the seventh lens L7 and the focal length EFL of the optical lens 410 satisfy: 0≤|EFL/R13|≤2.2. Such a design helps the seventh lens correct an edge field of view aberration and shortens the total length TTL of the optical lens 410.

The total length TTL of the optical lens 410, a half-image height ImgH that can be formed by the optical lens 410 on an imaging surface of the optical lens 410, and the F-number Fno. of the optical lens 410 satisfy: TTL×Fno./ImgH≥1.8.

The total length TTL of the optical lens 410 and an entrance pupil diameter EPD of the optical lens 410 satisfy: 1.5≤TL/EPD≤10. This can better control an amount of light entering the optical lens 410, and maintain the total length TTL of the optical lens 410.

Along an optical axis direction of the optical lens 410, a spacing between lenses of the optical lens 410 also meets a specific condition. Specifically, a spacing between the first lens L1 and the second lens L2 is defined as d1, a spacing between the second lens L2 and the third lens L3 is defined as d2, a spacing between the third lens L3 and the fourth lens L4 is defined as d3, a spacing between the fourth lens L4 and the fifth lens L5 is defined as d4, a spacing between the fifth lens L5 and the sixth lens L6 is defined as d5, a spacing between the sixth lens L6 and the seventh lens L7 is defined as d7, dm indicates any value of d2, d3, d4, d5, and d6, and d1 and dm satisfy: d1/dm≤1. This spacing cooperation can improve overall mechanical strength of the optical lens 410. It should be noted that the spacing d1 between the first lens L1 and the second lens L2 may be understood as a distance between a center of the image-side surface of the first lens L1 and a center of the object-side surface of the second lens L2 in the optical axis direction. Similarly, for a spacing between other adjacent lenses, refer to a definition of d1. Details are not described herein again.

In addition, a center thickness of the first lens L1 is defined as CT1, a center thickness of the second lens L2 is defined as CT2, a center thickness of the third lens L3 is defined as CT3, a center thickness of the fourth lens L4 is defined as CT4, the center thickness of the fifth lens L5 is defined as CT5, a center thickness of the sixth lens L6 is defined as CT6, the center thickness of the seventh lens L7 is defined as CT7, CTn indicates any value of CT2, CT3, CT4, CT5, CT6, and CT7, and CT1 and CT7 satisfy: CT1/CTn≥1. This thickness combination is combined with the focal power cooperation of the optical lens 410, so that the optical lens 410 can achieve better imaging quality. The center thickness of the lens may be understood as a thickness of a central position of the lens, namely, a thickness of a position at which the optical axis passes through the lens.

As described above, in the optical lens 410 in this embodiment of this application, the F-number Fno. may be adjusted by changing the diameter of clear aperture of the variable aperture ST. Different diameters of clear aperture correspond to different F-numbers Fno., that is, correspond to different depths of field, so that the optical lens 410 can adapt to different photographing scenes. The diameter of clear aperture of the variable aperture ST may be adjusted between a first diameter of clear aperture and a second diameter of clear aperture, and the first diameter of clear aperture is greater than the second diameter of clear aperture. When the diameter of clear aperture of the variable aperture ST is the first diameter of clear aperture, the F-number Fno. of the optical lens 410 is F1, and the optical lens 410 in this state is defined to be in a first imaging mode. When the diameter of clear aperture of the variable aperture ST is the second diameter of clear aperture, the F-number Fno. of the optical lens 410 is F2, and the optical lens 410 in this state is defined to be in a second imaging mode. It may be understood that F1<F2. For example, a value of F1 may be 1.2, and a value of F2 may be 8.0. That is, the value of the F-number Fno. of the optical lens 410 in this embodiment of this application may range from 1.2 to 8.0.

Figure 6A:
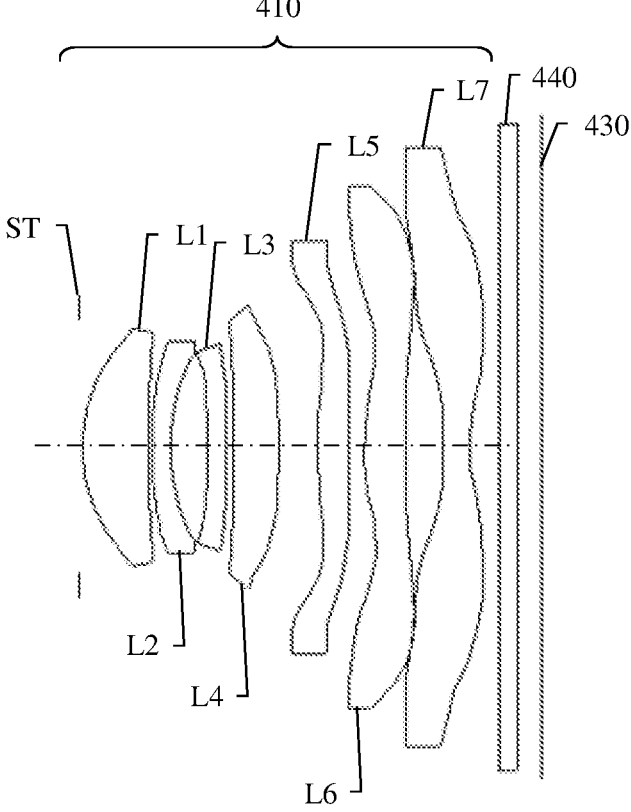
FIG. 6a is a schematic diagram of a structure of a first optical lens in a first imaging mode according to an embodiment of this application.
Figure 6B:
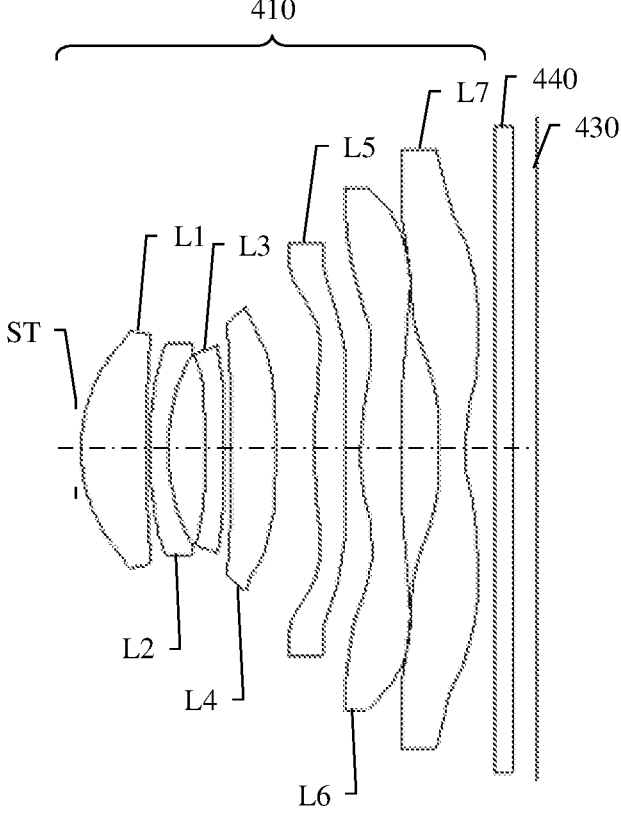
FIG. 6b is a schematic diagram of a structure of a first optical lens in a second imaging mode according to an embodiment of this application.

Refer to FIG. 6a and FIG. 6b together. FIG. 6a is a schematic diagram of a structure of a first optical lens in the first imaging mode according to an embodiment of this application, and FIG. 6b is a schematic diagram of a structure of the first optical lens in the second imaging mode according to an embodiment of this application. When the optical lens 410 is in the first imaging mode, an F-number Fno. of the optical lens 410 is small, and the optical lens 410 has a feature of a large aperture, so that a depth of field may be smaller, a focus may be sharp, and another object in a non-depth-of-field range is blurred. This can better highlight a subject and simplify an image. In addition, using the large aperture means that light entering the optical lens in unit time increases. When image exposure remains unchanged, a shutter speed can be increased in the first imaging mode. In an environment with insufficient light or a dark environment, impact of camera shake of handheld photography on sharpness of the image can be reduced by increasing the shutter speed. This helps the camera module take a night scene image with better effect. When the optical lens 410 is in the second imaging mode, the F-number Fno. of the optical lens 410 is large, and the optical lens 410 has a feature of a small aperture, so that a large depth of field can be obtained, a background or a foreground other than a focused subject can also remain sharp. In addition, the small aperture can reduce an amount of light entering the optical lens 410, and can reduce a shutter speed, and a moving object leaves a moving trace on an image. Therefore, the optical lens 410 may further photograph a scene such as running water, a vehicle track, a star track, or light graffiti in the second imaging mode.

It should be understood that the optical lens 410 provided in this embodiment of this application is not limited to the foregoing two imaging modes. For example, when a diameter of clear aperture of a variable aperture ST is adjusted to another value between a first diameter of clear aperture and a second diameter of clear aperture, the F-number Fno. of the optical lens 410 is correspondingly adjusted to another value between 1.2 and 8.0. For example, a value of the F-number Fno. may alternatively be 2.0, 2.8, 4, 5.6, or the like. In correspondence to each F-number Fno., the optical lens 410 may implement an imaging mode corresponding to the F-number Fno., to adapt to more photographing scenes.

It can be learned from the foregoing descriptions that the optical lens 410 in this embodiment of this application uses a structure design of a variable aperture, to provide different depth-of-field ranges for different scenes, so as to meet a multi-scene photographing requirement. In addition, the optical lens 410 can work with a large image sensor to implement better optical quality, thereby helping improve imaging quality of the camera module.

To facilitate understanding photographing effect of the optical lens 410 provided in this embodiment of this application in different scenes, the following describes in detail imaging effect of the optical lens 410 in the first imaging mode and the second imaging mode with reference to specific embodiments.

Refer to FIG. 6a and FIG. 6b again. The optical lens 410 includes the variable aperture ST and seven lenses each having a focal power. The seven lenses are respectively a first lens L1, a second lens L2, a third lens L3, a fourth lens L4, a fifth lens L5, a sixth lens L6, and a seventh lens L7. The variable aperture ST is located on an object side of the first lens L1. In addition, the light filter 440 of the camera module is located on an image side of the seventh lens L7, and the image sensor 430 is located on an image side of the light filter 440.

In this embodiment, the F-number Fno. of the optical lens 410 satisfies: $1.2 \leq Fno. \leq 4.0$. The F-number Fno. of the optical lens 410 is 1.2 in the first imaging mode. The F-number Fno. of the optical lens 410 is 4.0 in the second imaging mode.

A focal length f1 of the first lens L1 and a focal length EFL of the optical lens 410 satisfy: $f1/EFL=1$.

A focal length f3 of the third lens L3 and a focal length f4 of the fourth lens L4 satisfy: $f3/f4=-1.4$.

A curvature radius R3 of a region, near an optical axis, of an object-side surface of the second lens L2 and a curvature radius R4 of a region, near the optical axis, of an image-side surface of the second lens L2 satisfy: $(R3+R4)/(R3-R4)=5$.

A total length TTL of the optical lens 410, a half-image height ImgH that can be formed by the optical lens 410 on an imaging surface of the optical lens 410, and the F-number Fno. of the optical lens 410 satisfy: $1.9 \leq TTL \times F/ImgH \leq 5.5$.

A center thickness CT5 of the fifth lens L5, a center thickness CT7 of the seventh lens L7, and a half field of view HFOV of the optical lens 410 satisfy: $CT7/[CT5 \times \tan(HFOV)]=0.8$.

A curvature radius R12 of a region, near the optical axis, of an image-side surface of the sixth lens L6 and the focal length EFL of the optical lens 410 satisfy: $|EFL/R12|=0.4$.

A curvature radius R13 of an object-side surface of the seventh lens L7 and the focal length EFL of the optical lens 410 satisfy: $|EFL/R13|=0.3$.

The total length TTL of the optical lens 410 and an entrance pupil diameter EPD of the optical lens 410 satisfy: $1.84 \leq TTL/EPD \leq 4.8$.

Along an optical axis direction of the optical lens 410, a spacing d1 between the first lens L1 and the second lens L2 satisfies: $0.1 \leq d1/dm \leq 0.5$, where dm is a spacing between an $m^{th}$ lens and an $(m+1)^{th}$ lens, m is a natural number, and $2 \leq m \leq 6$.

A center thickness CT1 of the first lens L1 satisfies: $1.4 \leq CT1/CTn \leq 3.5$, where CTn indicates a center thickness of an nth lens, n is a natural number, and $2 \leq n \leq 7$.

For details about other design parameters of the optical lens 410, refer to Table 1.

TABLE 1

| Focal length EFL (mm) | 5.662 |
|---|---|
| F-number | 1.2 to 4.0 |
| Half field of view HFOV | 42.4° |
| Total length TTL of an optical lens (mm) | 7.24 |
| Designed wavelength | 650 nm, 610 nm, 555 nm, 510 nm, and 470 nm |

In this embodiment of this application, all lenses of the optical lens 410 may be aspheric lenses. In other words, the optical lens 410 includes 14 aspheric surfaces in total. Refer to Table 2 and Table 3 together. Table 2 shows a curvature radius, a thickness, a refractive index, and an Abbe coefficient of each lens in the optical lens 410, and Table 3 shows an aspheric coefficient of each lens. In Table 2 and Table 3, S1 and S2 respectively represent an object-side surface and an image-side surface of the first lens, S3 and S4 respectively represent the object-side surface and the image-side surface of the second lens, S5 and S6 respectively represent an object-side surface and an image-side surface of the third lens, S7 and S8 respectively represent an object-side surface and an image-side surface of the fourth lens, S9 and S10 respectively represent an object-side surface and an image-side surface of the fifth lens, S11 and S12 respectively represent an object-side surface and the image-side surface of the sixth lens, and S13 and S14 respectively represent the object-side surface and an image-side surface of the seventh lens.

TABLE 2

|  | Description | Curvature radius | | Thickness | Refractive index | | | Abbe coefficient |
|---|---|---|---|---|---|---|---|---|
| ST | Variable aperture | Infinity | d0 | 0.06 | — | — | — | — |
| S1 | First lens | 2.541 | CT1 | 1.036 | n1 | 1.55 | V1 | 55.93 |
| S2 |  | 11.699 | d1 | 0.053 |  |  |  |  |
| S3 | Second lens | 4.920 | CT2 | 0.300 | n2 | 1.67 | V2 | 19.24 |
| S4 |  | 3.267 | d2 | 0.575 |  |  |  |  |
| S5 | Third lens | −40.604 | CT3 | 0.300 | n3 | 1.67 | V3 | 19.24 |
| S6 |  | 26.041 | d3 | 0.101 |  |  |  |  |
| S7 | Fourth lens | 9.364 | CT4 | 0.719 | n4 | 1.55 | V4 | 55.93 |
| S8 |  | −932.259 | d4 | 0.623 |  |  |  |  |
| S9 | Fifth lens | 8.392 | CT5 | 0.480 | n5 | 1.57 | V5 | 37.40 |
| S10 |  | 18.223 | d5 | 0.247 |  |  |  |  |
| S11 | Sixth lens | 5.018 | CT6 | 0.661 | n6 | 1.55 | V6 | 55.93 |
| S12 |  | −16.139 | d6 | 0.574 |  |  |  |  |
| S13 | Seventh lens | −17.515 | CT7 | 0.420 | n7 | 1.54 | V7 | 55.66 |
| S14 |  | −26.093 | — | — |  |  |  |  |

TABLE 3

|  | Type | $r_o$ | K | A0 | A1 | A2 | A3 | A4 | A5 | A6 |
|---|---|---|---|---|---|---|---|---|---|---|
| S1 | Extended aspheric surface | 1.890 | 0.000 | −2.52E−02 | −1.44E−02 | −6.21E−03 | −1.44E−03 | −4.54E−04 | 3.20E−05 | −3.46E−05 |
| S2 | Extended aspheric surface | 1.813 | 0.000 | −8.83E−02 | 1.30E−02 | −8.63E−03 | 2.05E−03 | −1.04E−03 | 3.30E−04 | −1.38E−04 |
| S3 | Extended aspheric surface | 1.688 | 0.000 | −5.90E−02 | 4.21E−02 | −3.05E−03 | 2.66E−03 | −6.73E−04 | 2.35E−04 | −7.65E−05 |
| S4 | Extended aspheric surface | 1.489 | 0.000 | 9.57E−04 | 1.79E−02 | 1.20E−03 | 9.59E−04 | 9.40E−05 | 4.00E−05 | 2.33E−05 |
| S5 | Extended aspheric surface | 1.499 | 0.000 | 1.26E−01 | −3.59E−03 | −9.58E−05 | 1.04E−03 | −1.34E−04 | 1.10E−04 | −7.11E−05 |
| S6 | Extended aspheric surface | 1.648 | 0.000 | −1.78E−01 | 2.60E−02 | 8.01E−04 | 2.64E−03 | −5.36E−04 | 8.99E−05 | −7.39E−05 |
| S7 | Extended aspheric surface | 2.007 | 0.000 | −3.45E−01 | 7.78E−02 | −7.23E−03 | 9.95E−07 | −2.89E−03 | 4.42E−04 | 1.72E−05 |
| S8 | Extended aspheric surface | 2.264 | 0.000 | −5.54E−01 | 7.43E−02 | 1.66E−02 | −1.00E−03 | −5.81E−03 | −3.48E−03 | −9.91E−04 |
| S9 | Extended aspheric surface | 2.945 | 0.000 | −1.07E+00 | 4.93E−02 | 1.11E−01 | 9.99E−03 | −2.71E−02 | −1.14E−02 | 6.40E−03 |
| S10 | Extended aspheric surface | 3.275 | 0.000 | −8.53E−01 | 2.25E−01 | 1.15E−02 | −1.15E−02 | −2.55E−03 | −7.42E−03 | 9.20E−03 |
| S11 | Extended aspheric surface | 3.880 | 0.000 | −2.48E+00 | 4.87E−01 | −5.51E−02 | −8.47E−02 | 8.36E−02 | −4.06E−02 | 1.07E−02 |
| S12 | Extended aspheric surface | 4.144 | 0.000 | 4.12E−01 | −5.44E−01 | 1.55E−01 | −7.84E−02 | 4.53E−02 | −1.97E−02 | 2.52E−02 |
| S13 | Extended aspheric surface | 4.493 | 0.000 | −5.76E−01 | −2.96E−01 | −7.61E−02 | −2.03E−01 | 1.41E−01 | 1.78E−01 | 1.52E−01 |
| S14 | Extended aspheric surface | 4.750 | 0.000 | 5.30E−01 | 2.70E−01 | 6.31E−01 | −3.24E−01 | 2.09E−01 | 1.48E−01 | 4.03E−02 |

|  | Type | R | K | A7 | A8 | A9 | A10 | A11 | A12 | A13 |
|---|---|---|---|---|---|---|---|---|---|---|
| S1 | Extended aspheric surface | 1.890 | 0.000 | 2.51E−05 | −2.34E−05 | 4.03E−07 | −6.77E−06 | 9.54E−06 | 1.82E−07 | 0.00E+00 |
| S2 | Extended aspheric surface | 1.813 | 0.000 | 1.00E−05 | −1.96E−05 | 2.42E−06 | 2.50E−06 | 0.00E+00 | 0.00E+00 | 0.00E+00 |
| S3 | Extended aspheric surface | 1.688 | 0.000 | 1.95E−06 | −2.22E−05 | −9.13E−06 | −1.24E−05 | 1.71E−07 | 0.00E+00 | 0.00E+00 |
| S4 | Extended aspheric surface | 1.489 | 0.000 | −1.41E−06 | 8.78E−06 | −8.46E−07 | 3.77E−06 | −3.02E−06 | 0.00E+00 | 0.00E+00 |
| S5 | Extended aspheric surface | 1.499 | 0.000 | 4.67E−05 | −2.11E−05 | 2.23E−05 | −1.11E−05 | 6.57E−06 | 2.48E−08 | 0.00E+00 |
| S6 | Extended aspheric surface | 1.648 | 0.000 | 6.18E−05 | −1.50E−05 | 9.83E−06 | 0.00E+00 | 0.00E+00 | 0.00E+00 | 0.00E+00 |

TABLE 3-continued

| S7 | Extended aspheric surface | 2.007 | 0.000 | −5.87E−05 | −1.59E−04 | 0.00E+00 | 0.00E+00 | 0.00E+00 | 0.00E+00 | 0.00E+00 |
|----|---------------------------|-------|-------|-----------|-----------|----------|----------|----------|----------|----------|
| S8 | Extended aspheric surface | 2.264 | 0.000 | −8.20E−05 | 2.01E−05 | −1.10E−05 | −1.68E−05 | −2.90E−05 | −6.28E−07 | 0.00E+00 |
| S9 | Extended aspheric surface | 2.945 | 0.000 | 3.92E−03 | −1.45E−03 | −1.44E−03 | 1.41E−04 | 1.89E−04 | 1.77E−06 | 0.00E+00 |
| S10 | Extended aspheric surface | 3.275 | 0.000 | −4.35E−03 | −6.60E−04 | 4.63E−04 | 1.08E−03 | −9.48E−04 | 1.83E−04 | 1.29E−04 |
| S11 | Extended aspheric surface | 3.880 | 0.000 | −1.73E−03 | 4.28E−04 | −2.14E−03 | 2.93E−03 | −1.94E−03 | 6.05E−04 | −1.28E−04 |
| S12 | Extended aspheric surface | 4.144 | 0.000 | −7.93E−03 | 4.97E−03 | −7.29E−03 | 1.54E−03 | −8.63E−04 | 5.72E−04 | 2.60E−05 |
| S13 | Extended aspheric surface | 4.493 | 0.000 | 3.03E−02 | 5.57E−03 | −1.95E−03 | −1.21E−02 | −2.18E−02 | −8.44E−03 | 2.34E−03 |
| S14 | Extended aspheric surface | 4.750 | 0.000 | 1.49E−02 | 5.59E−02 | −4.03E−03 | −5.69E−03 | −3.30E−04 | −2.90E−07 | 0.00E+00 |

In the 14 aspheric surfaces of the optical lens 410 shown in Table 3, surface types z of all the extended aspheric surfaces may be defined according to, but not limited to, the following aspheric surface formula:

$$z = \frac{cr^2}{1 + \sqrt{1 - (K+1)c^2 r^2}} + u^4 \sum_{x=0}^{13} A_x Q_x^{con}(u^2)$$

Herein, z indicates a vector height of the aspheric surface, r indicates a normalized radial coordinate of the aspheric surface, r is equal to a result obtained by dividing an actual radial coordinate of the aspheric surface by a normalized radius $r_o$, c indicates a spherical curvature of a vertex of the aspheric surface, K indicates a conic constant, Ax indicates an aspheric coefficient, $$Q_x^{con}$$

is an aspheric polynomial, $$Q_x^{con}(u^2) = P_x^{(0,4)}(2u - 1),$$

and Px indicates a Jacobi polynomial.

The optical lens shown in FIG. 6a and FIG. 6b is simulated. A simulation result of the optical lens is described in detail below with reference to accompanying drawings.

Figure 7A:
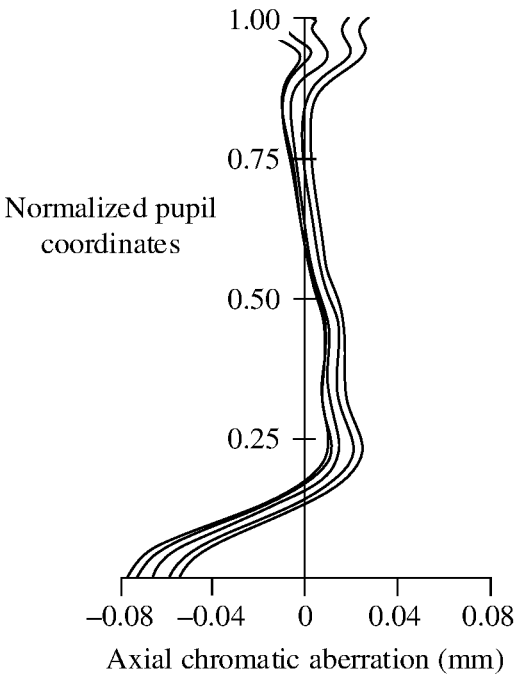
FIG. 7a is a diagram of axial chromatic aberration curves of a first optical lens in a first imaging mode according to an embodiment of this application.

FIG. 7a is a diagram of axial chromatic aberration curves of the first optical lens in the first imaging mode according to an embodiment of this application. Along a direction away from a coordinate origin, values of scales on a vertical coordinate axis are successively 0.25, 0.50, 0.75, and 1.00. Simulation results of depth of focus positions of colored light with wavelengths of 650 nm, 610 nm, 555 nm, 510 nm, and 470 nm are separately shown in the figure. It can be learned that an axial chromatic aberration of the optical lens in the first imaging mode is controlled to fall within a very small range.

Figure 7B:
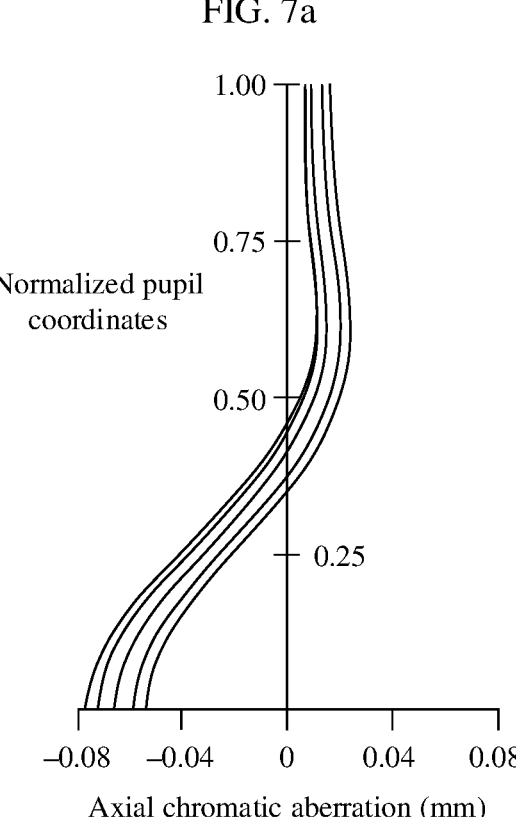
FIG. 7b is a diagram of axial chromatic aberration curves of a first optical lens in a second imaging mode according to an embodiment of this application.

FIG. 7b is a diagram of axial chromatic aberration curves of the first optical lens in the second imaging mode according to an embodiment of this application. Along a direction away from a coordinate origin, values of scales on a vertical coordinate axis are successively 0.25, 0.50, 0.75, and 1.00. Simulation results of depth of focus positions of colored light with wavelengths of 650 nm, 610 nm, 555 nm, 510 nm, and 470 nm are separately shown in the figure. It can be learned that an axial chromatic aberration of the optical lens in the second imaging mode is controlled to fall within a very small range.

Figures 8A, 8B:
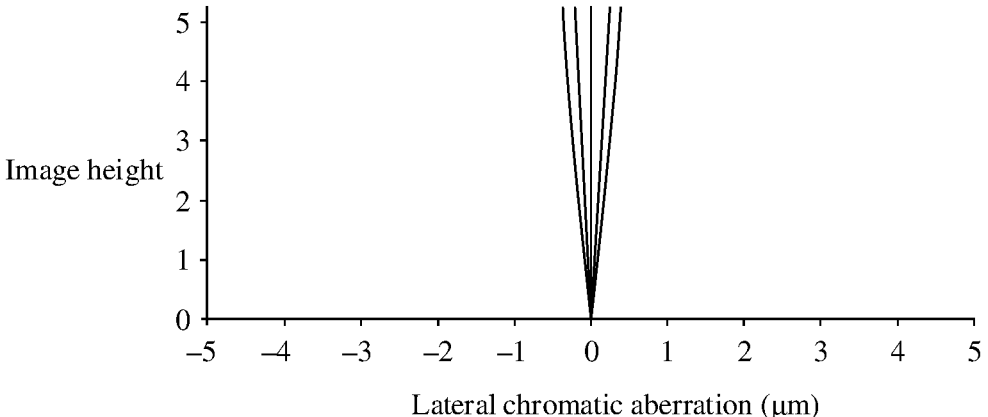
FIG. 8a is a diagram of lateral chromatic aberration curves of a first optical lens in a first imaging mode according to an embodiment of this application.
FIG. 8b is a diagram of lateral chromatic aberration curves of a first optical lens in a second imaging mode according to an embodiment of this application.

FIG. 8a is a diagram of lateral chromatic aberration curves of the first optical lens in the first imaging mode according to an embodiment of this application. Five solid curves in the figure respectively indicate the colored light with the wavelengths of 650 nm, 610 nm, 555 nm, 510 nm, and 470 nm. It can be learned that a lateral chromatic aberration of the optical lens in the first imaging mode is controlled to fall within a very small range.

FIG. 8b is a diagram of lateral chromatic aberration curves of the first optical lens in the second imaging mode according to an embodiment of this application. Five solid curves in the figure respectively indicate the colored light with the wavelengths of 650 nm, 610 nm, 555 nm, 510 nm, and 470 nm. It can be learned that a lateral chromatic aberration of the optical lens in the second imaging mode is controlled to fall within a very small range.

Figure 9A:
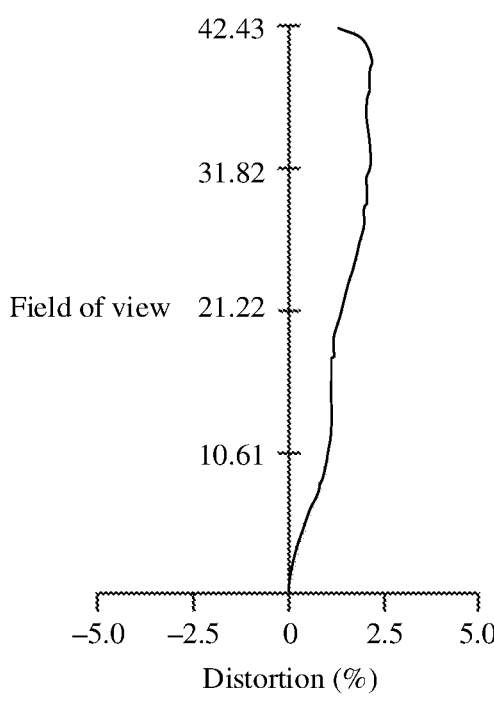
FIG. 9a is a diagram of an optical distortion curve of a first optical lens in a first imaging mode according to an embodiment of this application.

FIG. 9a is a diagram of an optical distortion curve of the first optical lens in the first imaging mode according to an embodiment of this application, and shows a difference between imaging deformation and an ideal shape. It can be learned that in this mode, an optical distortion can be basically controlled to fall within a range less than 2.5%.

Figure 9B:
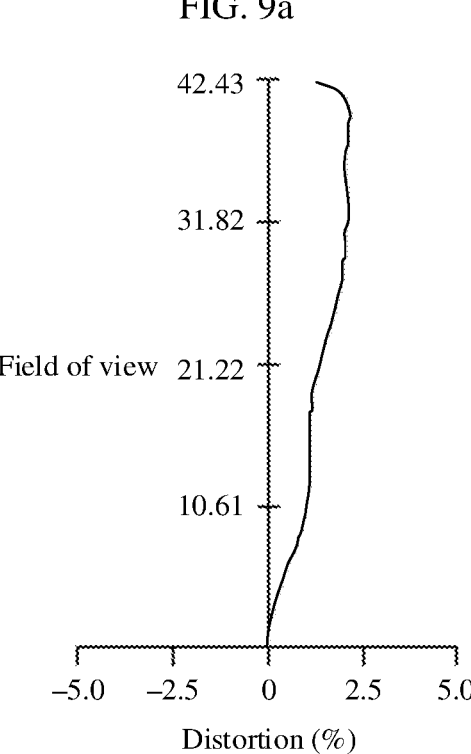
FIG. 9b is a diagram of an optical distortion curve of a first optical lens in a second imaging mode according to an embodiment of this application.

FIG. 9b is a diagram of an optical distortion curve of the first optical lens in the second imaging mode according to an embodiment of this application, and shows a difference between imaging deformation and an ideal shape. It can be learned that in this mode, an optical distortion can be basically controlled to fall within a range less than 2.5%.

Figure 10A:
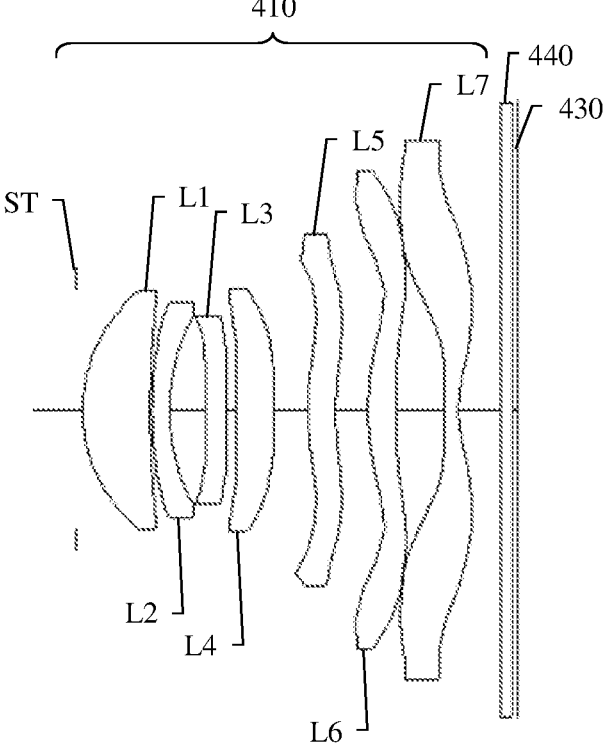
FIG. 10a is a schematic diagram of a structure of a second optical lens in a first imaging mode according to an embodiment of this application.
Figure 10B:
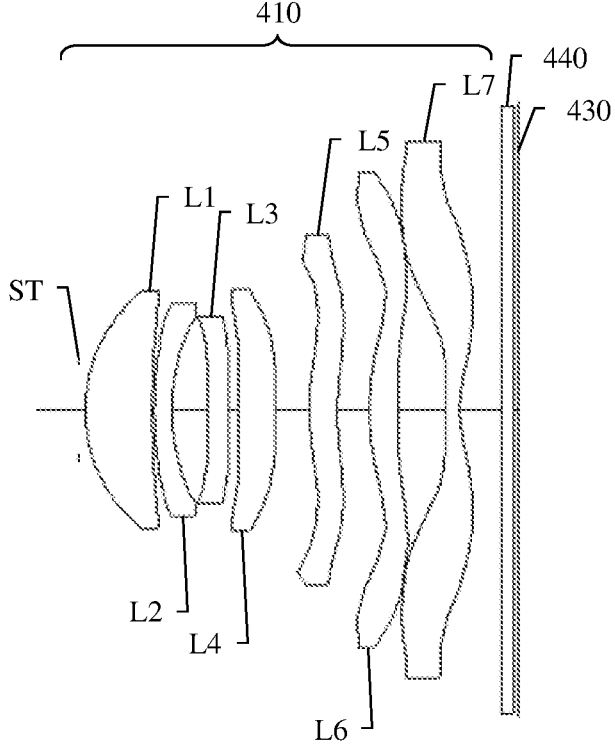
FIG. 10b is a schematic diagram of a structure of a second optical lens in a second imaging mode according to an embodiment of this application.

Refer to FIG. 10a and FIG. 10b together. FIG. 10a is a schematic diagram of a structure of a second optical lens in the first imaging mode according to an embodiment of this application, and FIG. 10b is a schematic diagram of a structure of the second camera module in the second imaging mode according to an embodiment of this application. The optical lens 410 includes a variable aperture ST and seven lenses each having a focal power. The seven lenses are respectively a first lens L1, a second lens L2, a third lens L3, a fourth lens L4, a fifth lens L5, a sixth lens L6, and a seventh lens L7. The variable aperture ST is located on an object side of the first lens L1. In addition, the light filter 440 of the camera module is located on an image side of the seventh lens L7, and the image sensor 430 is located on an image side of the light filter 440.

In this embodiment, an F-number Fno. of the optical lens 410 satisfies: 1.2≤Fno.≤4.0. The F-number Fno. of the optical lens 410 is 1.2 in the first imaging mode. The F-number Fno. of the optical lens 410 is 4.0 in the second imaging mode.

A focal length f1 of the first lens L1 and a focal length EFL of the optical lens 410 satisfy: f1/EFL=0.98.

A focal length f3 of the third lens L3 and a focal length f4 of the fourth lens L4 satisfy: f3/f4=−1.64.

A curvature radius R3 of a region, near an optical axis, of an object-side surface of the second lens L2 and a curvature radius R4 of a region, near the optical axis, of an image-side surface of the second lens L2 satisfy: (R3+R4)/(R3−R4) =3.68.

A total length TTL of the optical lens 410, a half-image height ImgH that can be formed by the optical lens 410 on an imaging surface of the optical lens 410, and the F-number Fno. of the optical lens 410 satisfy: 2.0≤TTL×Fno./ ImgH≤5.6.

A center thickness CT5 of the fifth lens L5, a center thickness CT7 of the seventh lens L7, and a half field of view HFOV of the optical lens 410 satisfy: CT7/[CT5×tan (HFOV)]=0.42.

A curvature radius R12 of a region, near the optical axis, of an image-side surface of the sixth lens L6 and the focal length EFL of the optical lens 410 satisfy: |EFL/R12|=0.32.

A curvature radius R13 of an object-side surface of the seventh lens L7 and the focal length EFL of the optical lens 410 satisfy: |EFL/R13|=0.37.

The total length TTL of the optical lens 410 and an entrance pupil diameter EPD of the optical lens 410 satisfy: 1.84≤TTL/EPD≤9.80.

Along an optical axis direction of the optical lens 410, a spacing d1 between the first lens L1 and the second lens L2 satisfies: 0.04≤d1/dm≤0.21, where dm is a spacing between an $m^{th}$ lens and an $(m+1)^{th}$ lens, m is a natural number, and 2≤m≤6.

A center thickness CT1 of the first lens L1 satisfies: 1.78≤CT1/CTn≤5.00, where CTn indicates a center thickness of an $n^{th}$ lens, n is a natural number, and 2≤n≤7.

For details about other design parameters of the optical lens 410, refer to Table 4.

TABLE 4

| Focal length EFL (mm) | 6.009 |
|---|---|
| F-number | 1.2 to 4.0 |
| Half field of view HFOV | 41.4° |
| Total length TTL of an optical lens (mm) | 7.4 |
| Designed wavelength | 650 nm, 610 nm, 555 nm, 510 nm, and 470 nm |

In this embodiment of this application, all lenses of the optical lens 410 may be aspheric lenses. In other words, the optical lens 410 includes 14 aspheric surfaces in total. Refer to Table 5 and Table 6 together. Table 5 shows a curvature radius, a thickness, a refractive index, and an Abbe coefficient of each lens in the optical lens 410, and Table 6 shows an aspheric coefficient of each lens. In Table 5 and Table 6, S1 and S2 respectively represent an object-side surface and an image-side surface of the first lens, S3 and S4 respectively represent the object-side surface and the image-side surface of the second lens, S5 and S6 respectively represent an object-side surface and an image-side surface of the third lens, S7 and S8 respectively represent an object-side surface and an image-side surface of the fourth lens, S9 and S10 respectively represent an object-side surface and an image-side surface of the fifth lens, S11 and S12 respectively represent an object-side surface and the image-side surface of the sixth lens, and S13 and S14 respectively represent the object-side surface and an image-side surface of the seventh lens.

TABLE 5

|  | Description | Curvature radius | | Thickness | Refractive index | | Abbe coefficient |
|---|---|---|---|---|---|---|---|
| ST | Variable aperture | Infinity | d0 | 0.1 | — | — | — |
| S1 | First lens | 2.619 | CT1 | 1.139 | n1 | 1.55 V1 | 55.93 |
| S2 |  | 11.795 | d1 | 0.036 |  |  |  |
| S3 | Second lens | 5.173 | CT2 | 0.300 | n2 | 1.67 V2 | 19.24 |
| S4 |  | 3.320 | d2 | 0.619 |  |  |  |
| S5 | Third lens | −316.996 | CT3 | 0.343 | n3 | 1.67 V3 | 19.24 |
| S6 |  | 22.757 | d3 | 0.173 |  |  |  |
| S7 | Fourth lens | 20.456 | CT4 | 0.642 | n4 | 1.55 V4 | 55.93 |
| S8 |  | −21.122 | d4 | 0.568 |  |  |  |
| S9 | Fifth lens | 3.819 | CT5 | 0.469 | n5 | 1.57 V5 | 37.40 |
| S10 |  | 4.044 | d5 | 0.541 |  |  |  |
| S11 | Sixth lens | 5.177 | CT6 | 0.511 | n6 | 1.55 V6 | 55.93 |
| S12 |  | −13.372 | d6 | 0.798 |  |  |  |
| S13 | Seventh lens | 8.820 | CT7 | 0.228 | n7 | 1.54 V7 | 55.66 |
| S14 |  | 1.818 | — | — |  |  |  |

TABLE 6

|  | Type | $r_o$ | K | A0 | A1 | A2 | A3 | A4 | A5 | A6 |
|---|---|---|---|---|---|---|---|---|---|---|
| S1 | Extended aspheric surface | 2.028 | 0.000 | 9.62E−03 | −3.36E−03 | −2.94E−03 | −1.29E−03 | −6.19E−04 | −1.96E−04 | −2.70E−05 |
| S2 | Extended aspheric surface | 1.931 | 0.000 | −5.15E−02 | 1.68E−02 | −7.62E−03 | 9.62E−04 | −1.33E−03 | 6.78E−04 | 3.62E−05 |
| S3 | Extended aspheric surface | 1.821 | 0.000 | −6.66E−02 | 4.09E−02 | −1.98E−03 | 1.50E−03 | −1.10E−03 | 4.03E−04 | 2.24E−05 |
| S4 | Extended aspheric surface | 1.632 | 0.000 | −4.19E−03 | 2.03E−02 | 2.80E−03 | 6.39E−04 | −4.63E−04 | −3.47E−04 | −2.44E−04 |
| S5 | Extended aspheric surface | 1.612 | 0.000 | −1.76E−01 | −9.92E−04 | 2.80E−03 | 4.93E−04 | −3.99E−04 | −2.40E−04 | −1.01E−04 |
| S6 | Extended aspheric surface | 1.598 | 0.000 | −1.58E−01 | 1.06E−02 | 4.38E−03 | 1.04E−03 | 2.01E−04 | 4.40E−05 | 3.26E−05 |

TABLE 6-continued

| | Type | R | K | A0 | A1 | A2 | A3 | A4 | A5 | A6 |
|---|---|---|---|---|---|---|---|---|---|---|
| S7 | Extended aspheric surface | 1.881 | 0.000 | -2.25E-01 | 2.98E-02 | 9.27E-03 | -9.63E-04 | -1.83E-03 | -5.17E-05 | 1.11E-04 |
| S8 | Extended aspheric surface | 2.105 | 0.000 | -3.99E-01 | 3.19E-02 | 9.18E-03 | 2.46E-03 | -1.38E-03 | -4.35E-04 | -2.76E-04 |
| S9 | Extended aspheric surface | 2.714 | 0.000 | -1.41E+00 | 8.58E-02 | 4.59E-04 | 9.57E-03 | -2.25E-03 | 2.57E-03 | 2.18E-04 |
| S10 | Extended aspheric surface | 3.073 | 0.000 | -1.82E+00 | 2.77E-01 | -3.38E-02 | -2.04E-03 | -1.72E-03 | 5.22E-03 | -3.09E-04 |
| S11 | Extended aspheric surface | 4.055 | 0.000 | -2.53E+00 | 3.95E-01 | 1.01E-01 | -1.54E-01 | 7.04E-02 | -3.83E-03 | -1.52E-02 |
| S12 | Extended aspheric surface | 4.346 | 0.000 | 4.90E-01 | -5.05E-01 | 3.10E-01 | -1.14E-01 | 8.47E-02 | -4.52E-02 | 2.93E-03 |
| S13 | Extended aspheric surface | 4.532 | 0.000 | -2.69E+00 | 1.22E+00 | -6.22E-01 | 2.98E-01 | -1.35E-01 | 3.35E-02 | -6.52E-03 |
| S14 | Extended aspheric surface | 4.705 | -1.000 | -8.04E+00 | 2.12E+00 | -6.32E-01 | 2.23E-01 | -1.41E-01 | 7.17E-02 | -3.27E-02 |

| | Type | R | K | A7 | A8 | A9 | A10 | A11 | A12 | A13 |
|---|---|---|---|---|---|---|---|---|---|---|
| S1 | Extended aspheric surface | 2.028 | 0.000 | 6.83E-05 | 6.14E-05 | 4.75E-05 | 2.24E-05 | 1.13E-05 | 0.00E+00 | 0.00E+00 |
| S2 | Extended aspheric surface | 1.931 | 0.000 | 2.11E-04 | 2.41E-05 | 3.89E-05 | -4.43E-06 | 0.00E+00 | 0.00E+00 | 0.00E+00 |
| S3 | Extended aspheric surface | 1.821 | 0.000 | 1.54E-04 | 4.03E-05 | 4.35E-05 | 1.19E-05 | 7.59E-06 | 0.00E+00 | 0.00E+00 |
| S4 | Extended aspheric surface | 1.632 | 0.000 | -1.40E-04 | -7.80E-05 | -3.66E-05 | -1.72E-05 | -5.84E-06 | 0.00E+00 | 0.00E+00 |
| S5 | Extended aspheric surface | 1.612 | 0.000 | -2.89E-05 | -1.96E-05 | -1.50E-05 | -9.13E-06 | -2.28E-06 | 0.00E+00 | 0.00E+00 |
| S6 | Extended aspheric surface | 1.598 | 0.000 | 5.80E-06 | -2.88E-06 | 4.02E-06 | 0.00E+00 | 0.00E+00 | 0.00E+00 | 0.00E+00 |
| S7 | Extended aspheric surface | 1.881 | 0.000 | 2.42E-05 | -3.64E-05 | -1.22E-05 | 0.00E+00 | 0.00E+00 | 0.00E+00 | 0.00E+00 |
| S8 | Extended aspheric surface | 2.105 | 0.000 | -1.23E-04 | -5.47E-05 | -2.69E-05 | 0.00E+00 | 0.00E+00 | 0.00E+00 | 0.00E+00 |
| S9 | Extended aspheric surface | 2.714 | 0.000 | -8.11E-04 | -1.54E-04 | -2.91E-05 | 8.52E-05 | 0.00E+00 | 0.00E+00 | 0.00E+00 |
| S10 | Extended aspheric surface | 3.073 | 0.000 | -1.86E-03 | 6.08E-04 | -1.83E-05 | 9.37E-05 | -1.10E-04 | 2.28E-05 | 1.03E-05 |
| S11 | Extended aspheric surface | 4.055 | 0.000 | 1.15E-03 | 6.93E-03 | -4.70E-03 | 7.60E-05 | 2.49E-04 | -1.03E-04 | -1.60E-04 |
| S12 | Extended aspheric surface | 4.346 | 0.000 | 9.35E-05 | 1.34E-03 | -3.94E-03 | 8.19E-04 | -1.65E-03 | 5.23E-04 | 5.16E-04 |
| S13 | Extended aspheric surface | 4.532 | 0.000 | 6.85E-03 | -3.80E-03 | 3.29E-03 | -1.65E-03 | -3.98E-04 | 8.65E-04 | -6.31E-04 |
| S14 | Extended aspheric surface | 4.705 | -1.000 | 1.36E-02 | -6.71E-03 | 6.55E-03 | -2.30E-03 | -4.14E-04 | -4.50E-04 | 5.41E-04 |

In the 14 aspheric surfaces of the optical lens 410 shown in Table 6, surface types z of all the extended aspheric surfaces may be defined according to, but not limited to, the following aspheric surface formula:

$$z = \frac{cr^2}{1+\sqrt{1-(K+1)c^2r^2}} + u^4\sum_{x=0}^{13}A_x Q_x^{con}(u^2)$$

Herein, z indicates a vector height of the aspheric surface, r indicates a normalized radial coordinate of the aspheric surface, r is equal to a result obtained by dividing an actual radial coordinate of the aspheric surface by a normalized radius $r_o$, c indicates a spherical curvature of a vertex of the aspheric surface, K indicates a conic constant, Ax indicates an aspheric coefficient, $$Q_x^{con}$$

is an aspheric polynomial, $$Q_x^{con}(u^2) = P_x^{(0,4)}(2u-1),$$

and Px indicates a Jacobi polynomial.

The optical lens shown in FIG. 10a and FIG. 10b is simulated. A simulation result of the optical lens is described in detail below with reference to accompanying drawings.

Figure 11A:
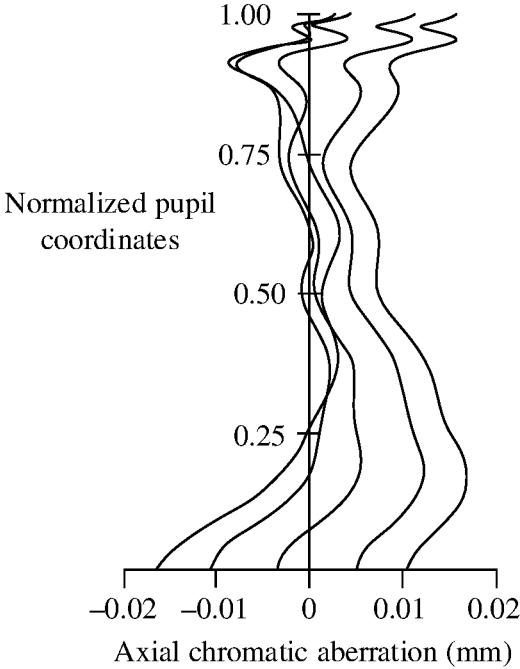
FIG. 11a is a diagram of axial chromatic aberration curves of a second optical lens in a first imaging mode according to an embodiment of this application.

FIG. 11a is a diagram of axial chromatic aberration curves of a second optical lens in the first imaging mode according to an embodiment of this application. Along a direction away from a coordinate origin, values of scales on a vertical coordinate axis are successively 0.25, 0.50, 0.75, and 1.00. Simulation results of depth of focus positions of colored light with wavelengths of 650 nm, 610 nm, 555 nm, 510 nm, and 470 nm are separately shown in the figure. It can be learned that an axial chromatic aberration of the optical lens in the first imaging mode is controlled to fall within a very small range.

Figure 11B:
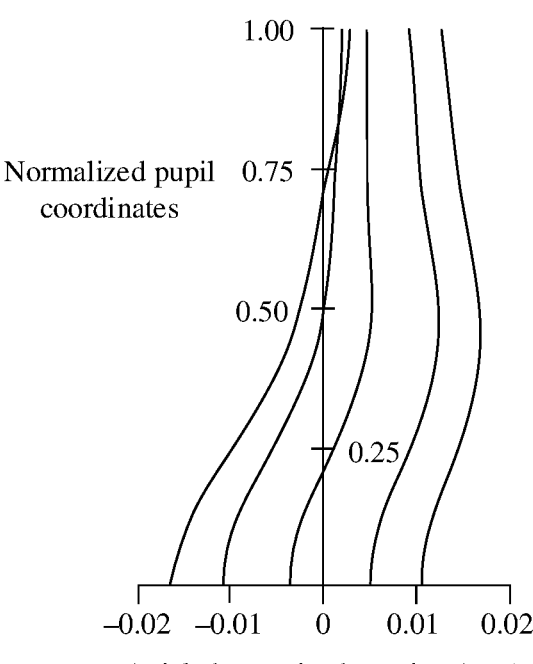
FIG. 11b is a diagram of axial chromatic aberration curves of a second optical lens in a second imaging mode according to an embodiment of this application.

FIG. 11b is a diagram of axial chromatic aberration curves of the second optical lens in the second imaging mode according to an embodiment of this application. Along a direction away from a coordinate origin, values of scales on a vertical coordinate axis are successively 0.25, 0.50, 0.75, and 1.00. Simulation results of depth of focus positions of colored light with wavelengths of 650 nm, 610 nm, 555 nm, 510 nm, and 470 nm are separately shown in the figure. It can be learned that an axial chromatic aberration of the optical lens in the second imaging mode is controlled to fall within a very small range.

Figure 12A:
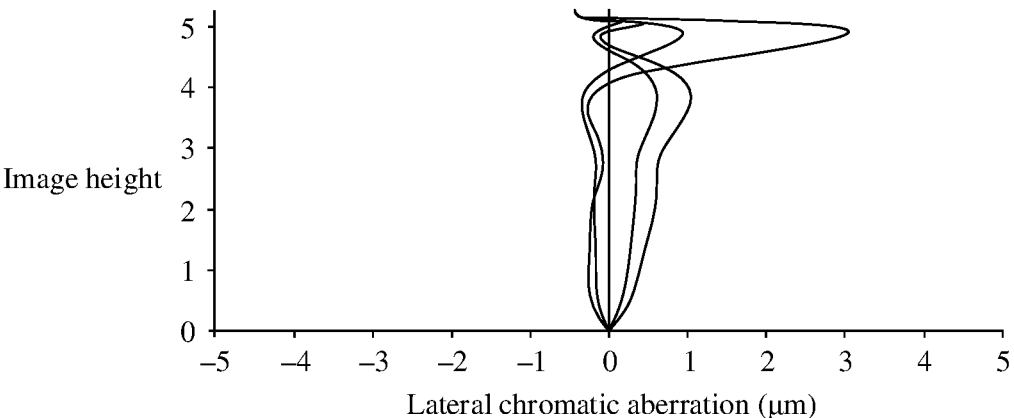
FIG. 12a is a diagram of lateral chromatic aberration curves of a second optical lens in a first imaging mode according to an embodiment of this application.

FIG. 12a is a diagram of lateral chromatic aberration curves of the second optical lens in the first imaging mode according to an embodiment of this application. Five solid curves in the figure respectively indicate the colored light with the wavelengths of 650 nm, 610 nm, 555 nm, 510 nm, and 470 nm. It can be learned that a lateral chromatic aberration of the optical lens in the first imaging mode is controlled to fall within a very small range.

Figure 12B:
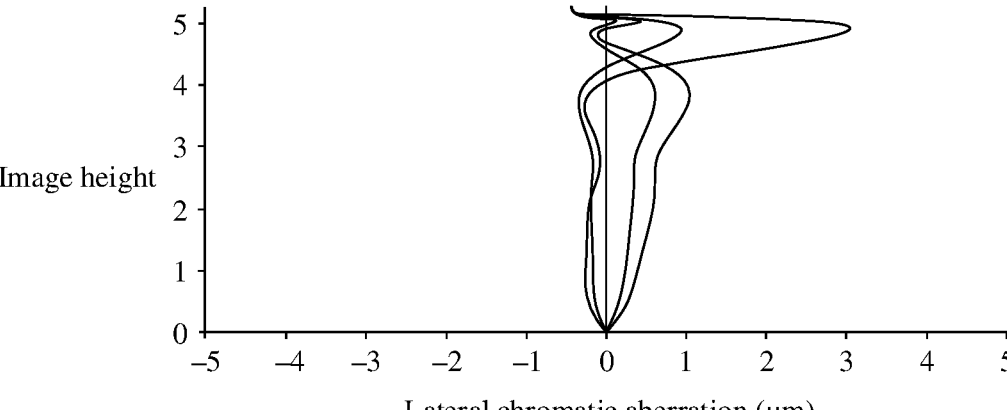
FIG. 12b is a diagram of lateral chromatic aberration curves of a second optical lens in a second imaging mode according to an embodiment of this application.

FIG. 12b is a diagram of lateral chromatic aberration curves of the second optical lens in the second imaging mode according to an embodiment of this application. Five solid curves in the figure respectively indicate the colored light with the wavelengths of 650 nm, 610 nm, 555 nm, 510 nm, and 470 nm. It can be learned that a lateral chromatic aberration of the optical lens in the second imaging mode is controlled to fall within a very small range.

Figure 13A:
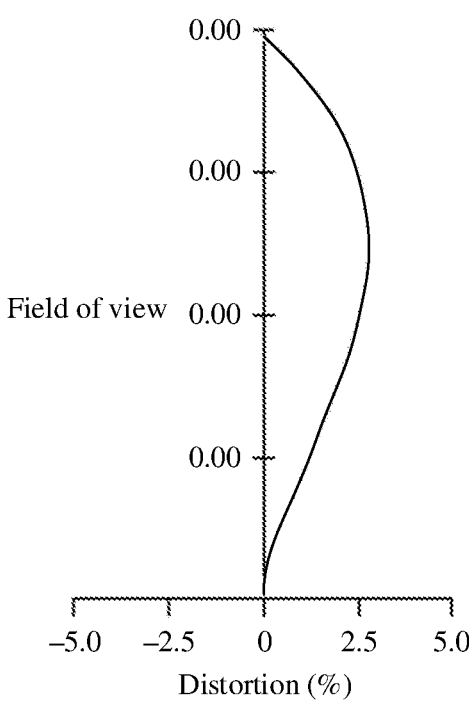
FIG. 13a is a diagram of an optical distortion curve of a second optical lens in a first imaging mode according to an embodiment of this application.

FIG. 13a is a diagram of an optical distortion curve of the second optical lens in the first imaging mode according to an embodiment of this application, and shows a difference between imaging deformation and an ideal shape. It can be learned that in this mode, an optical distortion can be basically controlled to fall within a range less than 2.5%.

Figure 13B:
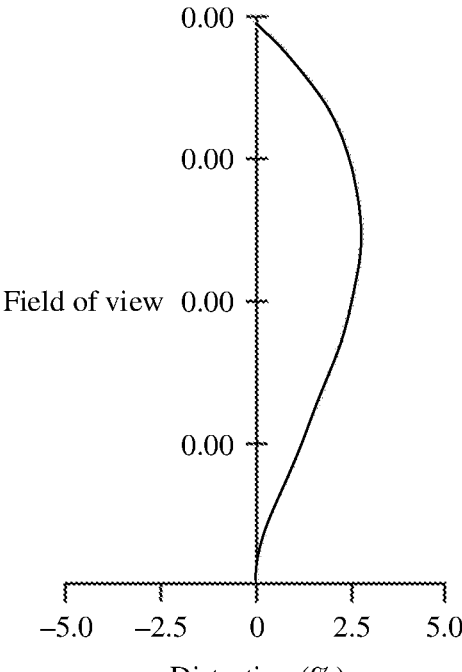
FIG. 13b is a diagram of an optical distortion curve of a second optical lens in a second imaging mode according to an embodiment of this application.

FIG. 13b is a diagram of an optical distortion curve of the second optical lens in the second imaging mode according to an embodiment of this application, and shows a difference between imaging deformation and an ideal shape. It can be learned that in this mode, an optical distortion can be basically controlled to fall within a range less than 2.5%.

Figure 14A:
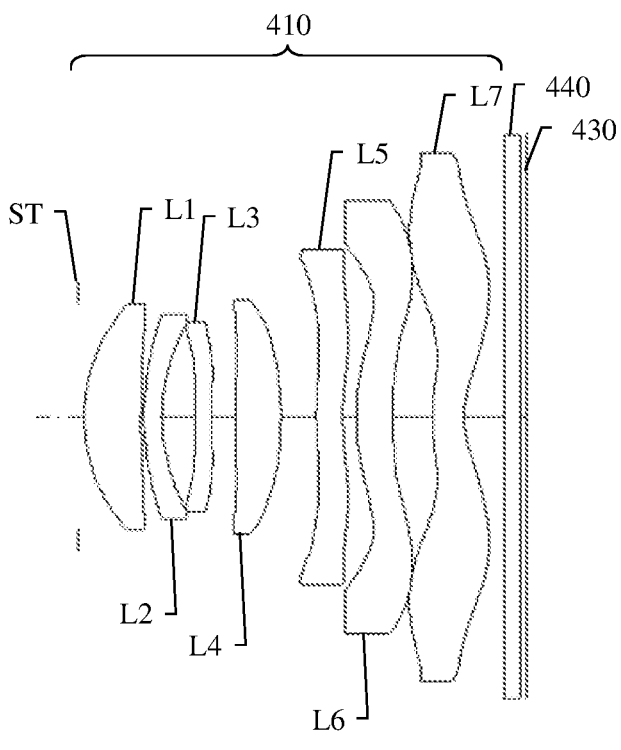
FIG. 14a is a schematic diagram of a structure of a third optical lens in a first imaging mode according to an embodiment of this application.
Figure 14B:
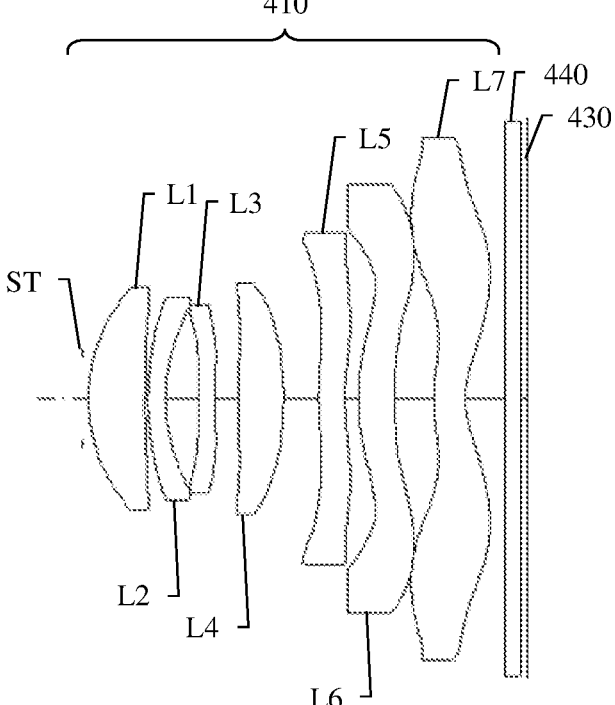
FIG. 14b is a schematic diagram of a structure of a third optical lens in a second imaging mode according to an embodiment of this application.

Refer to FIG. 14a and FIG. 14b together. FIG. 14a is a schematic diagram of a structure of a third optical lens in the first imaging mode according to an embodiment of this application, and FIG. 14b is a schematic diagram of a structure of the third optical lens in the second imaging mode according to an embodiment of this application. The optical lens 410 includes a variable aperture ST and seven lenses each having a focal power. The seven lenses are respectively a first lens L1, a second lens L2, a third lens L3, a fourth lens L4, a fifth lens L5, a sixth lens L6, and a seventh lens L7. The variable aperture ST is located on an object side of the first lens L1. In addition, the light filter 440 of the camera module is located on an image side of the seventh lens L7, and the image sensor 430 is located on an image side of the light filter 440.

In this embodiment, an F-number Fno. of the optical lens 410 satisfies: $1.2 \leq Fno. \leq 4.0$. The F-number Fno. of the optical lens 410 is 1.2 in the first imaging mode. The F-number Fno. of the optical lens 410 is 4.0 in the second imaging mode.

A focal length f1 of the first lens L1 and a focal length EFL of the optical lens 410 satisfy: $f1/EFL=1.1$.

A focal length f3 of the third lens L3 and a focal length f4 of the fourth lens L4 satisfy: $f3/f4=-4$.

A curvature radius R3 of a region, near an optical axis, of an object-side surface of the second lens L2 and a curvature radius R4 of a region, near the optical axis, of an image-side surface of the second lens L2 satisfy: $(R3+R4)/(R3-R4)=5.73$.

A total length TTL of the optical lens 410, a half-image height ImgH that can be formed by the optical lens 410 on an imaging surface of the optical lens 410, and the F-number Fno. of the optical lens 410 satisfy: $2.33 \leq TTL \times F/ImgH \leq 6.24$.

A center thickness CT5 of the fifth lens L5, a center thickness CT7 of the seventh lens L7, and a half field of view HFOV of the optical lens 410 satisfy: $CT7/[CT5 \times \tan(HFOV)]=1$.

A curvature radius R12 of a region, near the optical axis, of an image-side surface of the sixth lens L6 and the focal length EFL of the optical lens 410 satisfy: $|EFL/R12|=0.39$.

A curvature radius R13 of an object-side surface of the seventh lens L7 and the focal length EFL of the optical lens 410 satisfy: $|EFL/R13|=2.19$.

The total length TTL of the optical lens 410 and an entrance pupil diameter EPD of the optical lens 410 satisfy: $1.96 \leq TTL/EPD \leq 5.33$.

Along an optical axis direction of the optical lens 410, a spacing d1 between the first lens L1 and the second lens L2 satisfies: $0.07 \leq d1/dm \leq 0.22$, where dm is a spacing between an mth lens and an (m+1)th lens, m is a natural number, and $2 \leq m \leq 6$.

A center thickness CT1 of the first lens L1 satisfies: $1.25 \leq CT1/CTn \leq 5.00$, where CTn indicates a center thickness of an nth lens, n is a natural number, and $2 \leq n \leq 7$.

For details about other design parameters of the optical lens 410, refer to Table 7.

TABLE 7

| | |
|---|---|
| Focal length EFL (mm) | 6.095 |
| F-number | 1.2 to 4.0 |
| Half field of view HFOV | 39.8° |
| Total length TTL of an optical lens (mm) | 8 |
| Designed wavelength | 650 nm, 610 nm, 555 nm, 510 nm, and 470 nm |

In this embodiment of this application, all lenses of the optical lens 410 may be aspheric lenses. In other words, the optical lens 410 includes 14 aspheric surfaces in total. Refer to Table 8 and Table 9 together. Table 8 shows a curvature radius, a thickness, a refractive index, and an Abbe coefficient of each lens in the optical lens 410, and Table 9 shows an aspheric coefficient of each lens. In Table 8 and Table 9, S1 and S2 respectively represent an object-side surface and an image-side surface of the first lens, S3 and S4 respectively represent the object-side surface and the image-side surface of the second lens, S5 and S6 respectively represent an object-side surface and an image-side surface of the third lens, S7 and S8 respectively represent an object-side surface and an image-side surface of the fourth lens, S9 and S10 respectively represent an object-side surface and an image-side surface of the fifth lens, S11 and S12 respectively represent an object-side surface and the image-side surface of the sixth lens, and S13 and S14 respectively represent the object-side surface and an image-side surface of the seventh lens.

TABLE 8

| | Description | Curvature radius | Thickness | | Refractive index | | Abbe coefficient | |
|---|---|---|---|---|---|---|---|---|
| ST | Variable aperture | Infinity | do | 0.1 | — | — | — | — |
| S1 | First lens | 3.053 | CT1 | 1.030 | n1 | 1.55 | V1 | 55.93 |
| S2 | | 16.213 | d1 | 0.053 | | | | |
| S3 | Second lens | 4.257 | CT2 | 0.323 | n2 | 1.67 | V2 | 19.24 |
| S4 | | 2.992 | d2 | 0.606 | | | | |
| S5 | Third lens | 29.096 | CT3 | 0.300 | n3 | 1.67 | V3 | 19.24 |
| S6 | | 13.839 | d3 | 0.425 | | | | |
| S7 | Fourth lens | 18.274 | CT4 | 0.822 | n4 | 1.55 | V4 | 55.93 |
| S8 | | −7.443 | d4 | 0.644 | | | | |
| S9 | Fifth lens | 8.011 | CT5 | 0.480 | n5 | 1.57 | V5 | 37.40 |
| S10 | | 6.461 | d5 | 0.247 | | | | |
| S11 | Sixth lens | 6.650 | CT6 | 0.660 | n6 | 1.55 | V6 | 55.93 |
| S12 | | 15.825 | d6 | 0.711 | | | | |
| S13 | Seventh lens | 2.789 | CT7 | 0.576 | n7 | 1.54 | V7 | 55.66 |
| S14 | | 1.576 | — | | — | | | |

TABLE 9

| | Type | $r_o$ | K | A0 | A1 | A2 | A3 | A4 | A5 | A6 |
|---|---|---|---|---|---|---|---|---|---|---|
| S1 | Extended aspheric surface | 1.990 | 0.000 | −1.09E−03 | −4.05E−03 | −1.98E−03 | −6.93E−04 | −2.95E−04 | −9.91E−05 | −4.10E−05 |
| S2 | Extended aspheric surface | 2.000 | 0.000 | −5.92E−02 | 6.17E−03 | −8.48E−03 | 1.73E−03 | −1.32E−03 | 8.22E−04 | 4.04E−05 |
| S3 | Extended aspheric surface | 1.858 | 0.000 | −1.14E−01 | 3.34E−02 | −2.74E−03 | 3.15E−03 | −8.75E−04 | 6.22E−04 | 1.82E−05 |
| S4 | Extended aspheric surface | 1.860 | 0.000 | −1.09E−01 | 2.44E−02 | 2.07E−03 | 1.70E−03 | 7.88E−04 | v3.20E−04 | −2.07E−04 |
| S5 | Extended aspheric surface | 1.684 | 0.000 | −2.79E−01 | 4.98E−03 | 1.97E−03 | 9.82E−04 | −1.92E−04 | −1.64E−04 | −8.80E−05 |
| S6 | Extended aspheric surface | 1.712 | 0.000 | −2.46E−01 | 1.83E−02 | 3.38E−03 | 1.00E−03 | −1.15E−04 | 6.89E−05 | 2.21E−05 |
| S7 | Extended aspheric surface | 2.054 | 0.000 | −1.63E−01 | 1.05E−02 | 5.66E−03 | 1.03E−03 | −4.44E−04 | −3.44E−04 | −1.31E−04 |
| S8 | Extended aspheric surface | 2.240 | 0.000 | −2.96E−01 | 1.78E−02 | 9.97E−03 | 5.55E−03 | 7.32E−04 | −8.39E−04 | −5.66E−04 |
| S9 | Extended aspheric surface | 2.916 | 0.000 | −9.43E−01 | 1.19E−01 | −2.10E−02 | 1.02E−02 | 3.19E−03 | −4.27E−03 | 7.51E−04 |
| S10 | Extended aspheric surface | 3.140 | 0.000 | −9.72E−01 | 1.92E−01 | −2.06E−02 | −1.36E−02 | 1.61E−02 | −9.97E−03 | 4.83E−03 |
| S11 | Extended aspheric surface | 4.104 | 0.000 | −2.54E+00 | 1.45E−01 | 2.45E−01 | −1.72E−01 | 4.95E−02 | −4.85E−03 | 2.31E−03 |
| S12 | Extended aspheric surface | 4.683 | 0.000 | −1.41E+00 | −4.92E−01 | 2.27E−01 | −8.19E−02 | 8.47E−02 | −2.18E−02 | −1.38E−02 |
| S13 | Extended aspheric surface | 4.723 | −1.000 | −5.48E+00 | 1.88E+00 | −8.06E−01 | 3.05E−01 | −1.21E−01 | 3.24E−02 | −1.02E−02 |
| S14 | Extended aspheric surface | 4.804 | −1.000 | −9.16E+00 | 2.14E+00 | −6.26E−01 | 1.89E−01 | −1.20E−01 | 5.71E−02 | −3.15E−02 |

| | Type | R | K | A7 | A8 | A9 | A10 | A11 | A12 | A13 |
|---|---|---|---|---|---|---|---|---|---|---|
| S1 | Extended aspheric surface | 1.990 | 0.000 | 2.19E−06 | 2.01E−06 | 4.40E−06 | 2.68E−06 | 1.75E−06 | 0.00E+00 | 0.00E+00 |
| S2 | Extended aspheric surface | 2.000 | 0.000 | 2.23E−04 | −9.72E−06 | 2.37E−05 | −7.14E−06 | 0.00E+00 | 0.00E+00 | 0.00E+00 |
| S3 | Extended aspheric surface | 1.858 | 0.000 | 1.96E−04 | 3.95E−05 | 4.25E−05 | 8.94E−06 | 1.03E−05 | 0.00E+00 | 0.00E+00 |
| S4 | Extended aspheric surface | 1.860 | 0.000 | −8.85E−05 | −8.31E−05 | −7.75E−05 | −4.84E−05 | −1.90E−05 | 0.00E+00 | 0.00E+00 |
| S5 | Extended aspheric surface | 1.684 | 0.000 | −2.65E−05 | −6.86E−06 | −3.87E−06 | −2.95E−06 | −7.81E−07 | 0.00E+00 | 0.00E+00 |
| S6 | Extended aspheric surface | 1.712 | 0.000 | −9.96E−06 | −6.34E−08 | −2.59E−06 | 0.00E+00 | 0.00E+00 | 0.00E+00 | 0.00E+00 |
| S7 | Extended aspheric surface | 2.054 | 0.000 | −8.21E−05 | −2.11E−05 | −6.98E−06 | 0.00E+00 | 0.00E+00 | 0.00E+00 | 0.00E+00 |
| S8 | Extended aspheric surface | 2.240 | 0.000 | −4.26E−04 | −1.53E−04 | −5.54E−05 | 0.00E+00 | 0.00E+00 | 0.00E+00 | 0.00E+00 |
| S9 | Extended aspheric surface | 2.916 | 0.000 | −1.00E−03 | 7.51E−04 | 7.67E−05 | 1.63E−04 | 0.00E+00 | 0.00E+00 | 0.00E+00 |
| S10 | Extended aspheric surface | 3.140 | 0.000 | −2.71E−03 | 1.20E−03 | −5.10E−04 | 1.39E−04 | −7.64E−05 | 5.29E−06 | 3.15E−06 |
| S11 | Extended aspheric surface | 4.104 | 0.000 | −6.01E−03 | 6.31E−03 | −2.17E−03 | −2.74E−03 | −1.19E−03 | 1.31E−03 | 5.53E−04 |
| S12 | Extended aspheric surface | 4.683 | 0.000 | −4.90E−03 | −1.98E−03 | 6.42E−03 | 2.93E−05 | −1.08E−04 | −1.35E−03 | −3.10E−04 |

TABLE 9-continued

| S13 | Extended aspheric surface | 4.723 | −1.000 | 6.43E−03 | −4.22E−03 | 4.03E−03 | −7.65E−04 | 2.12E−04 | 5.04E−04 | −1.71E−04 |
| S14 | Extended aspheric surface | 4.804 | −1.000 | 1.12E−02 | −4.60E−03 | 2.95E−03 | −1.80E−03 | 6.42E−04 | −2.36E−04 | 1.98E−04 |

In the 14 aspheric surfaces of the optical lens 410 shown in Table 9, surface types z of all the extended aspheric surfaces may be defined according to, but not limited to, the following aspheric surface formula:

$$z = \frac{cr^2}{1 + \sqrt{1 - (K+1)c^2 r^2}} + u^4 \sum_{x=0}^{13} A_x Q_x^{con}(u^2)$$

Herein, z indicates a vector height of the aspheric surface, r indicates a normalized radial coordinate of the aspheric surface, r is equal to a result obtained by dividing an actual radial coordinate of the aspheric surface by a normalized radius R, c indicates a spherical curvature of a vertex of the aspheric surface, K indicates a conic constant, Ax indicates an aspheric coefficient, $$Q_x^{con}$$

is an aspheric polynomial, $$Q_x^{con}(u^2) = P_x^{(0,4)}(2u - 1),$$

and Px indicates a Jacobi polynomial.

The optical lens shown in FIG. 14*a* and FIG. 14*b* is simulated. A simulation result of the optical lens is described in detail below with reference to accompanying drawings.

Figure 15A:
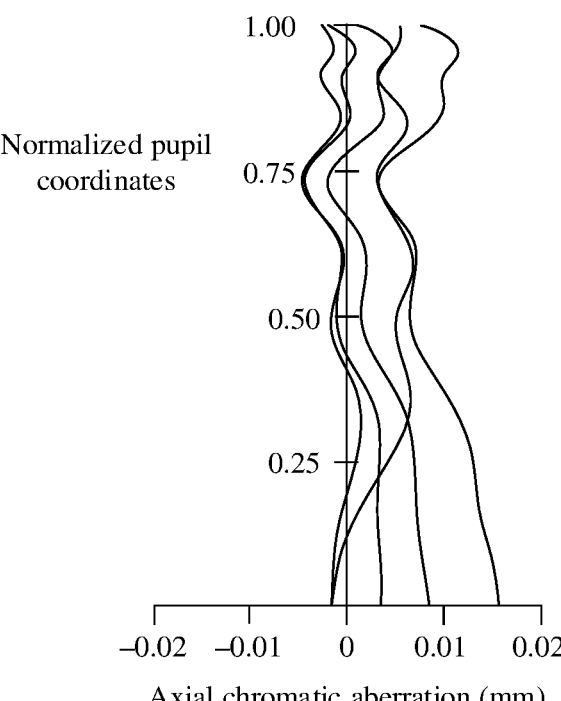
FIG. 15a is a diagram of axial chromatic aberration curves of a third optical lens in a first imaging mode according to an embodiment of this application.

FIG. 15*a* is a diagram of axial chromatic aberration curves of the third optical lens in the first imaging mode according to an embodiment of this application. Along a direction away from a coordinate origin, values of scales on a vertical coordinate axis are successively 0.25, 0.50, 0.75, and 1.00. Simulation results of depth of focus positions of colored light with wavelengths of 650 nm, 610 nm, 555 nm, 510 nm, and 470 nm are separately shown in the figure. It can be learned that an axial chromatic aberration of the optical lens in the first imaging mode is controlled to fall within a very small range.

Figure 15B:
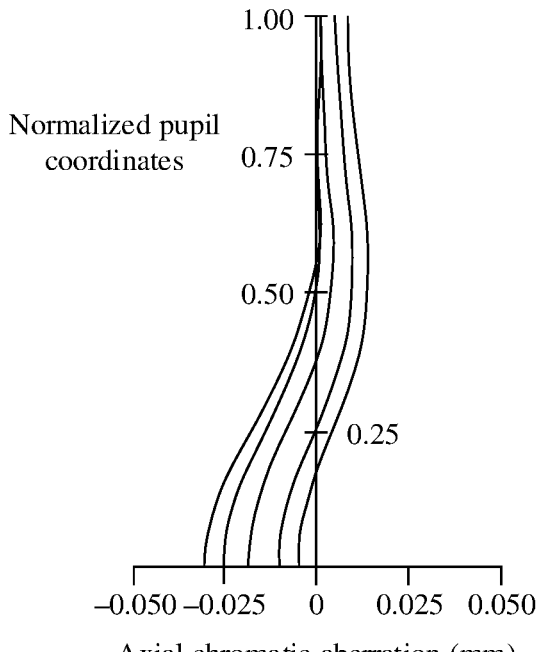
FIG. 15b is a diagram of axial chromatic aberration curves of a third optical lens in a second imaging mode according to an embodiment of this application.

FIG. 15*b* is a diagram of axial chromatic aberration curves of the third optical lens in the second imaging mode according to an embodiment of this application. Along a direction away from a coordinate origin, values of scales on a vertical coordinate axis are successively 0.25, 0.50, 0.75, and 1.00. Simulation results of depth of focus positions of colored light with wavelengths of 650 nm, 610 nm, 555 nm, 510 nm, and 470 nm are separately shown in the figure. It can be learned that an axial chromatic aberration of the optical lens in the second imaging mode is controlled to fall within a very small range.

Figure 16A:
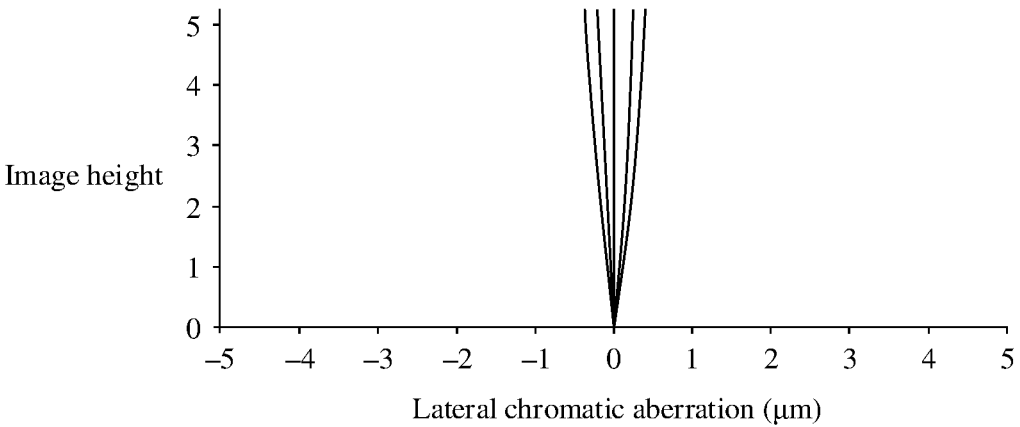
FIG. 16a is a diagram of lateral chromatic aberration curves of a third optical lens in a first imaging mode according to an embodiment of this application.

FIG. 16*a* is a diagram of lateral chromatic aberration curves of the third optical lens in the first imaging mode according to an embodiment of this application. Five solid curves in the figure respectively indicate the colored light with the wavelengths of 650 nm, 610 nm, 555 nm, 510 nm, and 470 nm. It can be learned that a lateral chromatic aberration of the optical lens in the first imaging mode is controlled to fall within a very small range.

Figure 16B:
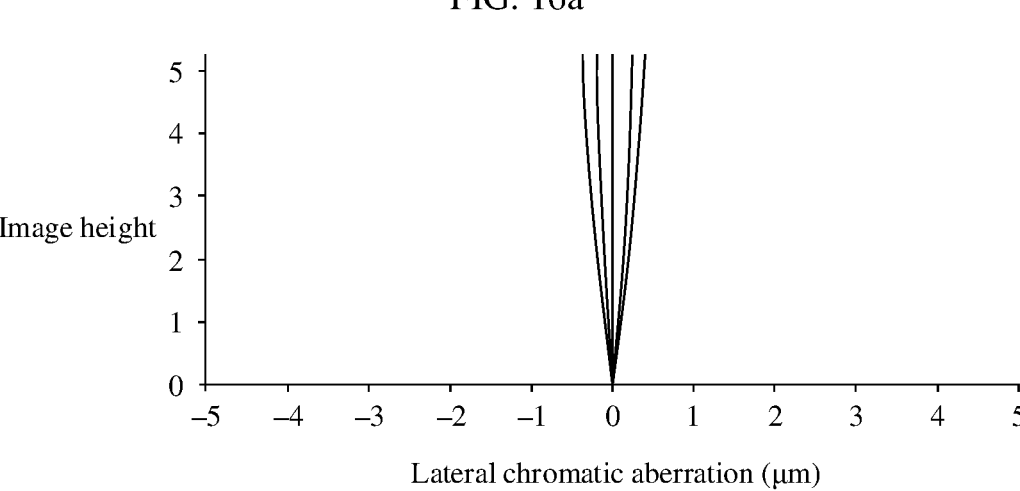
FIG. 16b is a diagram of lateral chromatic aberration curves of a third optical lens in a second imaging mode according to an embodiment of this application.

FIG. 16*b* is a diagram of lateral chromatic aberration curves of the third optical lens in the second imaging mode according to an embodiment of this application. Five solid curves in the figure respectively indicate the colored light with the wavelengths of 650 nm, 610 nm, 555 nm, 510 nm, and 470 nm. It can be learned that a lateral chromatic aberration of the optical lens in the second imaging mode is controlled to fall within a very small range.

Figures 17A, 17B:
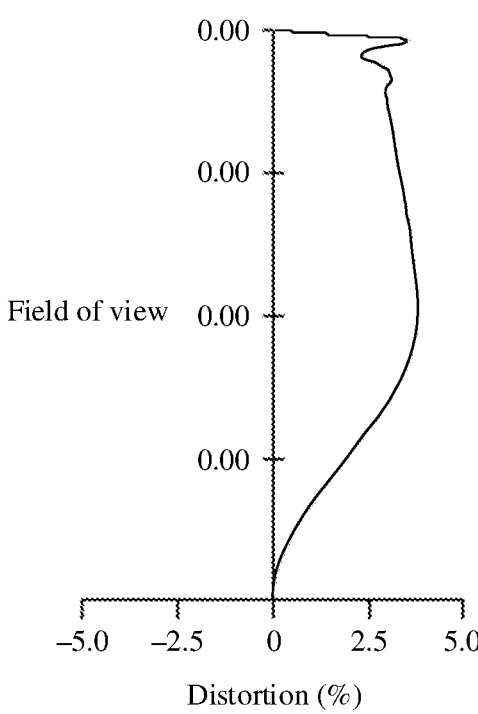
FIG. 17a is a diagram of an optical distortion curve of a third optical lens in a first imaging mode according to an embodiment of this application.
FIG. 17b is a diagram of an optical distortion curve of a third optical lens in a second imaging mode according to an embodiment of this application.

FIG. 17*a* is a diagram of an optical distortion curve of the third optical lens in the first imaging mode according to an embodiment of this application, and shows a difference between imaging deformation and an ideal shape. It can be learned that in this mode, an optical distortion can be basically controlled to fall within a range less than 4%.

FIG. 17*b* is a diagram of an optical distortion curve of the third optical lens in the second imaging mode according to an embodiment of this application, and shows a difference between imaging deformation and an ideal shape. It can be learned that in this mode, an optical distortion can be basically controlled to fall within a range less than 4%.

Figure 18A:
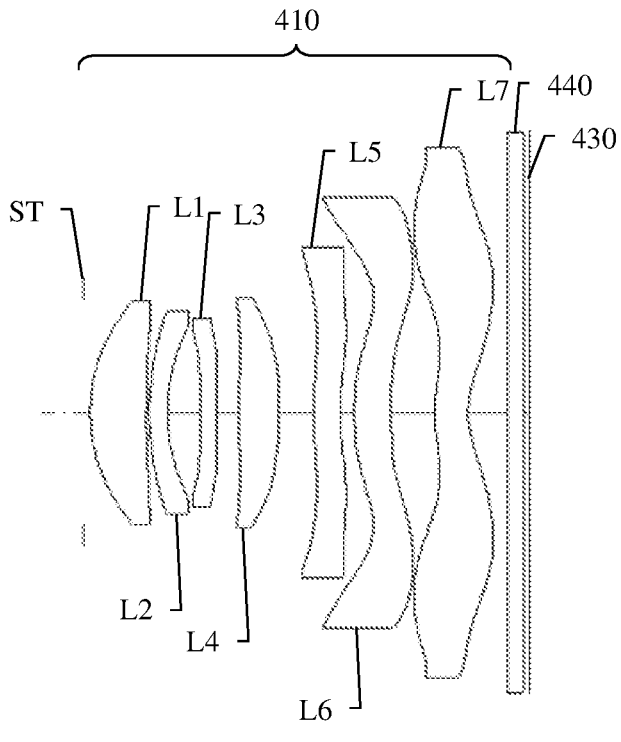
FIG. 18a is a schematic diagram of a structure of a fourth optical lens in a first imaging mode according to an embodiment of this application.
Figure 18B:
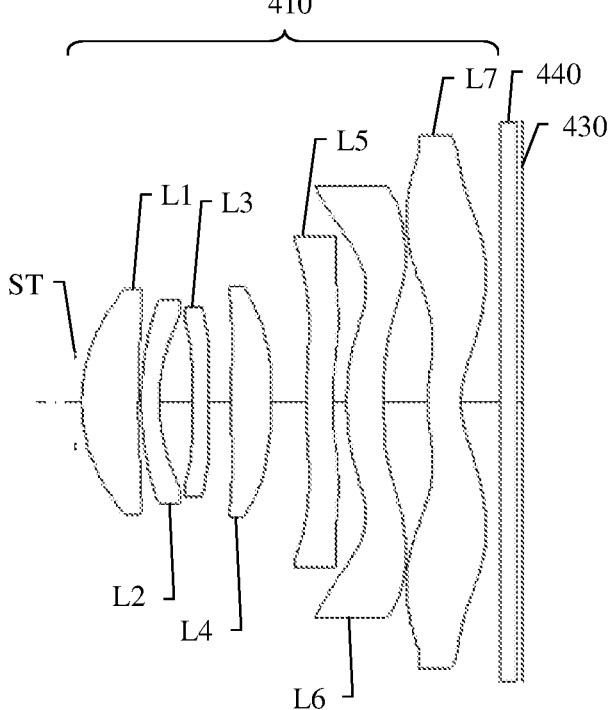
FIG. 18b is a schematic diagram of a structure of a fourth optical lens in a second imaging mode according to an embodiment of this application.

Refer to FIG. 18*a* and FIG. 18*b* together. FIG. 18*a* is a schematic diagram of a structure of a fourth optical lens in the first imaging mode according to an embodiment of this application, and FIG. 18*b* is a schematic diagram of a structure of the fourth optical lens in the second imaging mode according to an embodiment of this application. The optical lens 410 includes a variable aperture ST and seven lenses each having a focal power. The seven lenses are respectively a first lens L1, a second lens L2, a third lens L3, a fourth lens L4, a fifth lens L5, a sixth lens L6, and a seventh lens L7. The variable aperture ST is located on an object side of the first lens L1. In addition, the light filter 440 of the camera module is located on an image side of the seventh lens L7, and the image sensor 430 is located on an image side of the light filter 440.

In this embodiment, an F-number Fno. of the optical lens 410 satisfies: 1.2≤Fno.≤4.0. The F-number Fno. of the optical lens 410 is 1.2 in the first imaging mode. The F-number Fno. of the optical lens 410 is 4.0 in the second imaging mode.

A focal length f1 of the first lens L1 and a focal length EFL of the optical lens 410 satisfy: f1/EFL=1.09.

A focal length f3 of the third lens L3 and a focal length f4 of the fourth lens L4 satisfy: f3/f4=−3.61.

A curvature radius R3 of a region, near an optical axis, of an object-side surface of the second lens L2 and a curvature radius R4 of a region, near the optical axis, of an image-side surface of the second lens L2 satisfy: (R3+R4)/(R3−R4)= 5.58.

A total length TTL of the optical lens 410, a half-image height ImgH that can be formed by the optical lens 410 on an imaging surface of the optical lens 410, and the F-number Fno. of the optical lens 410 satisfy: 2.33≤TTL×Fno./ImgH≤6.25.

A center thickness CT5 of the fifth lens L5, a center thickness CT7 of the seventh lens L7, and a half field of view HFOV of the optical lens 410 satisfy: CT7/[CT5×tan (HFOV)]=1.04.

A curvature radius R12 of a region, near the optical axis, of an image-side surface of the sixth lens L6 and the focal length EFL of the optical lens 410 satisfy: |EFL/R12|=0.46.

A curvature radius R13 of an object-side surface of the seventh lens L7 and the focal length EFL of the optical lens 410 satisfy: |EFL/R13|=2.19.

The total length TTL of the optical lens 410 and an entrance pupil diameter EPD of the optical lens 410 satisfy: 1.96≤TTL/EPD≤5.22.

Along an optical axis direction of the optical lens 410, a spacing d1 between the first lens L1 and the second lens L2 satisfies: 0.07≤d1/dm≤0.21, where dm is a spacing between an $m^{th}$ lens and an $(m+1)^{th}$ lens, m is a natural number, and 2≤m≤6.

A center thickness CT1 of the first lens L1 satisfies: 1.39≤CT1/CTn≤3.41, where CTn indicates a center thickness of an $n^{th}$ lens, n is a natural number, and 2≤n≤7.

For details about other design parameters of the optical lens 410, refer to Table 10.

TABLE 10

| Focal length EFL (mm) | 6.128 |
|---|---|
| F-number | 1.2 to 4.0 |

TABLE 10-continued

| Half field of view HFOV | 39.8° |
|---|---|
| Total length TTL of an optical lens (mm) | 8 |
| Designed wavelength | 650 nm, 610 nm, 555 nm, 510 nm, and 470 nm |

In this embodiment of this application, all lenses of the optical lens 410 may be aspheric lenses. In other words, the optical lens 410 includes 14 aspheric surfaces in total. Refer to Table 11 and Table 12 together. Table 11 shows a curvature radius, a thickness, a refractive index, and an Abbe coefficient of each lens in the optical lens 410, and Table 12 shows an aspheric coefficient of each lens. In Table 11 and Table 12, S1 and S2 respectively represent an object-side surface and an image-side surface of the first lens, S3 and S4 respectively represent the object-side surface and the image-side surface of the second lens, S5 and S6 respectively represent an object-side surface and an image-side surface of the third lens, S7 and S8 respectively represent an object-side surface and an image-side surface of the fourth lens, S9 and S10 respectively represent an object-side surface and an image-side surface of the fifth lens, S11 and S12 respectively represent an object-side surface and the image-side surface of the sixth lens, and S13 and S14 respectively represent the object-side surface and an image-side surface of the seventh lens.

TABLE 11

| | Description | Curvature radius | Thickness | | Refractive index | | Abbe coefficient | |
|---|---|---|---|---|---|---|---|---|
| ST | Variable aperture | Infinity | d0 | 0.1 | — | — | — | — |
| S1 | First lens | 3.044 | CT1 | 1.022 | n1 | 1.55 | V1 | 55.93 |
| S2 | | 15.975 | d1 | 0.053 | | | | |
| S3 | Second lens | 4.294 | CT2 | 0.327 | n2 | 1.67 | V2 | 19.24 |
| S4 | | 2.989 | d2 | 0.598 | | | | |
| S5 | Third lens | 30.323 | CT3 | 0.300 | n3 | 1.67 | V3 | 19.24 |
| S6 | | 13.965 | d3 | 0.405 | | | | |
| S7 | Fourth lens | 18.810 | CT4 | 0.736 | n4 | 1.55 | V4 | 55.93 |
| S8 | | −8.319 | d4 | 0.625 | | | | |
| S9 | Fifth lens | 7.137 | CT5 | 0.488 | n5 | 1.57 | V5 | 37.40 |
| S10 | | 6.164 | d5 | 0.253 | | | | |
| S11 | Sixth lens | 6.097 | CT6 | 0.672 | n6 | 1.55 | V6 | 55.93 |
| S12 | | 13.323 | d6 | 0.793 | | | | |
| S13 | Seventh lens | 2.801 | CT7 | 0.606 | n7 | 1.54 | V7 | 55.66 |
| S14 | | 1.589 | — | — | | | | |

TABLE 12

| | Type | $r_o$ | K | A0 | A1 | A2 | A3 | A4 | A5 | A6 |
|---|---|---|---|---|---|---|---|---|---|---|
| S1 | Extended aspheric surface | 1.991 | 0.000 | −1.09E−03 | −4.05E−03 | −1.98E−03 | −6.93E−04 | −2.95E−04 | −9.91E−05 | −4.10E−05 |
| S2 | Extended aspheric surface | 2.004 | 0.000 | −5.92E−02 | 6.17E−03 | −8.48E−03 | 1.73E−03 | −1.32E−03 | 8.22E−04 | −4.04E−05 |
| S3 | Extended aspheric surface | 1.863 | 0.000 | −1.14E−01 | 3.34E−02 | −2.74E−03 | 3.15E−03 | −8.75E−04 | 6.22E−04 | 1.82E−05 |
| S4 | Extended aspheric surface | 1.868 | 0.000 | −1.09E−01 | 2.44E−02 | 2.07E−03 | 1.70E−03 | −7.88E−04 | −3.20E−04 | −2.07E−04 |
| S5 | Extended aspheric surface | 1.688 | 0.000 | −2.79E−01 | 4.98E−03 | 1.97E−03 | 9.82E−04 | −1.92E−04 | −1.64E−04 | −8.80E−05 |
| S6 | Extended aspheric surface | 1.712 | 0.000 | −2.46E−01 | 1.83E−02 | 3.38E−03 | 1.00E−03 | −1.15E−04 | −6.89E−05 | 2.21E−05 |
| S7 | Extended aspheric surface | 2.048 | 0.000 | −1.63E−01 | 1.05E−02 | 5.66E−03 | 1.03E−03 | −4.44E−04 | −3.44E−04 | −1.31E−04 |
| S8 | Extended aspheric surface | 2.217 | 0.000 | −2.96E−01 | 1.78E−02 | 9.97E−03 | 5.55E−03 | 7.32E−04 | −8.39E−04 | −5.66E−04 |
| S9 | Extended aspheric surface | 2.921 | 0.000 | −9.43E−01 | 1.19E−01 | −2.10E−02 | 1.02E−02 | 3.19E−03 | −4.27E−03 | 7.51E−04 |
| S10 | Extended aspheric surface | 3.147 | 0.000 | −9.72E−01 | 1.92E−01 | −2.06E−02 | −1.36E−02 | 1.61E−02 | −9.97E−03 | 4.83E−03 |

TABLE 12-continued

| | Type | | | | | | | | | |
|---|---|---|---|---|---|---|---|---|---|---|
| S11 | Extended aspheric surface | 4.124 | 0.000 | −2.54E+00 | 1.45E−01 | 2.45E−01 | −1.72E−01 | 4.95E−02 | −4.85E−03 | 2.31E−03 |
| S12 | Extended aspheric surface | 4.692 | 0.000 | −1.41E+00 | −4.92E−01 | 2.27E−01 | −8.19E−02 | 8.47E−02 | −2.18E−02 | −1.38E−02 |
| S13 | Extended aspheric surface | 4.771 | −1.000 | −5.48E+00 | 1.88E+00 | −8.06E−01 | 3.05E−01 | −1.21E−01 | 3.24E−02 | −1.02E−02 |
| S14 | Extended aspheric surface | 4.836 | −1.000 | −9.16E+00 | 2.14E+00 | −6.26E−01 | 1.89E−01 | −1.20E−01 | 5.71E−02 | −3.15E−02 |

| | Type | R | K | A7 | A8 | A9 | A10 | A11 | A12 | A13 |
|---|---|---|---|---|---|---|---|---|---|---|
| S1 | Extended aspheric surface | 1.991 | 0.000 | 2.19E−06 | 2.01E−06 | 4.40E−06 | 2.68E−06 | 1.75E−06 | 0.00E+00 | 0.00E+00 |
| S2 | Extended aspheric surface | 2.004 | 0.000 | 2.23E−04 | −9.72E−06 | 2.37E−05 | −7.14E−06 | 0.00E+00 | 0.00E+00 | 0.00E+00 |
| S3 | Extended aspheric surface | 1.863 | 0.000 | 1.96E−04 | 3.95E−05 | 4.25E−05 | 8.94E−06 | 1.03E−05 | 0.00E+00 | 0.00E+00 |
| S4 | Extended aspheric surface | 1.868 | 0.000 | −8.85E−05 | −8.31E−05 | −7.75E−05 | −4.84E−05 | −1.90E−05 | 0.00E+00 | 0.00E+00 |
| S5 | Extended aspheric surface | 1.688 | 0.000 | −2.65E−05 | −6.86E−06 | −3.87E−06 | −2.95E−06 | −7.81E−07 | 0.00E+00 | 0.00E+00 |
| S6 | Extended aspheric surface | 1.712 | 0.000 | −9.96E−06 | −6.34E−08 | −2.59E−06 | 0.00E+00 | 0.00E+00 | 0.00E+00 | 0.00E+00 |
| S7 | Extended aspheric surface | 2.048 | 0.000 | −8.21E−05 | −2.11E−05 | −6.98E−06 | 0.00E+00 | 0.00E+00 | 0.00E+00 | 0.00E+00 |
| S8 | Extended aspheric surface | 2.217 | 0.000 | −4.26E−04 | −1.53E−04 | −5.54E−05 | 0.00E+00 | 0.00E+00 | 0.00E+00 | 0.00E+00 |
| S9 | Extended aspheric surface | 2.921 | 0.000 | −1.00E−03 | 7.51E−04 | 7.67E−05 | 1.63E−04 | 0.00E+00 | 0.00E+00 | 0.00E+00 |
| S10 | Extended aspheric surface | 3.147 | 0.000 | −2.71E−03 | 1.20E−03 | −5.10E−04 | 1.39E−04 | −7.64E−05 | 5.29E−06 | 3.15E−06 |
| S11 | Extended aspheric surface | 4.124 | 0.000 | −6.01E−03 | 6.31E−03 | −2.17E−03 | −2.74E−03 | −1.19E−03 | 1.31E−03 | 5.53E−04 |
| S12 | Extended aspheric surface | 4.692 | 0.000 | −4.90E−03 | −1.98E−03 | 6.42E−03 | 2.93E−05 | −1.08E−04 | −1.35E−03 | −3.10E−04 |
| S13 | Extended aspheric surface | 4.771 | −1.000 | 6.43E−03 | −4.22E−03 | 4.03E−03 | −7.65E−04 | 2.12E−04 | 5.04E−04 | −1.71E−04 |
| S14 | Extended aspheric surface | 4.836 | −1.000 | 1.12E−02 | −4.60E−03 | 2.95E−03 | −1.80E−03 | 6.42E−04 | −2.36E−04 | 1.98E−04 |

In the 14 aspheric surfaces of the optical lens 410 shown in Table 12, surface types z of all the extended aspheric surfaces may be defined according to, but not limited to, the following aspheric surface formula:

$$z = \frac{cr^2}{1+\sqrt{1-(K+1)c^2r^2}} + u^4\sum_{x=0}^{13} A_x Q_x^{con}(u^2)$$

Herein, z indicates a vector height of the aspheric surface, r indicates a normalized radial coordinate of the aspheric surface, r is equal to a result obtained by dividing an actual radial coordinate of the aspheric surface by a normalized radius R, c indicates a spherical curvature of a vertex of the aspheric surface, K indicates a conic constant, Ax indicates an aspheric coefficient, $$Q_x^{con}$$

is an aspheric polynomial, $$Q_x^{con}(u^2) = P_x^{(0,4)}(2u-1),$$

and Px indicates a Jacobi polynomial.

The optical lens shown in FIG. 18*a* and FIG. 18*b* is simulated. A simulation result of the optical lens is described in detail below with reference to accompanying drawings.

Figures 19A, 19B:
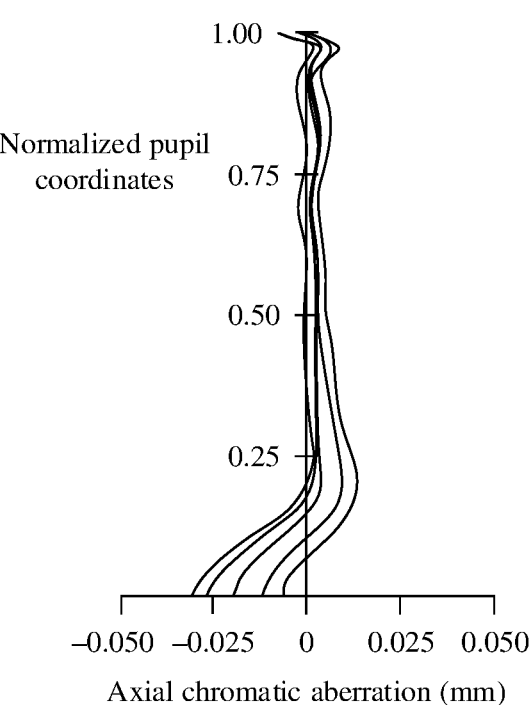
FIG. 19*a* is a diagram of axial chromatic aberration curves of a fourth optical lens in a first imaging mode according to an embodiment of this application.
FIG. 19*b* is a diagram of axial chromatic aberration curves of a fourth optical lens in a second imaging mode according to an embodiment of this application.

FIG. 19*a* is a diagram of axial chromatic aberration curves of the fourth optical lens in the first imaging mode according to an embodiment of this application. Along a direction away from a coordinate origin, values of scales on a vertical coordinate axis are successively 0.25, 0.50, 0.75, and 1.00. Simulation results of depth of focus positions of colored light with wavelengths of 650 nm, 610 nm, 555 nm, 510 nm, and 470 nm are separately shown in the figure. It can be learned that an axial chromatic aberration of the optical lens in the first imaging mode is controlled to fall within a very small range.

FIG. 19*b* is a diagram of axial chromatic aberration curves of the fourth optical lens in the second imaging mode according to an embodiment of this application. Along a direction away from a coordinate origin, values of scales on a vertical coordinate axis are successively 0.25, 0.50, 0.75, and 1.00. Simulation results of depth of focus positions of colored light with wavelengths of 650 nm, 610 nm, 555 nm, 510 nm, and 470 nm are separately shown in the figure. It can be learned that an axial chromatic aberration of the optical lens in the second imaging mode is controlled to fall within a very small range.

Figure 20A:
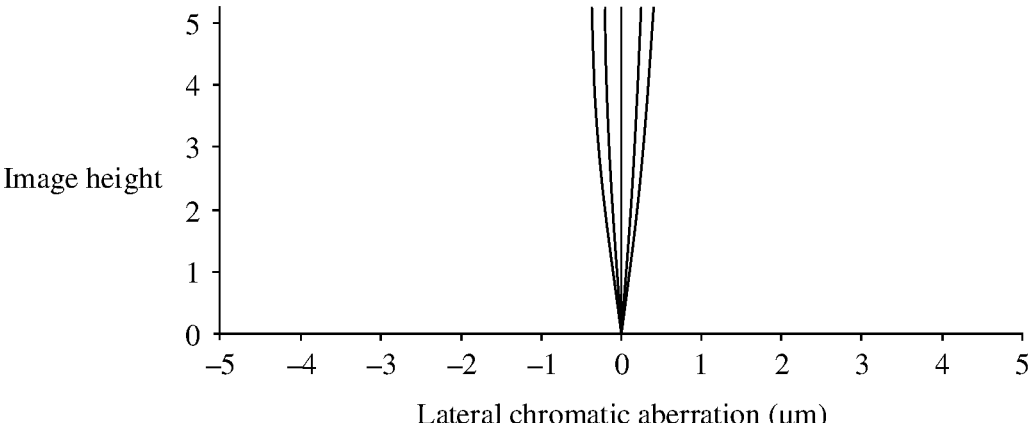
FIG. 20*a* is a diagram of lateral chromatic aberration curves of a fourth optical lens in a first imaging mode according to an embodiment of this application.

FIG. 20*a* is a diagram of lateral chromatic aberration curves of the fourth optical lens in the first imaging mode according to an embodiment of this application. Five solid curves in the figure respectively indicate the colored light with the wavelengths of 650 nm, 610 nm, 555 nm, 510 nm, and 470 nm. It can be learned that a lateral chromatic aberration of the optical lens in the first imaging mode is controlled to fall within a very small range.

Figure 20B:
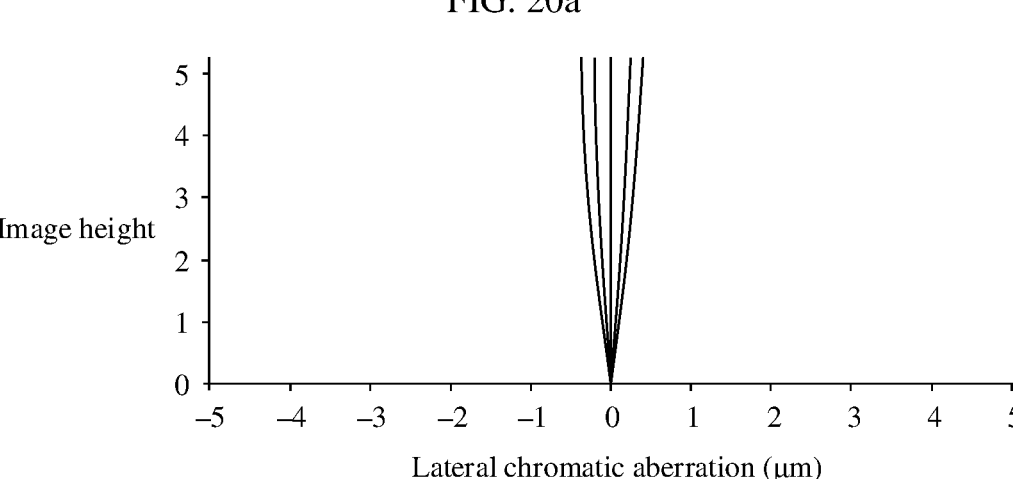
FIG. 20*b* is a diagram of lateral chromatic aberration curves of a fourth optical lens in a second imaging mode according to an embodiment of this application.

FIG. 20*b* is a diagram of lateral chromatic aberration curves of the fourth optical lens in the second imaging mode according to an embodiment of this application. Five solid curves in the figure respectively indicate the colored light with the wavelengths of 650 nm, 610 nm, 555 nm, 510 nm, and 470 nm. It can be learned that a lateral chromatic aberration of the optical lens in the second imaging mode is controlled to fall within a very small range.

Figure 21A:
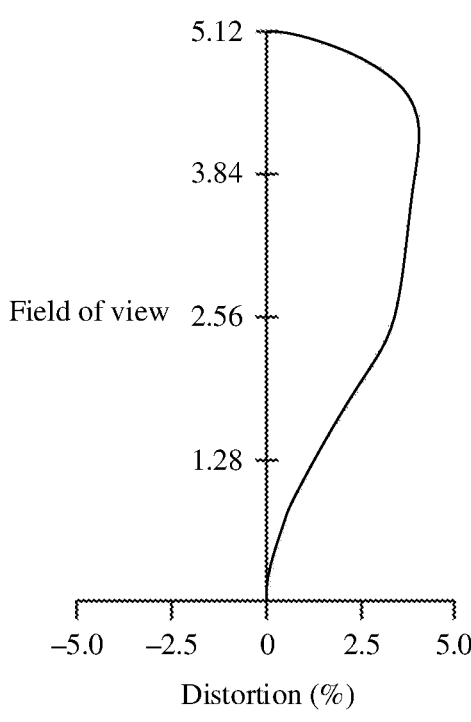
FIG. 21*a* is a diagram of an optical distortion curve of a fourth optical lens in a first imaging mode according to an embodiment of this application.

FIG. 21a is a diagram of an optical distortion curve of the fourth optical lens in the first imaging mode according to an embodiment of this application, and shows a difference between imaging deformation and an ideal shape. It can be learned that in this mode, an optical distortion can be basically controlled to fall within a range less than 4%.

Figure 21B:
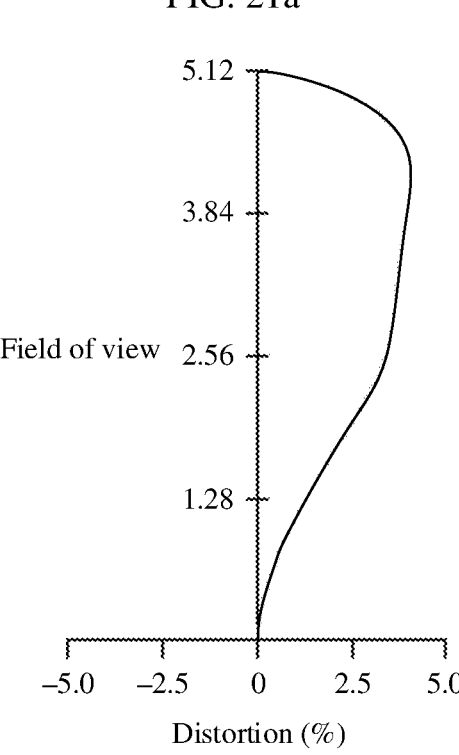
FIG. 21*b* is a diagram of an optical distortion curve of a fourth optical lens in a second imaging mode according to an embodiment of this application.

FIG. 21b is a diagram of an optical distortion curve of the fourth optical lens in the second imaging mode according to an embodiment of this application, and shows a difference between imaging deformation and an ideal shape. It can be learned that in this mode, an optical distortion can be basically controlled to fall within a range less than 4%.

Figure 22A:
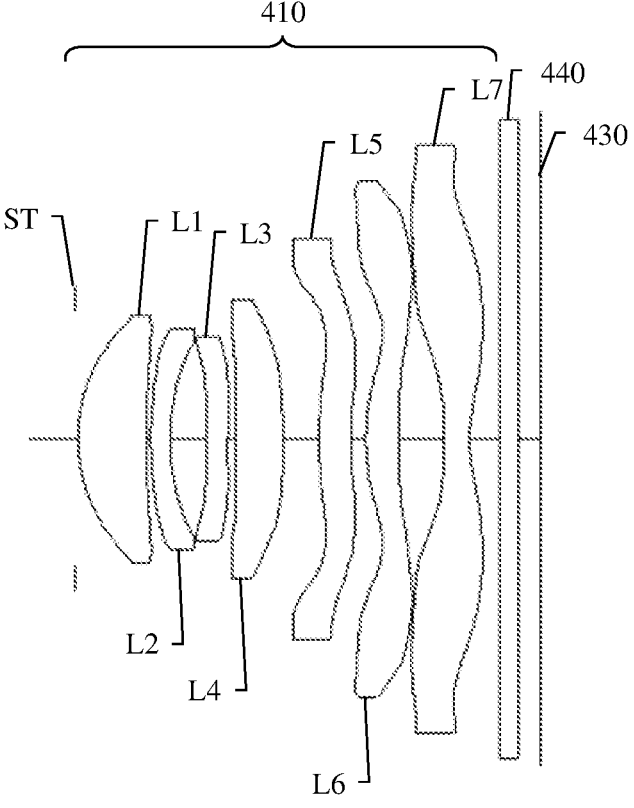
FIG. 22*a* is a schematic diagram of a structure of a fifth optical lens in a first imaging mode according to an embodiment of this application.
Figure 22B:
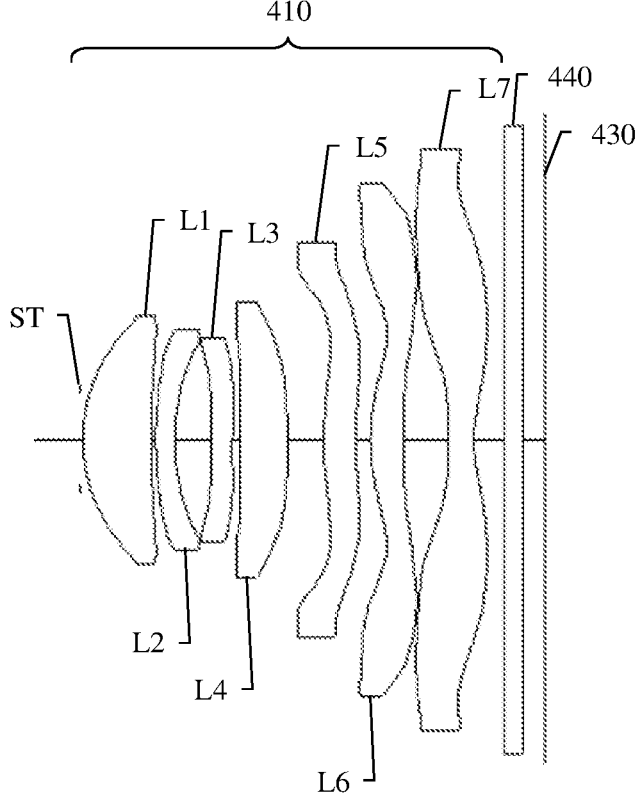
FIG. 22*b* is a schematic diagram of a structure of a fifth optical lens in a second imaging mode according to an embodiment of this application.

Refer to FIG. 22a and FIG. 22b together. FIG. 22a is a schematic diagram of a structure of a fifth optical lens in the first imaging mode according to an embodiment of this application, and FIG. 22b is a schematic diagram of a structure of the fifth optical lens of the camera module in the second imaging mode according to an embodiment of this application. The optical lens 410 includes a variable aperture ST and seven lenses each having a focal power. The seven lenses are respectively a first lens L1, a second lens L2, a third lens L3, a fourth lens L4, a fifth lens L5, a sixth lens L6, and a seventh lens L7. The variable aperture is located on an object side of the first lens L1. In addition, the light filter 440 of the camera module is located on an image side of the seventh lens L7, and the image sensor 430 is located on an image side of the light filter 440.

In this embodiment, an F-number Fno. of the optical lens 410 satisfies: $1.2 \leq Fno. \leq 4.0$. The F-number Fno. of the optical lens 410 is 1.2 in the first imaging mode. The F-number Fno. of the optical lens 410 is 4.0 in the second imaging mode.

A focal length f1 of the first lens L1 and a focal length EFL of the optical lens 410 satisfy: $f1/EFL=1.05$.

A focal length f3 of the third lens L3 and a focal length f4 of the fourth lens L4 satisfy: $f3/f4=-1.55$.

A curvature radius R3 of a region, near an optical axis, of an object-side surface of the second lens L2 and a curvature radius R4 of a region, near the optical axis, of an image-side surface of the second lens L2 satisfy: $(R3+R4)/(R3-R4)=5.54$.

A total length TTL of the optical lens 410, a half-image height ImgH that can be formed by the optical lens 410 on an imaging surface of the optical lens, and the F-number Fno. of the optical lens satisfy: $2.07 \leq TTL \times Fno./ImgH \leq 5.62$.

A center thickness CT5 of the fifth lens L5, a center thickness CT7 of the seventh lens L7, and a half field of view HFOV of the optical lens 410 satisfy: $CT7/[CT5 \times tan(HFOV)]=0.75$.

A curvature radius R12 of a region, near the optical axis, of an image-side surface of the sixth lens L6 and the focal length EFL of the optical lens 410 satisfy: $|EFL/R12|=0.02$.

A curvature radius R13 of an object-side surface of the seventh lens L7 and the focal length EFL of the optical lens 410 satisfy: $|EFL/R13|=0.26$.

The total length TTL of the optical lens 410 and an entrance pupil diameter EPD of the optical lens 410 satisfy: $1.82 \leq TTL/EPD \leq 5.08$.

Along an optical axis direction of the optical lens 410, a spacing d1 between the first lens L1 and the second lens L2 satisfies: $0.11 \leq d1/dm \leq 0.66$, where dm is a spacing between an $m^{th}$ lens and an $(m+1)^{th}$ lens, m is a natural number, and $2 \leq m \leq 6$.

A center thickness CT1 of the first lens L1 satisfies: $1.41 \leq CT1/CTn \leq 3.48$, where CTn indicates a center thickness of an $n^{th}$ lens, n is a natural number, and $2 \leq n \leq 7$.

For details about other design parameters of the optical lens 410, refer to Table 13.

TABLE 13

| | |
|---|---|
| Focal length EFL (mm) | 5.745 |
| F-number | 1.4 to 4.0 |
| Half field of view HFOV | 41.8° |
| Total length TTL of an optical lens (mm) | 8 |
| Designed wavelength | 650 nm, 610 nm, 555 nm, 510 nm, and 470 nm |

In this embodiment of this application, all lenses of the optical lens 410 may be aspheric lenses. In other words, the optical lens 410 includes 14 aspheric surfaces in total. Refer to Table 14 and Table 15 together. Table 14 shows a curvature radius, a thickness, a refractive index, and an Abbe coefficient of each lens in the optical lens 410, and Table 15 shows an aspheric coefficient of each lens. In Table 14 and Table 15, S1 and S2 respectively represent an object-side surface and an image-side surface of the first lens, S3 and S4 respectively represent the object-side surface and the image-side surface of the second lens, S5 and S6 respectively represent an object-side surface and an image-side surface of the third lens, S7 and S8 respectively represent an object-side surface and an image-side surface of the fourth lens, S9 and S10 respectively represent an object-side surface and an image-side surface of the fifth lens, S11 and S12 respectively represent an object-side surface and the image-side surface of the sixth lens, and S13 and S14 respectively represent the object-side surface and an image-side surface of the seventh lens.

TABLE 14

| | Description | Curvature radius | | Thickness | Refractive index | | Abbe coefficient |
|---|---|---|---|---|---|---|---|
| ST | Variable aperture | Infinity | do | 0.05 | — | — | — |
| S1 | First lens | 2.567 | CT1 | 1.068 | n1 1.55 | V1 | 55.93 |
| S2 | | 9.783 | d1 | 0.075 | | | |
| S3 | Second lens | 5.148 | CT2 | 0.307 | n2 1.68 | V2 | 18.40 |
| S4 | | 3.573 | d2 | 0.583 | | | |
| S5 | Third lens | −190.501 | CT3 | 0.322 | n3 1.68 | V3 | 18.40 |
| S6 | | 20.144 | d3 | 0.114 | | | |
| S7 | Fourth lens | 13.486 | CT4 | 0.759 | n4 1.55 | V4 | 55.93 |
| S8 | | −29.496 | d4 | 0.566 | | | |
| S9 | Fifth lens | 5.577 | CT5 | 0.502 | n5 1.57 | V5 | 37.40 |
| S10 | | 5.521 | d5 | 0.237 | | | |
| S11 | Sixth lens | 3.588 | CT6 | 0.524 | n6 1.55 | V6 | 55.93 |
| S12 | | 271.071 | d6 | 0.689 | | | |

TABLE 14-continued

| | Description | Curvature radius | Thickness | | Refractive index | | Abbe coefficient | |
|---|---|---|---|---|---|---|---|---|
| S13 | Seventh lens | 22.181 | CT7 | 0.420 | n7 | 1.54 | V7 | 55.66 |
| S14 | | 2.145 | — | | — | | | |

TABLE 15

| | Type | $r_o$ | K | A0 | A1 | A2 | A3 | A4 | A5 | A6 |
|---|---|---|---|---|---|---|---|---|---|---|
| S1 | Extended aspheric surface | 1.948 | 0.000 | −2.46E−02 | −1.36E−02 | −6.95E−03 | −2.34E−03 | −1.12E−03 | −3.57E−04 | −2.47E−04 |
| S2 | Extended aspheric surface | 1.878 | 0.000 | −9.38E−02 | 8.00E−03 | −8.82E−03 | −1.16E−04 | −1.02E−03 | −5.48E−05 | −9.21E−05 |
| S3 | Extended aspheric surface | 1.745 | 0.000 | −3.91E−02 | 3.87E−02 | −1.04E−03 | 1.52E−03 | −4.67E−04 | 1.62E−05 | −4.53E−05 |
| S4 | Extended aspheric surface | 1.543 | 0.000 | 1.45E−02 | 1.62E−02 | 1.60E−03 | 8.14E−04 | 8.60E−05 | −6.01E−06 | 1.03E−05 |
| S5 | Extended aspheric surface | 1.540 | 0.000 | −1.77E−01 | −5.64E−03 | 1.85E−03 | 1.24E−03 | −1.09E−04 | −1.55E−05 | −7.05E−05 |
| S6 | Extended aspheric surface | 1.601 | 0.000 | −1.90E−01 | 1.14E−02 | 4.20E−03 | 1.82E−03 | −1.10E−04 | −1.00E−04 | −2.52E−05 |
| S7 | Extended aspheric surface | 2.032 | 0.000 | −2.67E−01 | 6.23E−02 | 1.76E−03 | −3.60E−03 | −2.45E−03 | 5.91E−04 | 2.11E−04 |
| S8 | Extended aspheric surface | 2.205 | 0.000 | −4.61E−01 | 5.23E−02 | 1.31E−02 | 3.27E−03 | −1.16E−03 | −1.61E−03 | −5.01E−04 |
| S9 | Extended aspheric surface | 2.762 | 0.000 | −1.26E+00 | 3.59E−02 | 7.63E−02 | 2.28E−02 | −6.67E−03 | −1.12E−02 | −2.36E−03 |
| S10 | Extended aspheric surface | 3.139 | 0.000 | −1.60E+00 | 3.29E−01 | −1.13E−02 | −1.10E−02 | 4.53E−03 | −4.02E−03 | 2.04E−03 |
| S11 | Extended aspheric surface | 3.793 | −1.000 | −2.68E+00 | 6.24E−01 | −6.84E−02 | −1.01E−01 | 8.26E−02 | −2.15E−02 | −6.31E−03 |
| S12 | Extended aspheric surface | 4.066 | 0.000 | −5.40E−02 | −3.71E−01 | 1.23E−01 | −8.38E−02 | 3.12E−02 | −1.33E−02 | 1.18E−02 |
| S13 | Extended aspheric surface | 4.431 | 0.000 | −1.33E+00 | 7.08E−01 | −3.99E−01 | 2.58E−01 | −1.65E−01 | 7.78E−02 | −2.30E−02 |
| S14 | Extended aspheric surface | 4.628 | −1.000 | 6.53E+00 | 1.69E+00 | −4.78E−01 | 1.87E−01 | −1.26E−01 | 5.45E−02 | −2.33E−02 |

| | Type | R | K | A7 | A8 | A9 | A10 | A11 | A12 | A13 |
|---|---|---|---|---|---|---|---|---|---|---|
| S1 | Extended aspheric surface | 1.948 | 0.000 | −7.72E−05 | −8.62E−05 | −2.92E−05 | −2.92E−05 | −2.96E−07 | −3.99E−06 | 6.26E−06 |
| S2 | Extended aspheric surface | 1.878 | 0.000 | −4.64E−05 | −9.71E−06 | −3.29E−06 | 8.05E−06 | 3.01E−06 | 2.07E−06 | −1.06E−06 |
| S3 | Extended aspheric surface | 1.745 | 0.000 | −2.93E−05 | −2.79E−05 | −1.43E−05 | −1.10E−05 | −2.29E−06 | −3.06E−06 | 4.27E−06 |
| S4 | Extended aspheric surface | 1.543 | 0.000 | −3.15E−06 | 9.54E−06 | −1.08E−06 | 1.89E−06 | −2.34E−06 | 6.84E−07 | −3.94E−06 |
| S5 | Extended aspheric surface | 1.540 | 0.000 | 3.68E−05 | −1.42E−05 | 2.01E−05 | −6.48E−06 | 7.17E−06 | −3.89E−06 | 5.88E−07 |
| S6 | Extended aspheric surface | 1.601 | 0.000 | 1.74E−05 | −1.64E−06 | 3.12E−06 | 3.27E−07 | −3.04E−06 | 2.74E−06 | −1.14E−06 |
| S7 | Extended aspheric surface | 2.032 | 0.000 | −2.90E−04 | −1.79E−04 | 2.39E−05 | −2.98E−05 | −2.42E−05 | −1.44E−05 | −8.01E−07 |
| S8 | Extended aspheric surface | 2.205 | 0.000 | −9.94E−05 | −2.35E−05 | 3.85E−06 | 8.48E−06 | −1.47E−06 | 3.75E−06 | −8.30E−06 |
| S9 | Extended aspheric surface | 2.762 | 0.000 | 2.34E−03 | 1.15E−03 | −7.23E−05 | −3.38E−04 | −1.33E−04 | 2.04E−05 | 6.06E−05 |
| S10 | Extended aspheric surface | 3.139 | 0.000 | −2.38E−04 | −1.32E−03 | 1.75E−04 | 5.95E−04 | −2.14E−04 | −2.43E−05 | 5.27E−05 |
| S11 | Extended aspheric surface | 3.793 | −1.000 | 7.44E−03 | −1.61E−03 | −2.19E−03 | 1.94E−03 | −6.21E−04 | 1.33E−04 | 5.64E−06 |
| S12 | Extended aspheric surface | 4.066 | 0.000 | −4.08E−04 | 2.18E−03 | −1.22E−03 | −3.03E−04 | −6.49E−04 | 5.26E−04 | −1.41E−04 |
| S13 | Extended aspheric surface | 4.431 | 0.000 | −1.24E−03 | 6.68E−03 | −5.38E−03 | 1.73E−03 | 8.05E−04 | −9.64E−04 | 2.82E−04 |
| S14 | Extended aspheric surface | 4.628 | −1.000 | 1.10E−02 | −3.94E−03 | 1.49E−03 | −5.47E−04 | 2.35E−04 | −7.19E−04 | 4.67E−04 |

In the 14 aspheric surfaces of the optical lens 410 shown in Table 15, surface types z of all the extended aspheric surfaces may be defined according to, but not limited to, the following aspheric surface formula:

$$z = \frac{cr^2}{1 + \sqrt{1 - (K+1)c^2 r^2}} + u^4 \sum_{x=0}^{13} A_x Q_x^{con}(u^2)$$

Herein, z indicates a vector height of the aspheric surface, r indicates a normalized radial coordinate of the aspheric surface, r is equal to a result obtained by dividing an actual radial coordinate of the aspheric surface by a normalized radius R, c indicates a spherical curvature of a vertex of the aspheric surface, K indicates a conic constant, Ax indicates an aspheric coefficient, $$Q_x^{con}$$

is an aspheric polynomial, $$Q_x^{con}(u^2) = P_x^{(0,4)}(2u - 1),$$

and Px indicates a Jacobi polynomial.

The optical lens shown in FIG. 22*a* and FIG. 22*b* is simulated. A simulation result of the optical lens is described in detail below with reference to accompanying drawings.

Figure 23A:
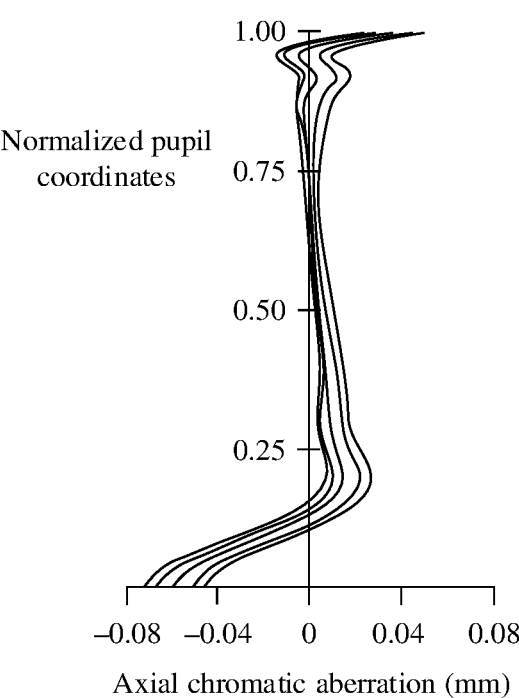
FIG. 23*a* is a diagram of axial chromatic aberration curves of a fifth optical lens in a first imaging mode according to an embodiment of this application.

FIG. 23*a* is a diagram of axial chromatic aberration curves of the fifth optical lens in the first imaging mode according to an embodiment of this application. Along a direction away from a coordinate origin, values of scales on a vertical coordinate axis are successively 0.25, 0.50, 0.75, and 1.00. Simulation results of depth of focus positions of colored light with wavelengths of 650 nm, 610 nm, 555 nm, 510 nm, and 470 nm are separately shown in the figure. It can be learned that an axial chromatic aberration of the optical lens in the first imaging mode is controlled to fall within a very small range.

Figure 23B:
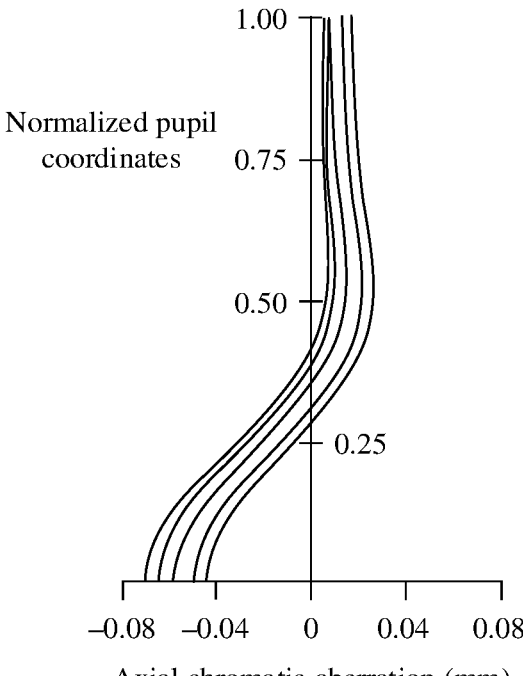
FIG. 23*b* is a diagram of axial chromatic aberration curves of a fifth optical lens in a second imaging mode according to an embodiment of this application.

FIG. 23*b* is a diagram of axial chromatic aberration curves of the fifth optical lens in the second imaging mode according to an embodiment of this application. Along a direction away from a coordinate origin, values of scales on a vertical coordinate axis are successively 0.25, 0.50, 0.75, and 1.00. Simulation results of depth of focus positions of colored light with wavelengths of 650 nm, 610 nm, 555 nm, 510 nm, and 470 nm are separately shown in the figure. It can be learned that an axial chromatic aberration of the optical lens in the second imaging mode is controlled to fall within a very small range.

Figure 24A:
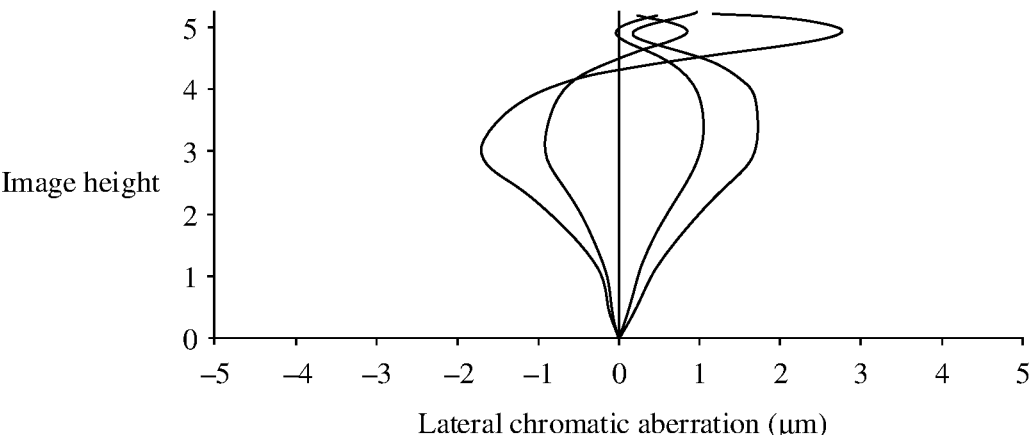
FIG. 24*a* is a diagram of lateral chromatic aberration curves of a fifth optical lens in a first imaging mode according to an embodiment of this application.

FIG. 24*a* is a diagram of lateral chromatic aberration curves of the fifth optical lens in the first imaging mode according to an embodiment of this application. Five solid curves in the figure respectively indicate the colored light with the wavelengths of 650 nm, 610 nm, 555 nm, 510 nm, and 470 nm. It can be learned that a lateral chromatic aberration of the optical lens in the first imaging mode is controlled to fall within a very small range.

Figure 24B:
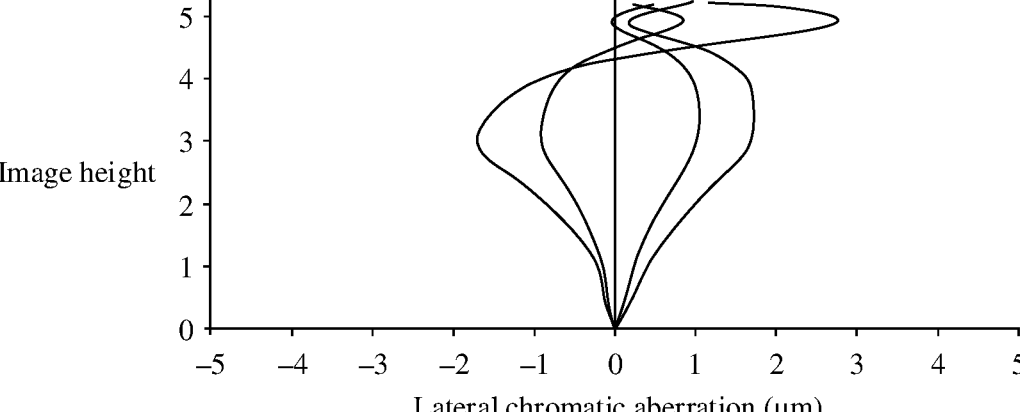
FIG. 24*b* is a diagram of lateral chromatic aberration curves of a fifth optical lens in a second imaging mode according to an embodiment of this application.

FIG. 24*b* is a diagram of lateral chromatic aberration curves of the fifth optical lens in the second imaging mode according to an embodiment of this application. Five solid curves in the figure respectively indicate the colored light with the wavelengths of 650 nm, 610 nm, 555 nm, 510 nm, and 470 nm. It can be learned that a lateral chromatic aberration of the optical lens in the second imaging mode is controlled to fall within a very small range.

Figure 25A:
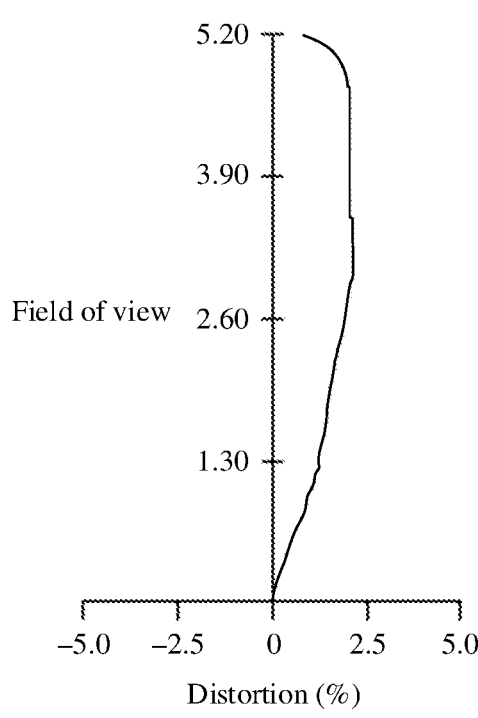
FIG. 25*a* is a diagram of an optical distortion curve of a fifth optical lens in a first imaging mode according to an embodiment of this application.

FIG. 25*a* is a diagram of an optical distortion curve of the fifth optical lens in the first imaging mode according to an embodiment of this application, and shows a difference between imaging deformation and an ideal shape. It can be learned that in this mode, an optical distortion can be basically controlled to fall within a range less than 2.5%.

Figure 25B:
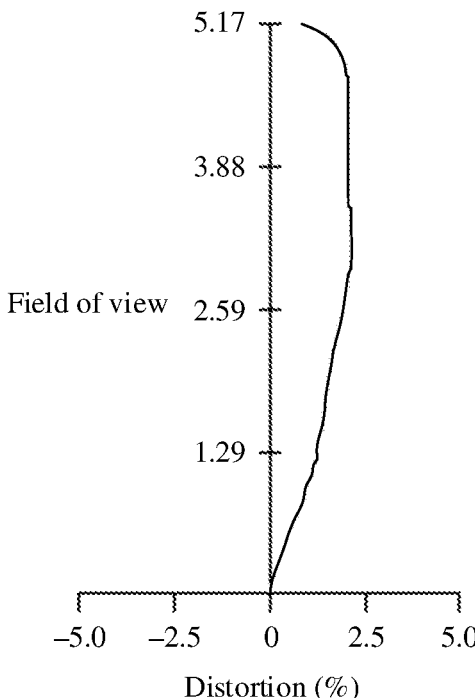
FIG. 25*b* is a diagram of an optical distortion curve of a fifth optical lens in a second imaging mode according to an embodiment of this application.

FIG. 25*b* is a diagram of an optical distortion curve of the fifth optical lens in the second imaging mode according to an embodiment of this application, and shows a difference between imaging deformation and an ideal shape. It can be learned that in this mode, an optical distortion can be basically controlled to fall within a range less than 2.5%.

Figure 26A:
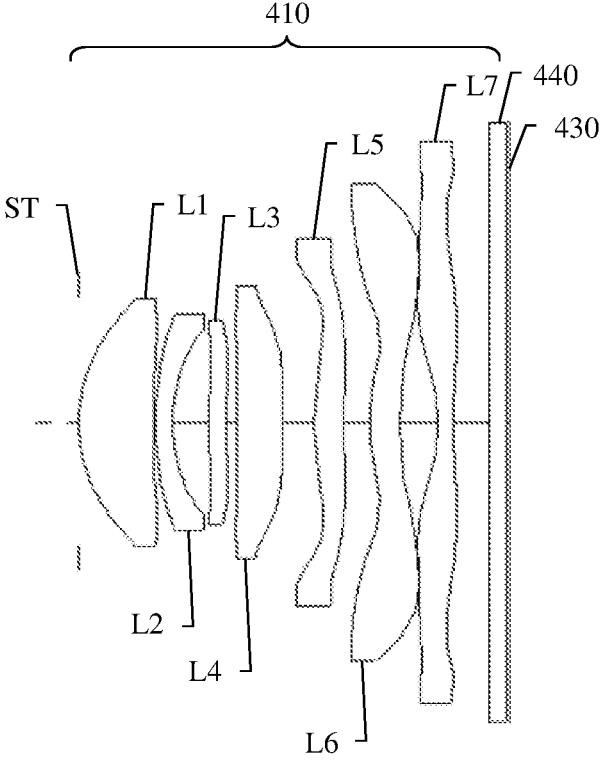
FIG. 26*a* is a schematic diagram of a structure of a sixth optical lens in a first imaging mode according to an embodiment of this application.
Figure 26B:
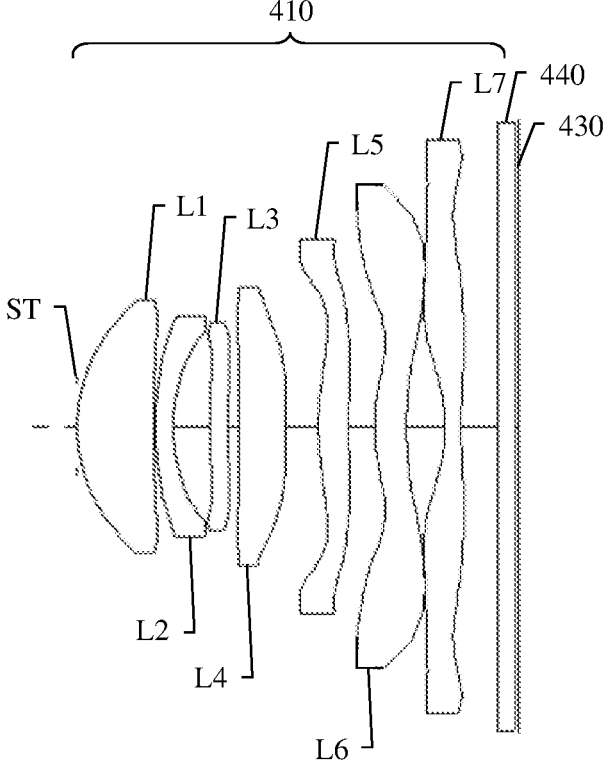
FIG. 26*b* is a schematic diagram of a structure of a sixth optical lens in a second imaging mode according to an embodiment of this application.

Refer to FIG. 26*a* and FIG. 26*b* together. FIG. 26*a* is a schematic diagram of a structure of a sixth optical lens in the first imaging mode according to an embodiment of this application, and FIG. 26*b* is a schematic diagram of a structure of the sixth optical lens in the second imaging mode according to an embodiment of this application. The optical lens 410 includes a variable aperture ST and seven lenses each having a focal power. The seven lenses are respectively a first lens L1, a second lens L2, a third lens L3, a fourth lens L4, a fifth lens L5, a sixth lens L6, and a seventh lens L7. The variable aperture ST is located on an object side of the first lens L1. In addition, the light filter 440 of the camera module is located on an image side of the seventh lens, and the image sensor 430 is located on an image side of the light filter 440.

In this embodiment, an F-number Fno. of the optical lens 410 satisfies: 1.2≤Fno.≤8.0. The F-number Fno. of the optical lens 410 is 1.2 in the first imaging mode. The F-number Fno. of the optical lens 410 is 8.0 in the second imaging mode.

A focal length f1 of the first lens L1 and a focal length EFL of the optical lens 410 satisfy: f1/EFL=1.03.

A focal length f3 of the third lens L3 and a focal length f4 of the fourth lens L4 satisfy: f3/f4=−2.35.

A curvature radius R3 of a region, near an optical axis, of an object-side surface of the second lens L2 and a curvature radius R4 of a region, near the optical axis, of an image-side surface of the second lens L2 satisfy: (R3+R4)/(R3−R4)= 4.93.

A total length TTL of the optical lens 410, a half-image height ImgH that can be formed by the optical lens 410 on an imaging surface of the optical lens 410, and the F-number Fno. of the optical lens 410 satisfy: 1.87≤TL×Fno./ImgH≤5.74.

A center thickness CT5 of the fifth lens L5, a center thickness CT7 of the seventh lens L7, and a half field of view HFOV of the optical lens 410 satisfy: CT7/[CT5×tan (HFOV)]=0.46.

A curvature radius R12 of a region, near the optical axis, of an image-side surface of the sixth lens L6 and the focal length EFL of the optical lens 410 satisfy: |EFL/R12|=0.11.

A curvature radius R13 of an object-side surface of the seventh lens L7 and the focal length EFL of the optical lens 410 satisfy: |EFL/R13|=2.10.

The total length TTL of the optical lens 410 and an entrance pupil diameter EPD of the optical lens 410 satisfy: 1.74≤TL/EPD≤5.25.

Along an optical axis direction of the optical lens 410, a spacing d1 between the first lens L1 and the second lens L2 satisfies: 0.05≤d1/dm≤0.16, where dm is a spacing between an $m^{th}$ lens and an $(m+1)^{th}$ lens, m is a natural number, and 2≤m≤6.

A center thickness CT1 of the first lens L1 satisfies: 1.6≤CT1/CTn≤4.89, where CTn indicates a center thickness of an n$^{th}$ lens, n is a natural number, and 2≤n≤7.

For details about other design parameters of the optical lens 410, refer to Table 16.

TABLE 16

| | |
|---|---|
| Focal length EFL (mm) | 5.638 |
| F-number | 1.2 to 8.0 |
| Half field of view HFOV | 41.2° |
| Total length TTL of an optical lens (mm) | 7.4 |
| Designed wavelength | 650 nm, 610 nm, 555 nm, 510 nm, and 470 nm |

In this embodiment of this application, all lenses of the optical lens 410 may be aspheric lenses. In other words, the optical lens 410 includes 14 aspheric surfaces in total. Refer to Table 17 and Table 18 together. Table 17 shows a curvature radius, a thickness, a refractive index, and an Abbe coefficient of each lens in the optical lens 410, and Table 18 shows an aspheric coefficient of each lens. In Table 17 and Table 18, S1 and S2 respectively represent an object-side surface and an image-side surface of the first lens, S3 and S4 respectively represent the object-side surface and the image-side surface of the second lens, S5 and S6 respectively represent an object-side surface and an image-side surface of the third lens, S7 and S8 respectively represent an object-side surface and an image-side surface of the fourth lens, S9 and S10 respectively represent an object-side surface and an image-side surface of the fifth lens, S11 and S12 respectively represent an object-side surface and the image-side surface of the sixth lens, and S13 and S14 respectively represent the object-side surface and an image-side surface of the seventh lens.

TABLE 17

| | Description | Curvature radius | Thickness | | Refractive index | | Abbe coefficient |
|---|---|---|---|---|---|---|---|
| ST | Variable aperture | Infinity | d0 | 0.1 | — | — | — |
| S1 | First lens | 2.594 | CT1 | 1.279 | n1 | 1.55 | V1 | 55.93 |
| S2 | | 11.937 | d1 | 0.030 | | | |
| S3 | Second lens | 3.966 | CT2 | 0.300 | n2 | 1.67 | V2 | 19.24 |
| S4 | | 2.628 | d2 | 0.608 | | | |
| S5 | Third lens | 7.926 | CT3 | 0.300 | n3 | 1.67 | V3 | 19.24 |
| S6 | | 6.351 | d3 | 0.182 | | | |
| S7 | Fourth lens | 10.278 | CT4 | 0.801 | n4 | 1.55 | V4 | 55.93 |
| S8 | | 74.955 | d4 | 0.538 | | | |
| S9 | Fifth lens | 3.852 | CT5 | 0.500 | n5 | 1.57 | V5 | 37.40 |
| S10 | | 6.042 | d5 | 0.446 | | | |
| S11 | Sixth lens | 3.827 | CT6 | 0.532 | n6 | 1.55 | V6 | 55.93 |
| S12 | | 53.326 | d6 | 0.646 | | | |
| S13 | Seventh lens | −2.686 | CT7 | 0.261 | n7 | 1.54 | V7 | 55.66 |
| S14 | | 6.351 | — | — | | | |

TABLE 18

| | Type | $r_o$ | K | A0 | A1 | A2 | A3 | A4 | A5 | A6 |
|---|---|---|---|---|---|---|---|---|---|---|
| S1 | Extended aspheric surface | 2.148 | 0.000 | −9.57E−02 | −2.50E−02 | −1.44E−02 | −2.38E−03 | −1.78E−03 | 1.83E−04 | −4.67E−04 |
| S2 | Extended aspheric surface | 2.040 | 0.000 | −1.17E−01 | 1.37E−02 | −1.55E−02 | 5.42E−03 | −3.18E−03 | 1.45E−03 | −9.36E−04 |
| S3 | Extended aspheric surface | 1.850 | 0.000 | −1.43E−01 | 5.18E−02 | −9.85E−03 | 5.38E−03 | −2.42E−03 | 1.03E−03 | −4.69E−04 |
| S4 | Extended aspheric surface | 1.594 | 0.000 | −3.12E−02 | 2.65E−02 | 1.50E−03 | 1.80E−03 | 1.76E−04 | 1.17E−04 | 8.83E−05 |
| S5 | Extended aspheric surface | 1.596 | 0.000 | −1.92E−01 | −3.28E−03 | −3.04E−03 | 1.66E−03 | −3.23E−04 | 3.67E−04 | −1.13E−04 |
| S6 | Extended aspheric surface | 1.740 | 0.000 | −2.92E−01 | 1.28E−02 | −1.98E−03 | 2.62E−03 | −1.19E−03 | 1.74E−04 | −2.24E−04 |
| S7 | Extended aspheric surface | 2.186 | 0.000 | −3.05E−01 | 1.03E−01 | −4.04E−03 | −4.47E−03 | −3.13E−03 | 2.03E−03 | −3.37E−04 |
| S8 | Extended aspheric surface | 2.330 | 0.000 | −6.38E−01 | 1.08E−01 | 1.76E−02 | 6.63E−03 | −5.15E−03 | −1.98E−03 | −1.66E−03 |
| S9 | Extended aspheric surface | 2.805 | 0.000 | −1.65E+00 | 7.48E−02 | 3.56E−02 | 4.25E−02 | −1.92E−02 | −7.26E−03 | −2.35E−04 |
| S10 | Extended aspheric surface | 3.151 | 0.000 | −1.40E+00 | 3.27E−01 | −4.92E−02 | v3.54E−02 | −2.58E−02 | 2.32E−03 | 3.30E−03 |
| S11 | Extended aspheric surface | 3.774 | 0.000 | −3.67E+00 | 5.08E−01 | −2.46E−01 | −6.44E−02 | 4.29E−02 | −6.13E−02 | 9.42E−03 |
| S12 | Extended aspheric surface | 4.086 | 0.000 | −1.88E−01 | −5.33E−01 | 1.71E−01 | −7.17E−02 | 9.20E−02 | −3.80E−02 | 7.72E−03 |
| S13 | Extended aspheric surface | 4.564 | −1.000 | 4.34E+00 | −9.81E−01 | 2.60E−01 | −5.16E−02 | −1.58E−02 | 2.66E−02 | −1.59E−02 |
| S14 | Extended aspheric surface | 4.792 | 0.000 | −2.67E+00 | 7.37E−01 | −3.00E−01 | 4.14E−02 | −3.72E−02 | 3.61E−02 | −1.75E−02 |

| | Type | R | K | A7 | A8 | A9 | A10 | A11 | A12 | A13 |
|---|---|---|---|---|---|---|---|---|---|---|
| S1 | Extended aspheric surface | 2.148 | 0.000 | 7.58E−05 | −2.11E−04 | 8.76E−05 | 9.02E−06 | 1.55E−04 | 4.76E−05 | 9.24E−05 |

TABLE 18-continued

| S2 | Extended aspheric surface | 2.040 | 0.000 | 2.11E-04 | -1.35E-04 | 1.14E-04 | 1.03E-05 | 0.00E+00 | 0.00E+00 | 0.00E+00 |
|---|---|---|---|---|---|---|---|---|---|---|
| S3 | Extended aspheric surface | 1.850 | 0.000 | 7.84E-05 | -1.35E-04 | -1.44E-05 | -9.62E-06 | -1.26E-05 | 0.00E+00 | 0.00E+00 |
| S4 | Extended aspheric surface | 1.594 | 0.000 | 9.38E-06 | 3.59E-05 | -1.45E-05 | -5.80E-06 | -3.71E-07 | 9.36E-06 | -1.84E-06 |
| S5 | Extended aspheric surface | 1.596 | 0.000 | 1.17E-04 | -3.62E-05 | 3.89E-05 | -1.31E-05 | 7.39E-06 | 0.00E+00 | 0.00E+00 |
| S6 | Extended aspheric surface | 1.740 | 0.000 | 8.96E-05 | -2.51E-05 | 2.81E-05 | 0.00E+00 | 0.00E+00 | 0.00E+00 | 0.00E+00 |
| IS7 | Extended aspheric surface | 2.186 | 0.000 | -1.45E-04 | -1.03E-04 | 1.14E-04 | 0.00E+00 | 0.00E+00 | 0.00E+00 | 0.00E+00 |
| S8 | Extended aspheric surface | 2.330 | 0.000 | -3.04E-04 | 1.39E-04 | 2.64E-04 | 1.70E-04 | 5.62E-05 | 1.23E-06 | 0.00E+00 |
| S9 | Extended aspheric surface | 2.805 | 0.000 | 1.11E-03 | 1.45E-04 | -5.65E-04 | -3.06E-04 | -1.96E-05 | 1.37E-04 | 4.80E-05 |
| S10 | Extended aspheric surface | 3.151 | 0.000 | -1.83E-03 | 4.10E-04 | -7.26E-04 | -7.05E-05 | 9.56E-05 | 2.19E-04 | -5.16E-05 |
| S11 | Extended aspheric surface | 3.774 | 0.000 | -2.78E-03 | -4.77E-03 | -1.61E-03 | -2.86E-04 | -8.68E-04 | 3.34E-05 | -1.67E-04 |
| S12 | Extended aspheric surface | 4.086 | 0.000 | -1.36E-02 | 6.47E-03 | 4.34E-04 | 5.28E-04 | -4.45E-04 | -2.39E-04 | -2.30E-05 |
| S13 | Extended aspheric surface | 4.564 | -1.000 | 1.13E-02 | -6.19E-03 | -4.20E-03 | 3.58E-03 | -3.98E-04 | 9.36E-04 | -8.80E-04 |
| S14 | Extended aspheric surface | 4.792 | 0.000 | 4.26E-03 | -7.45E-03 | 3.57E-03 | -9.65E-07 | 0.00E+00 | 0.00E+00 | 0.00E+00 |

In the 14 aspheric surfaces of the optical lens 410 shown in Table 18, surface types z of all the extended aspheric surfaces may be defined according to, but not limited to, the following aspheric surface formula:

$$z = \frac{cr^2}{1 + \sqrt{1 - (K+1)c^2 r^2}} + u^4 \sum_{x=0}^{13} A_x Q_x^{con}(u^2)$$

Herein, z indicates a vector height of the aspheric surface, r indicates a normalized radial coordinate of the aspheric surface, r is equal to a result obtained by dividing an actual radial coordinate of the aspheric surface by a normalized radius R, c indicates a spherical curvature of a vertex of the aspheric surface, K indicates a conic constant, Ax indicates an aspheric coefficient, $$Q_x^{con}$$

is an aspheric polynomial, $$Q_x^{con}(u^2) = P_x^{(0,4)}(2u - 1),$$

and Px indicates a Jacobi polynomial.

The optical lens shown in FIG. 26*a* and FIG. 26*b* is simulated. A simulation result of the optical lens is described in detail below with reference to accompanying drawings.

Figure 27A:
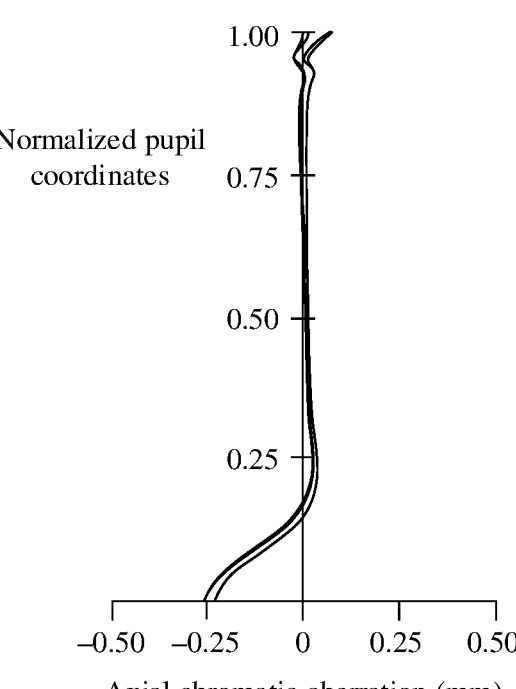
FIG. 27*a* is a diagram of axial chromatic aberration curves of a sixth optical lens in a first imaging mode according to an embodiment of this application.

FIG. 27*a* is a diagram of axial chromatic aberration curves of the sixth optical lens in the first imaging mode according to an embodiment of this application. Along a direction away from a coordinate origin, values of scales on a vertical coordinate axis are successively 0.25, 0.50, 0.75, and 1.00. Simulation results of depth of focus positions of colored light with wavelengths of 650 nm, 610 nm, 555 nm, 510 nm, and 470 nm are separately shown in the figure. It can be learned that an axial chromatic aberration of the optical lens in the first imaging mode is controlled to fall within a very small range.

Figure 27B:
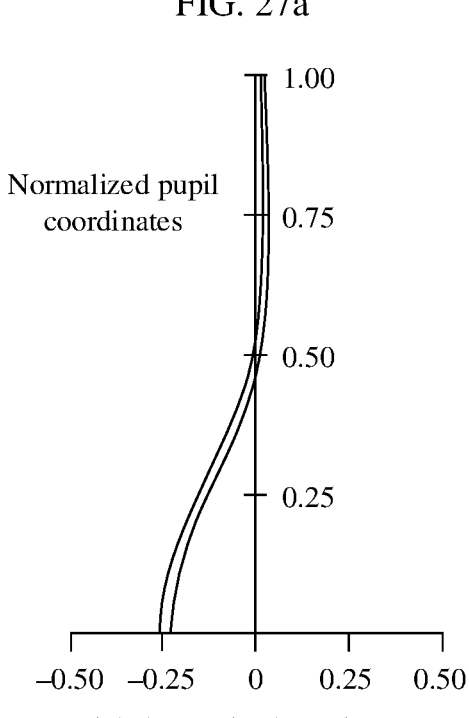
FIG. 27*b* is a diagram of axial chromatic aberration curves of a sixth optical lens in a second imaging mode according to an embodiment of this application.

FIG. 27*b* is a diagram of axial chromatic aberration curves of the sixth optical lens in the second imaging mode according to an embodiment of this application. Along a direction away from a coordinate origin, values of scales on a vertical coordinate axis are successively 0.25, 0.50, 0.75, and 1.00. Simulation results of depth of focus positions of colored light with wavelengths of 650 nm, 610 nm, 555 nm, 510 nm, and 470 nm are separately shown in the figure. It can be learned that an axial chromatic aberration of the optical lens in the second imaging mode is controlled to fall within a very small range.

Figure 28A:
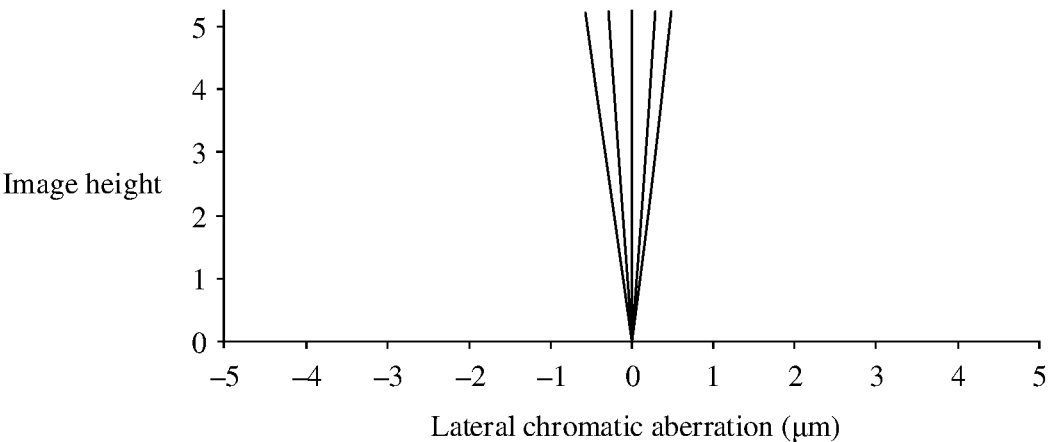
FIG. 28*a* is a diagram of lateral chromatic aberration curves of a sixth optical lens in a first imaging mode according to an embodiment of this application.

FIG. 28*a* is a diagram of lateral chromatic aberration curves of the sixth optical lens in the first imaging mode according to an embodiment of this application. Five solid curves in the figure respectively indicate the colored light with the wavelengths of 650 nm, 610 nm, 555 nm, 510 nm, and 470 nm. It can be learned that a lateral chromatic aberration of the optical lens in the first imaging mode is controlled to fall within a very small range.

Figure 28B:
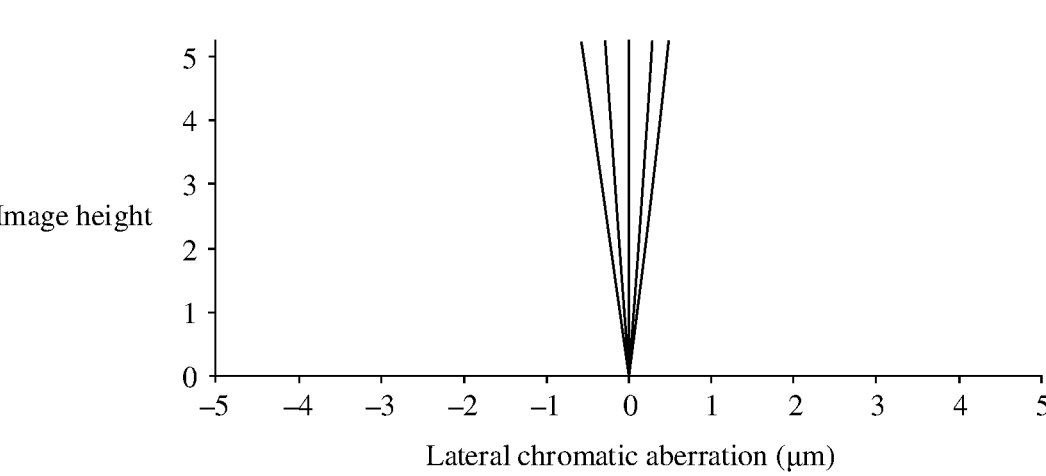
FIG. 28*b* is a diagram of lateral chromatic aberration curves of a sixth optical lens in a second imaging mode according to an embodiment of this application.

FIG. 28*b* is a diagram of lateral chromatic aberration curves of the sixth optical lens in the second imaging mode according to an embodiment of this application. Five solid curves in the figure respectively indicate the colored light with the wavelengths of 650 nm, 610 nm, 555 nm, 510 nm, and 470 nm. It can be learned that a lateral chromatic aberration of the optical lens in the second imaging mode is controlled to fall within a very small range.

Figures 29A, 29B:
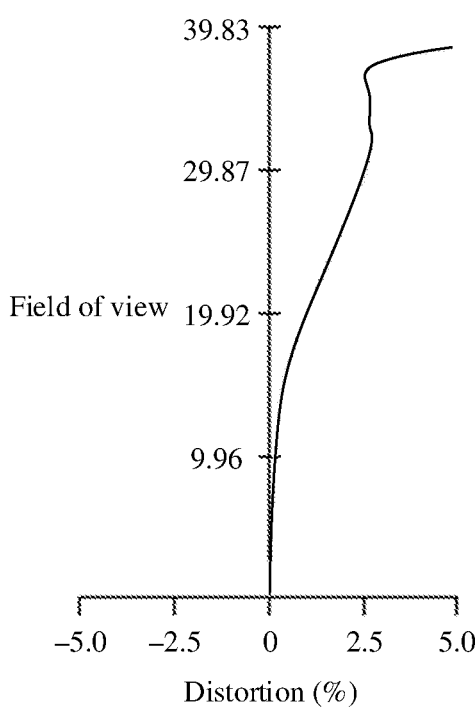
FIG. 29*a* is a diagram of an optical distortion curve of a sixth optical lens in a first imaging mode according to an embodiment of this application.
FIG. 29*b* is a diagram of an optical distortion curve of a sixth optical lens in a second imaging mode according to an embodiment of this application.

FIG. 29*a* is a diagram of an optical distortion curve of the sixth optical lens in the first imaging mode according to an embodiment of this application, and shows a difference between imaging deformation and an ideal shape. It can be learned that in this mode, an optical distortion can be basically controlled to fall within a range less than 5%.

FIG. 29*b* is a diagram of an optical distortion curve of the sixth optical lens in the second imaging mode according to an embodiment of this application, and shows a difference between imaging deformation and an ideal shape. It can be learned that in this mode, an optical distortion can be basically controlled to fall within a range less than 5%.

It can be learned from the structures and simulation effect of the first optical lens, the second optical lens, the third optical lens, the fourth optical lens, the fifth optical lens, and the sixth optical lens that the optical lens provided in this embodiment of this application can obtain good imaging effect in two different imaging modes.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An optical lens, comprising:
a variable aperture, a first lens, a second lens, a third lens, a fourth lens, a fifth lens, a sixth lens, and a seventh lens that are arranged from an object side to an image side, wherein:
a diameter of clear aperture of the variable aperture is adjustable;
the first lens has a positive focal power, an object-side surface of the first lens is convex at an optical axis, and an image-side surface of the first lens is concave at the optical axis;
the second lens has a negative focal power, an object-side surface of the second lens is convex at the optical axis, and an image-side surface of the second lens is concave at the optical axis;
an object-side surface of the third lens is concave at the optical axis;
an object-side surface of the seventh lens is a reverse curved surface;
a curvature radius (R12) of a region, at the optical axis, of an image-side surface of the sixth lens and a focal length (EFL) of the optical lens satisfy: $0 \leq |EFL/R12| \leq 0.46$; and
a focal length (f1) of the first lens and the EFL of the optical lens satisfy: $0 \leq f1/EFL \leq 1.1$; and a focal length (f3) of the third lens and a focal length (f4) of the fourth lens satisfy: $-4 \leq f3/f4 \leq -1.3$.

2. The optical lens according to claim 1, wherein a curvature radius (R3) of a region, at the optical axis, of the object-side surface of the second lens and a curvature radius (R4) of a region, at the optical axis, of the image-side surface of the second lens satisfy: $1.8 \leq (R3+R4)/(R3-R4) \leq 6.3$.

3. The optical lens according to claim 1, wherein a total length (TTL) of the optical lens, an F-number (F) of the optical lens, and a half-image height (ImgH) of the optical lens satisfy: $TTL \times F/ImgH \geq 1.8$.

4. The optical lens according to claim 1, wherein a center thickness (CT5) of the fifth lens, a center thickness (CT7) of the seventh lens, and a half field of view (HFOV) of the optical lens satisfy: $0 \leq CT7/[CT5 \times \tan(HFOV)] \leq 1.1$.

5. The optical lens according to claim 1, wherein an F-number (F) of the optical lens satisfies: $1.2 \leq F \leq 8.0$.

6. The optical lens according to claim 1, wherein a curvature radius (R13) of the object-side surface of the seventh lens and the focal length EFL of the optical lens satisfy: $0 \leq |EFL/R13| \leq 2.2$.

7. The optical lens according to claim 1, wherein a total length (TTL) of the optical lens and an entrance pupil diameter (EPD) of the optical lens satisfy: $1.5 \leq TTL/EPD \leq 10$.

8. The optical lens according to claim 1, wherein along an optical axis direction of the optical lens, a spacing (d1) between the first lens and the second lens satisfies: $d1/dm \leq 1$, wherein dm is a spacing between an $m^{th}$ lens and an $(m+1)^{th}$ lens, m is a natural number, and $2 \leq m \leq 6$.

9. The optical lens according to claim 1, wherein a center thickness (CT1) of the first lens satisfies: $CT1/CTn \geq 1$, wherein CTn is a center thickness of an $n^{th}$ lens, n is a natural number, and $2 \leq n \leq 7$.

10. A camera, comprising:
an image sensor and an optical lens, wherein the optical lens comprises a variable aperture, a first lens, a second lens, a third lens, a fourth lens, a fifth lens, a sixth lens, and a seventh lens that are arranged from an object side to an image side, wherein:
a diameter of clear aperture of the variable aperture is adjustable;
the first lens has a positive focal power, an object-side surface of the first lens is convex at an optical axis, and an image-side surface of the first lens is concave at the optical axis;
the second lens has a negative focal power, an object-side surface of the second lens is convex at the optical axis, and an image-side surface of the second lens is concave at the optical axis;
an object-side surface of the third lens is concave at the optical axis;
an object-side surface of the seventh lens is a reverse curved surface;
a curvature radius (R12) of a region, at the optical axis, of an image-side surface of the sixth lens and a focal length (EFL) of the optical lens satisfy: $0 \leq |EFL/R12| \leq 0.46$; and
a focal length (f1) of the first lens and the EFL of the optical lens satisfy: $0 \leq f1/EFL \leq 1.1$; and a focal length (f3) of the third lens and a focal length (f4) of the fourth lens satisfy: $-4 \leq f3/f4 \leq -1.3$; and
wherein the image sensor is disposed on an imaging surface of the optical lens, and the image sensor is configured to convert an optical signal transferred by the optical lens into an image signal.

11. The camera according to claim 10, wherein a curvature radius (R3) of a region, at the optical axis, of the object-side surface of the second lens and a curvature radius (R4) of a region, at the optical axis, of the image-side surface of the second lens satisfy: $1.8 \leq (R3+R4)/(R3-R4) \leq 6.3$.

12. The camera according to claim 10, wherein a total length (TTL) of the optical lens, an F-number (F) of the optical lens, and a half-image height (ImgH) of the optical lens satisfy: $TTL \times F/ImgH \geq 1.8$.

13. The optical lens according to claim 10, wherein a center thickness (CT5) of the fifth lens, a center thickness (CT7) of the seventh lens, and a half field of view (HFOV) of the optical lens satisfy: $0 \leq CT7/[CT5 \times \tan(HFOV)] \leq 1.1$.

14. The optical lens according to claim 10, wherein an F-number (F) of the optical lens satisfies: $1.2 \leq F \leq 8.0$.

15. An electronic device, comprising:
a housing and a camera, wherein the camera is fastened to the housing; wherein the camera comprises an image sensor and an optical lens, the optical lens comprising a variable aperture, a first lens, a second lens, a third lens, a fourth lens, a fifth lens, a sixth lens, and a seventh lens that are arranged from an object side to an image side, wherein:
a diameter of clear aperture of the variable aperture is adjustable;
the first lens has a positive focal power, an object-side surface of the first lens is convex at an optical axis, and an image-side surface of the first lens is concave at the optical axis;

the second lens has a negative focal power, an object-side surface of the second lens is convex at the optical axis, and an image-side surface of the second lens is concave at the optical axis;

an object-side surface of the third lens is concave at the optical axis;

a curvature radius (R12) of a region, at the optical axis, of an image-side surface of the sixth lens and a focal length (EFL) of the optical lens satisfy: $0 \le |\text{EFL}/\text{R12}| \le 0.46$; and a focal length (f1) of the first lens and the EFL of the optical lens satisfy: $0 \le \text{f1}/\text{EFL} \le 1.1$; and a focal length (f3) of the third lens and a focal length (f4) of the fourth lens satisfy: $-4 \le \text{f3}/\text{f4} \le -1.3$; and wherein the image sensor is disposed on an imaging surface of the optical lens, and the image sensor is configured to convert an optical signal transferred by the optical lens into an image signal.

16. The electronic device according to claim 15, wherein a curvature radius (R3) of a region, at the optical axis, of the object-side surface of the second lens and a curvature radius (R4) of a region, near the optical axis, of the image-side surface of the second lens satisfy: $1.8 \le (\text{R3}+\text{R4})/(\text{R3}-\text{R4}) \le 6.3$.

17. The electronic device according to claim 15, wherein a curvature radius (R13) of the object-side surface of the seventh lens and the focal length EFL of the optical lens satisfy: $0 \le |\text{EFL}/\text{R13}| \le 2.2$.

18. The electronic device according to claim 15, wherein a total length (TTL) of the optical lens and an entrance pupil diameter (EPD) of the optical lens satisfy: $1.5 \le \text{TTL}/\text{EPD} \le 10$.

\* \* \* \* \*